(12) United States Patent
Barsotti et al.

(10) Patent No.: US 10,557,236 B1
(45) Date of Patent: Feb. 11, 2020

(54) ENGINEERED MATERIAL ARRESTING SYSTEM AND METHODS FOR FORMING SAME

(71) Applicant: RUNWAY SAFE IPR AB, Göteborg (SE)

(72) Inventors: Matthew Barsotti, Austin, TX (US); Cliff Jones, Austin, TX (US); Michalis Hadjioannou, Austin, TX (US); Marc Klein, Westville, IN (US)

(73) Assignee: Runway Safe IPR AB, Göteborg (SE)

( * ) Notice: Subject to any disclaimer, the term of this patent is extended or adjusted under 35 U.S.C. 154(b) by 0 days.

(21) Appl. No.: 16/204,610

(22) Filed: Nov. 29, 2018

Related U.S. Application Data

(63) Continuation of application No. 15/912,422, filed on Mar. 5, 2018, now Pat. No. 10,160,554.

(60) Provisional application No. 62/466,922, filed on Mar. 3, 2017.

(51) Int. Cl.
| | |
|---|---|
| *E01C 9/00* | (2006.01) |
| *E01C 19/48* | (2006.01) |
| *B64F 1/02* | (2006.01) |
| *B32B 3/26* | (2006.01) |
| *E01C 19/00* | (2006.01) |

(52) U.S. Cl.
CPC .............. *E01C 19/48* (2013.01); *E01C 9/007* (2013.01); *B32B 3/26* (2013.01); *B64F 1/025* (2013.01); *E01C 19/00* (2013.01)

(58) Field of Classification Search
CPC . B64F 1/025; B32B 3/26; E01C 9/007; E01C 19/007
USPC ........................................ 404/17–31, 72, 75
See application file for complete search history.

(56) References Cited

U.S. PATENT DOCUMENTS

| | | | |
|---|---|---|---|
| 3,056,184 | A | 10/1962 | Blaha |
| 3,066,896 | A | 12/1962 | Schirtzinger |
| 3,673,290 | A | 6/1972 | Brubaker |
| 3,967,704 | A | 7/1976 | Ogden |
| 3,979,341 | A | 9/1976 | Widmann |
| 4,007,917 | A | 2/1977 | Brubaker |

(Continued)

FOREIGN PATENT DOCUMENTS

| | | |
|---|---|---|
| CA | 2250544 A1 | 8/1998 |
| GB | 2476944 A | 7/2011 |

OTHER PUBLICATIONS

P. Balaguru and Seetharaman Ramakrishnan, Properties of Lightweight Cement Composite Containing Ceramic Spheres, 36 pgs., Civil Engineering Report No. 92-11, Nov. 1992.

(Continued)

*Primary Examiner* — Raymond W Addie
(74) *Attorney, Agent, or Firm* — Quarles & Brady LLP

(57) ABSTRACT

A method of forming a vehicle arresting system includes installing a plurality of stratified layers of aggregate and compressing each layer prior to adding a next aggregate layer, a slab layer, and/or some other separation layer. In one aspect, one or more of the aggregate layers comprises a glass foam, and one or more of the slab layers comprises a cementitious material having an oven-dry density of 100 lb/ft3 or less, such as cellular concrete. The aggregate layers may be poured to approximately the same depth as one another, or at least one aggregate layer may have a different depth than the other aggregate layers. Similarly, the method of compaction for one aggregate layer may be the same as or different from the method used for the other aggregate layers.

29 Claims, 47 Drawing Sheets

(56) References Cited

U.S. PATENT DOCUMENTS

| | | | |
|---|---|---|---|
| 4,913,741 | A | 4/1990 | Lane et al. |
| 5,607,252 | A | 3/1997 | Tischer |
| 5,789,681 | A | 8/1998 | Angley et al. |
| 5,816,876 | A | 10/1998 | Hamilton |
| 5,827,457 | A | 10/1998 | Tseng |
| 5,885,025 | A | 3/1999 | Angley et al. |
| 5,902,068 | A | 5/1999 | Angley et al. |
| 5,961,182 | A | 10/1999 | Dellanno |
| 6,685,387 | B2 | 2/2004 | Allen et al. |
| 6,726,400 | B1 | 4/2004 | Angley et al. |
| 6,971,817 | B2 | 12/2005 | Allen et al. |
| 7,261,490 | B2 | 8/2007 | Allen et al. |
| 7,597,502 | B2 | 10/2009 | Allen et al. |
| 8,021,074 | B2 | 9/2011 | Valentini et al. |
| 2003/0049075 | A1 | 3/2003 | Allen et al. |
| 2007/0201950 | A1 | 8/2007 | Rastegar et al. |
| 2009/0071376 | A1 | 3/2009 | Masloff et al. |
| 2009/0110481 | A1 | 4/2009 | Rastegar et al. |
| 2011/0206926 | A1 | 8/2011 | Marc |
| 2012/0020745 | A1 | 1/2012 | Miller et al. |
| 2014/0265523 | A1 | 9/2014 | Wright |
| 2016/0340838 | A1 | 11/2016 | Doherty et al. |
| 2016/0355277 | A1 | 12/2016 | Ungerleider et al. |
| 2017/0121035 | A1 | 5/2017 | Ungerleider et al. |
| 2017/0297739 | A1 | 10/2017 | Valentini et al. |
| 2017/0356137 | A1 | 12/2017 | Webber et al. |

OTHER PUBLICATIONS

J. R. Barnes, Development of a Model Technique for Investigation the Performance of Soft-Ground Arresters for Aircraft, Royal Aircraft Establishment, 48 pgs., Technical Report 71231, Nov. 1971.

David L. Bennet, Engineered Materials Arresting Systems (EMAS) for Aircraft Overruns, U.S. Department of Transportation, Aug. 21, 1998, 10 Pgs., AC No. 150/5220-22, Advisory Circular.

C. Barry Carter and M. Grant Norton, Ceramic Materials, 9 pgs. Scient and Engineering, Second Edition, Springer Science+ Business Media New York 2013.

R. F. Cook, Soft-Ground Aircraft Arresting Systems, U.S. Department of Transportation, Aug. 1987, 143 Pgs., DOT/FAA/PM-87/27, Federal Aviation Administration, Technical Center Library, Atlantic City Int'l Arprt. NJ 08405.

Robert F. Cook, Evaluation of a Foam Arrestor Bed for Aircraft Safety Overrun Areas, UDR-TR-88-07, 126 pgs, Jan. 1988, University of Daytona Research Institute, Dayton, OH 45469.

Robert F. Cook, Soft-Ground Arresting System for Commercial Aircraft, DOT/FAA/CT-TN93/4, 39 pgs, Feb. 1993, Document on file at the Technical Center Library, Atlantic City International Airport, NJ 08405.

R. F. Cook and C. A. Teubert, Preliminary Soft Ground Arrestor for JFK International Airport, U.S. Department of Transportation, Mar. 1995, 26 pgs., DOT/FAA/CT-95, FAA Technical Center, Document available National Technical Information Service, Springfield, VA 22161.

Emasmax Aircraft Arresting Systems for Runway Overrun Protection, 18 pgs., ICAO—Global Runway Safety Symposium, May 24, 2011, Engineered Arresting Systems Corporation, Montreal, CA.

E-Sorb Hollow Sphere Composites for Energy Absorption, 8 pgs., before Mar. 5, 2018, Microcel Technology, Inc., Piscataway, NJ 08854.

Geotechnical Grouting Applications Using Low Density Cellular Concrete, 26 pgs., Reprint Article: Concrete International, Apr. 1988, Oct. 1989; Reprint Article: Civil Engineering, Feb. 1992; and Article submitted to: Concrete International, Jan. 1993, Pacific International Grout Co., Bellingham, WA 98227.

G. M. Gwynne, Aircraft Arresting Using Foamed Plastic Over-run Areas, Royal Aircraft Establishment Redford Naval Air Department, RAE-NAD Note No. 282, 25 Pgs., Mar. 1971.

G. M. Gwynne, Use of Foamed Plastics as Emergency Aircraft Arresters, Study of the Arresting Effects for Different Groups of Aircraft on Selected Runways, Technical Memorandum Naval 217, 42 pgs., Rcvd. for printing May 4, 1972.

G. M. Gwynne, Urea Formaldehyde Foamed Plastic Emergency Arresters for Civil Aircraft, Royal Aircraft Establishment, Technical Report 74002, Rcvd. for printing Jan. 3, 1974, Crown Copyright 1974.

G. M. Gwynne, Urea Formaldehyde Foamed Plastic Emergency Arresters for Civil Aircraft, Procurement Executive, Ministry of Defense, Aeronautical Research Counsel Current Papers, 67 Pgs., C.P. No. 1329, 1975, London: Her Majesty's Stationary Office.

Lightweight Cellular Concrete System, 4 pgs., before Mar. 5, 2018, Anthes Equipment, Mississauga, Ontario, Canada L4V TV2.

Light-Weight Cement Foam Technology, 8 pgs., before Mar. 5, 2018, , ZIT Zementschaum-Technik International GmbH, Mindelheimer, Nurberg, D-90455.

Light-Weight Foam Technology, 13 pgs., before Mar. 5, 2018, ZIT Zementschaum-Technik International GmbH, Mindelheimer, Nurberg, D-90455.

Litvin and Rivkind, Guide for Cast-in-Place Low Density Concrete, Title No. 64-44, ACI Journal, 7 pgs., Sep. 1967, The Mearl Corporation, Roselle Park, NJ 07204.

McMichael, et al., Understanding Materials with Instrumented Impact, 4 pgs., 48, ME, Apr. 1989.

Mearlcrete Cellular Concrete Production Methods and Equipment, 11 pgs., Sep. 1986, Technical Bulletin, The Mearl Corporation, Roselle Park, NJ 07204.

Quality Assurance of Batch Mixed Cellular Concrete, 18 pgs., 1994, Cellufoam Concrete Systems, Scarborough, ON. Canada MIK 5B9.

T. G. Randall, Preliminary Feasibility Study of the Arresting of Aircraft in a Foamed Plastic Overrun Area, Technical Memorandum Naval 213, 25 pgs, Apr. 1970.

L. E. Rivkind, Improved Technology for Rigid Inorganic Foams, Journal of Cellular Plastics, 5 Pgs. 329-333, Jul. 1967, The Mearl Corporation, Roselle Park, NJ.

L. E. Rivkind, Improved Technology for Rigid Inorganic Foams, Reprinted from the Journal of Cellular Plastics, 7 Pgs. Jul. 3-7, 1967, The Mearl Corporation, Roselle Park, NJ.

Standard Test Method for Compressive Strength of Lightweight Insulating Concrete, ASTM Committee C-9, Dec. 1986.

Structural and Nonstructural Mearlcrete Cellular Concrete Applications and Properties, 5 pgs., FC706, Dec. 1987, Technical Bulletin, The Mearl Corporation, Roselle Park, NJ 07204.

James C. White and Satish K. Agrawal, Soft Ground Arresting System for Airports, U.S. Department of Transportation, Dec. 1993, 76 Pgs., Report No. DOT/FAA/CT-93/80, National Technical Information Service, Springfield, Virginia 22161.

PCT/IB2018/051411, International Search Report dated Jun. 18, 2018 (8 pages).

PCT/IB2018/051411, Written Opinion of the International Searching Authority dated Jun. 18, 2018 (8 pages).

PCT/IB2018/051412, International Search Report dated Jun. 20, 2018 (5 pages).

PCT/IB2018/051412, Written Opinion of the International Searching Authority dated Jun. 20, 2018 (6 pages).

Non-Final Office Action issued on U.S. Appl. No. 15/912,432 dated Aug. 10, 2018 (19 pages).

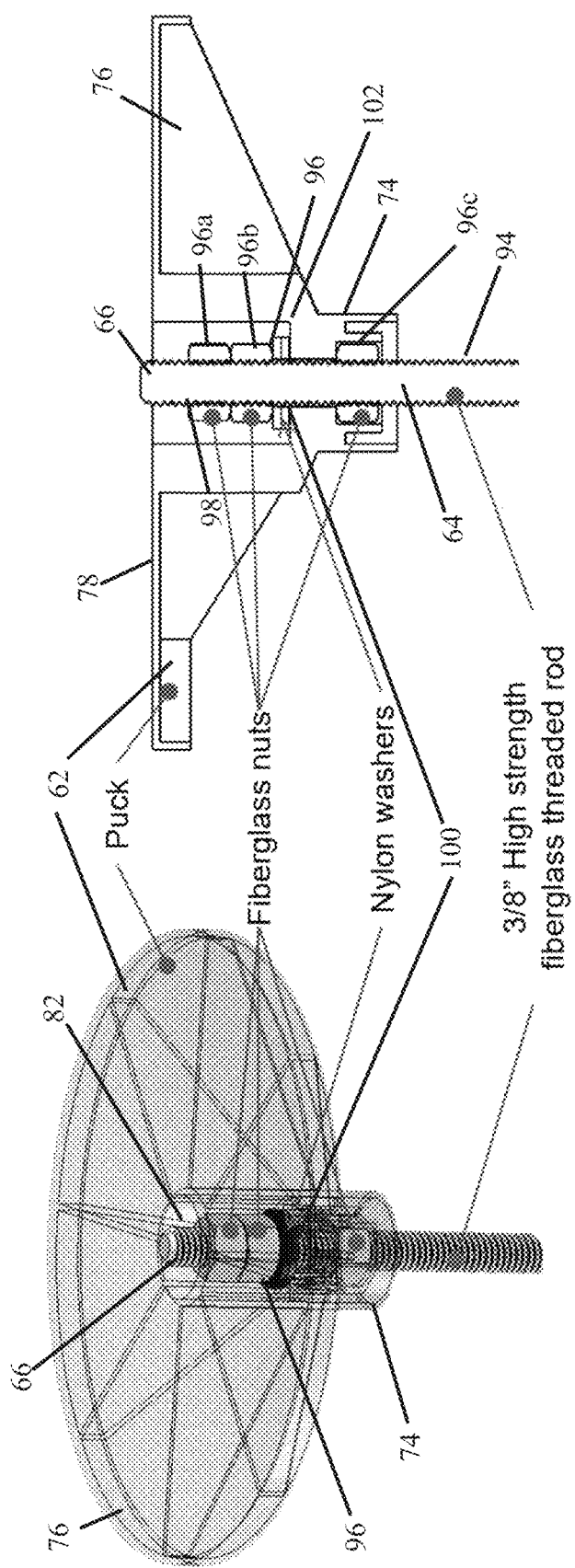

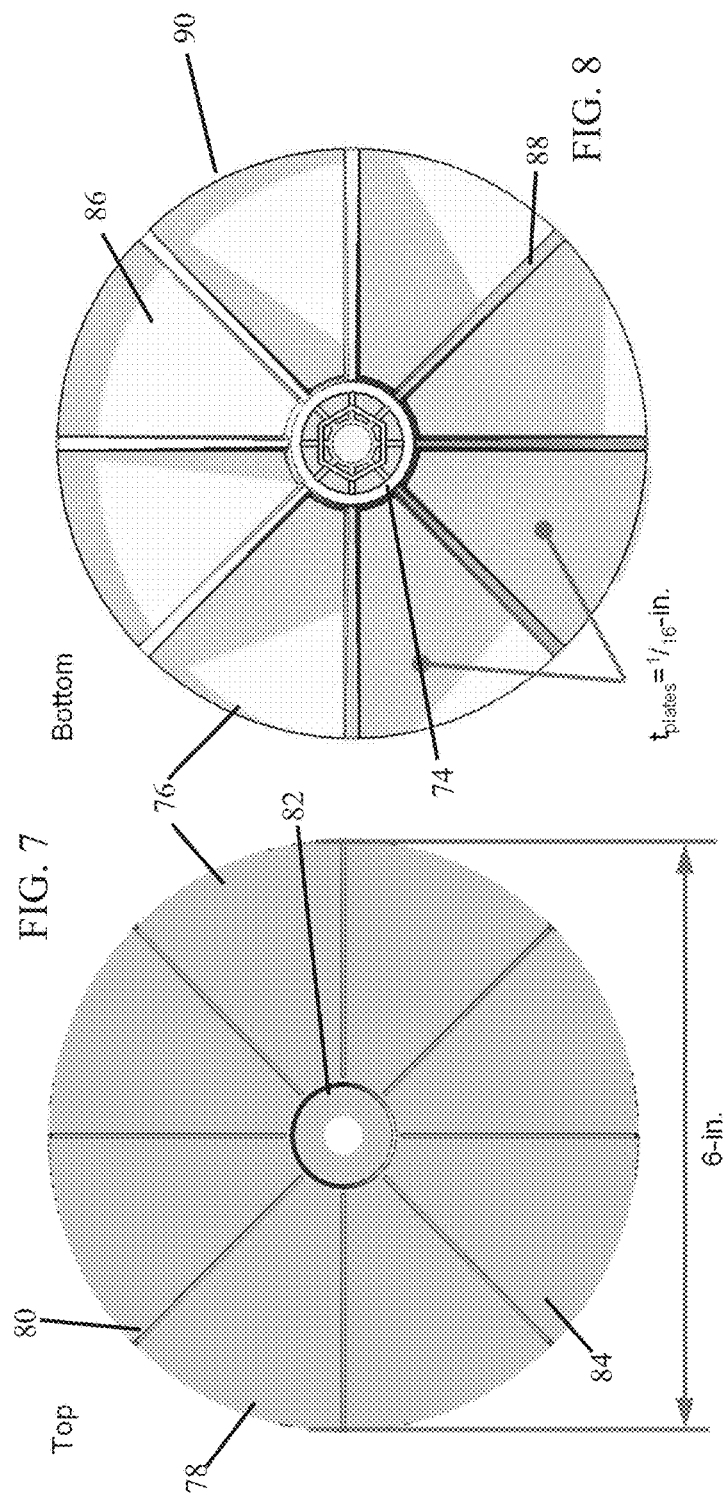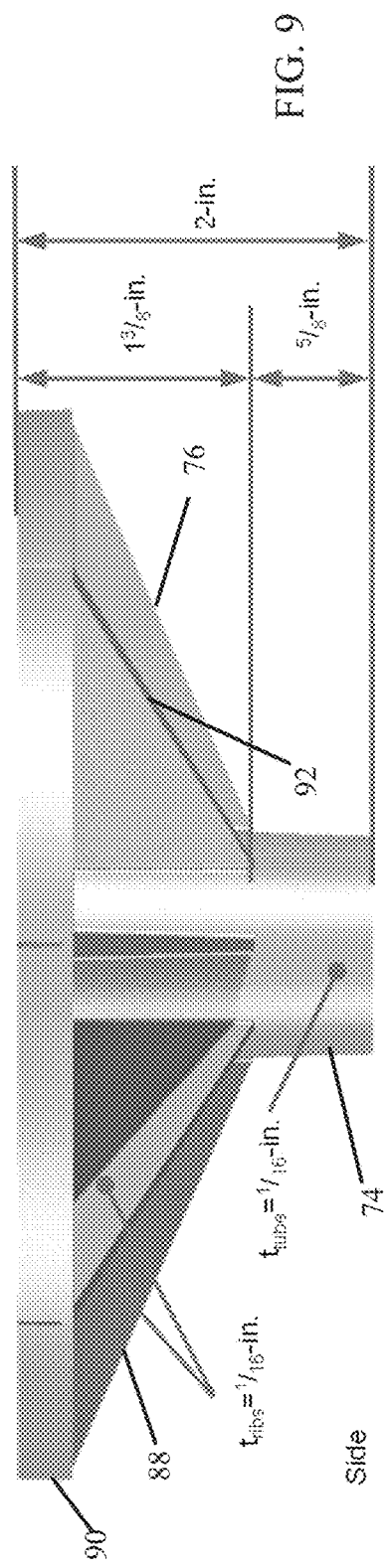

V-M Stress

Vertical Displacement

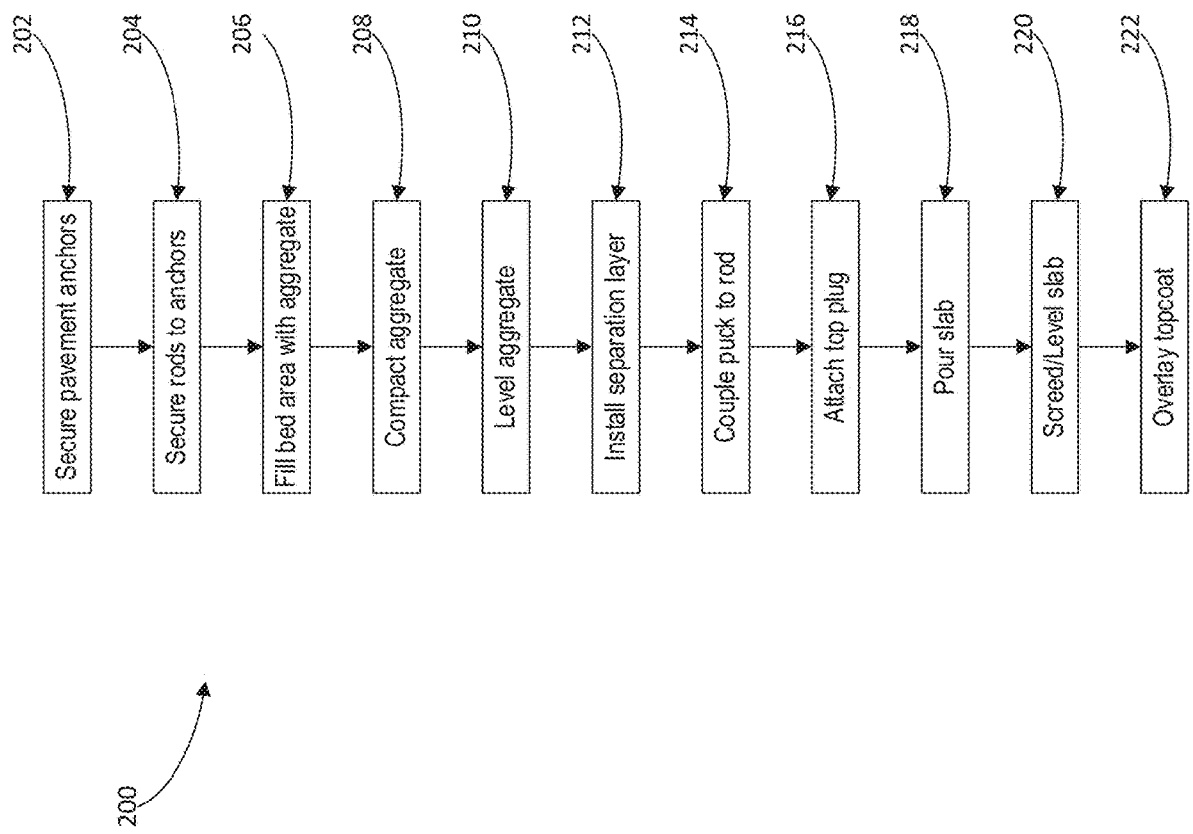

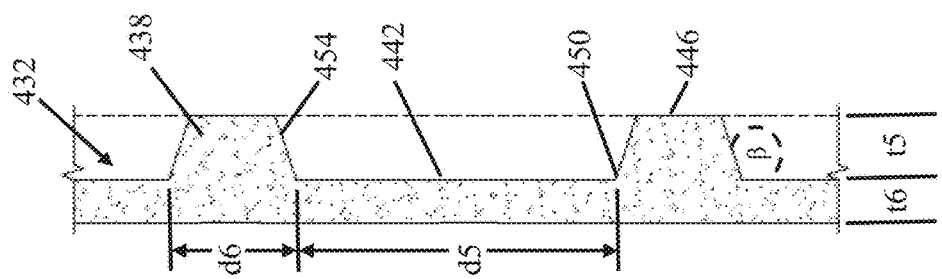
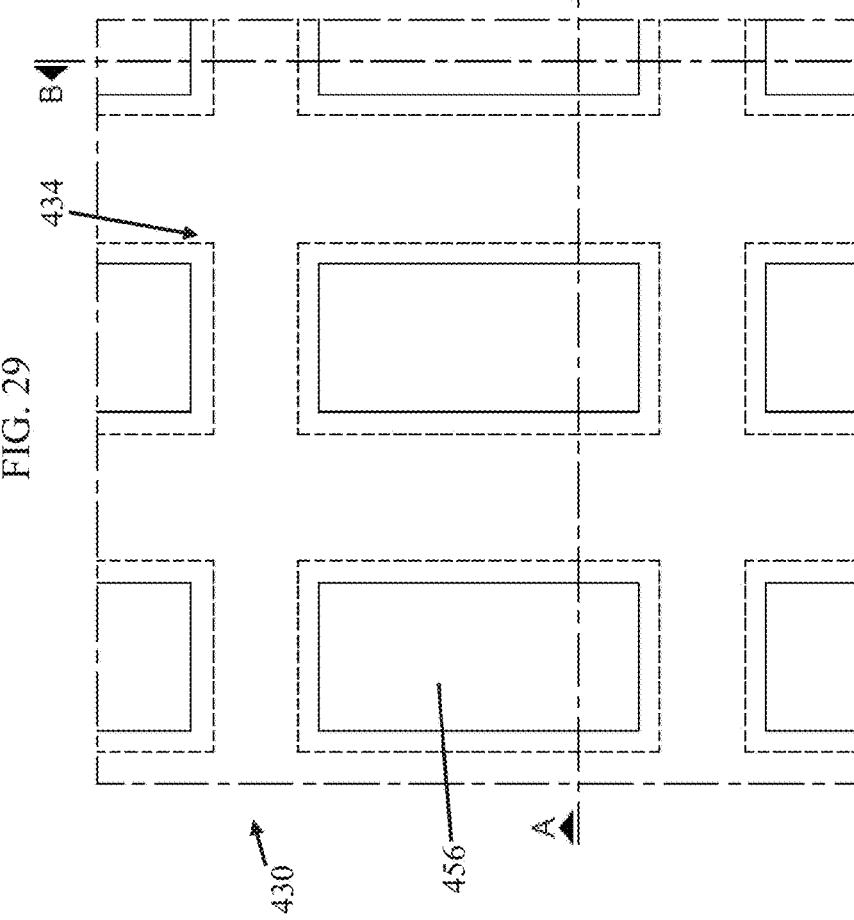
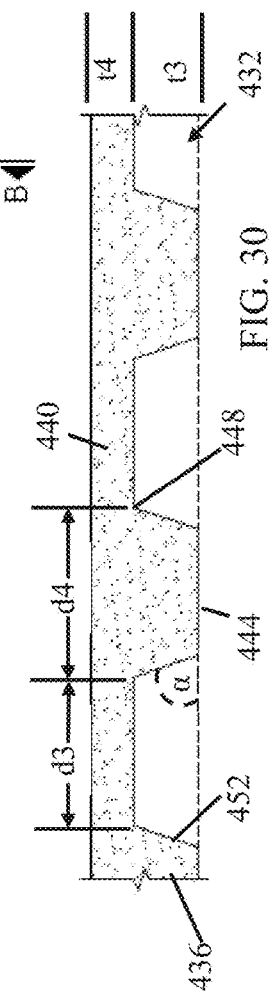

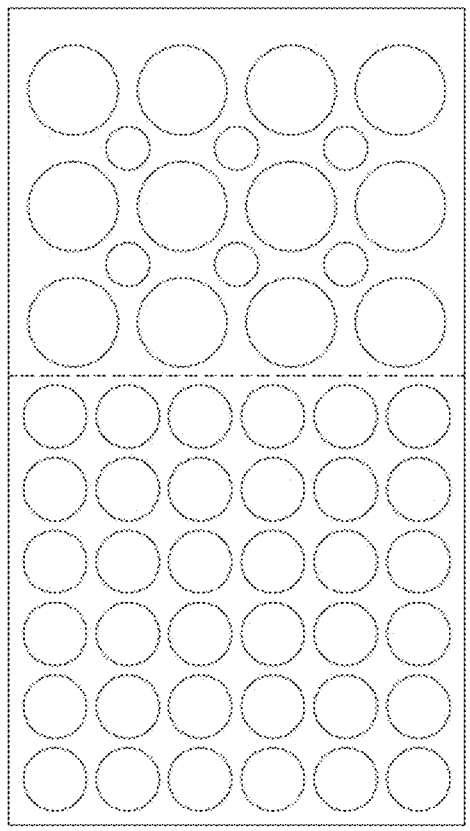
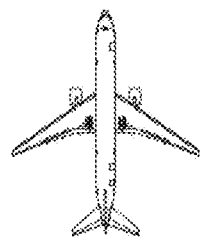
FIG. 35
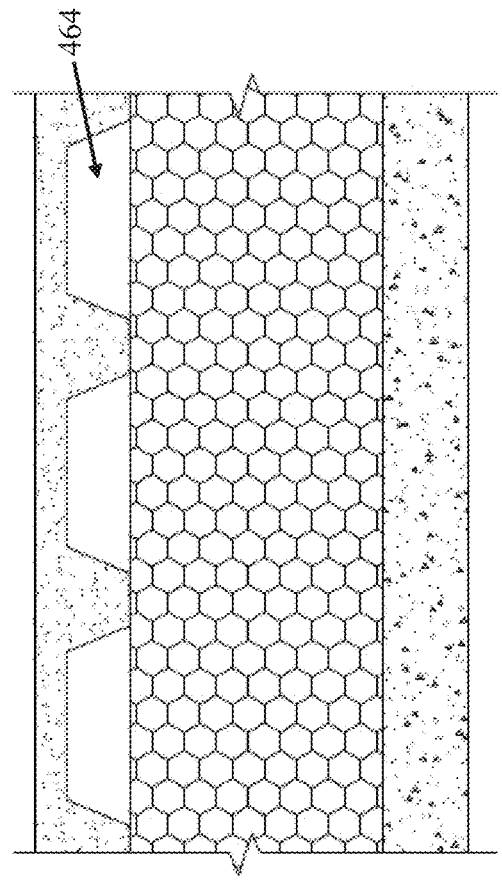
FIG. 36

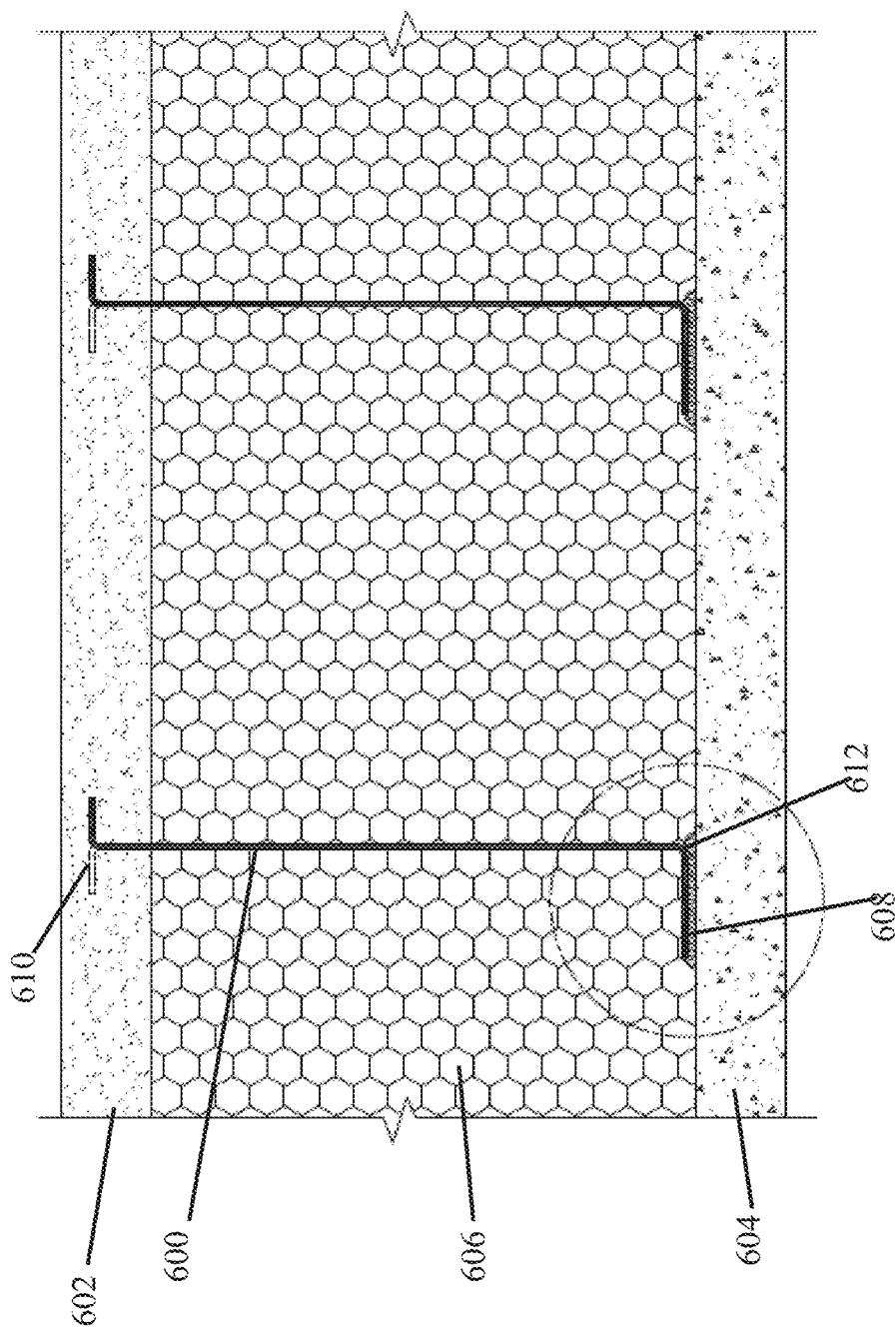

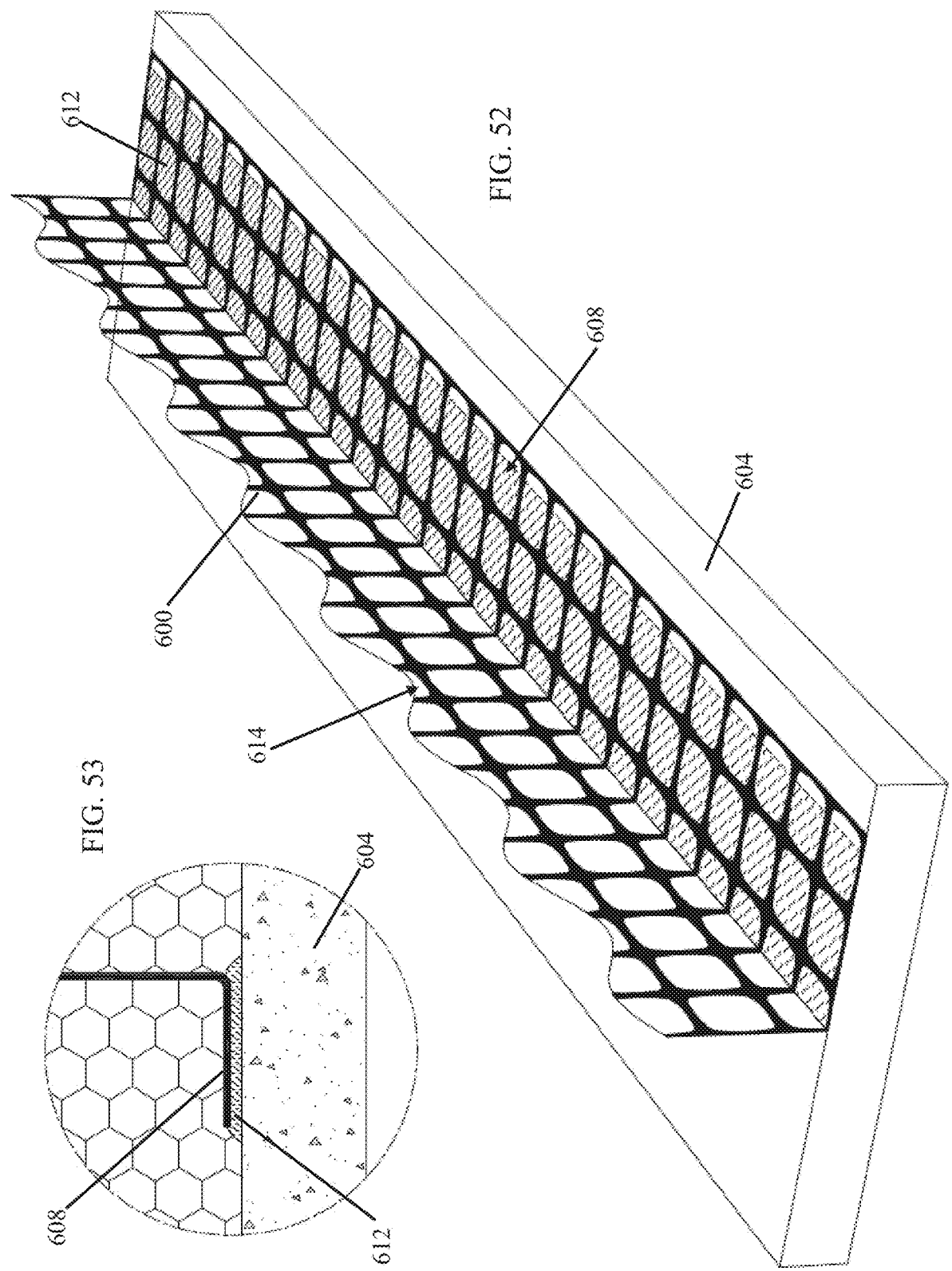

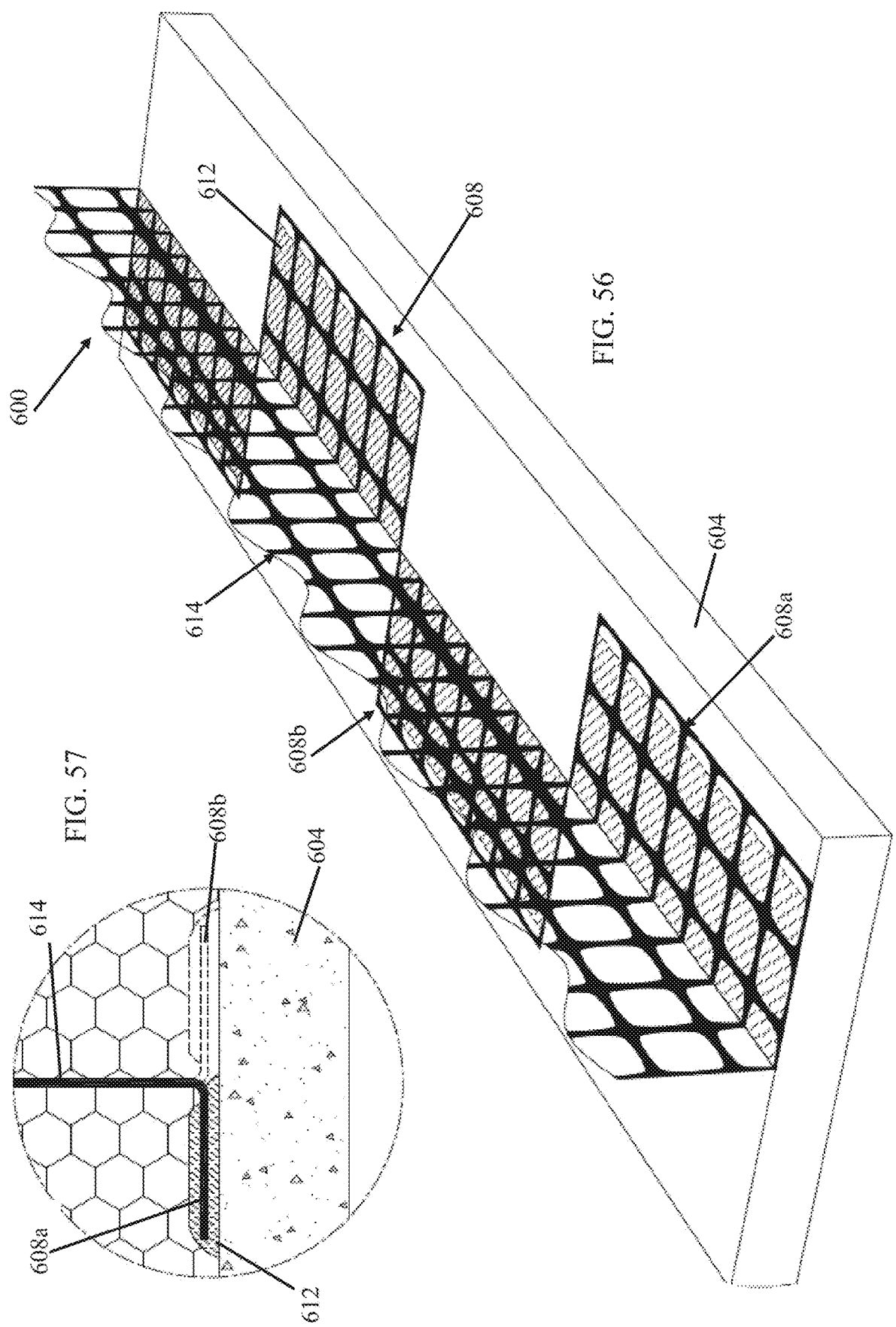

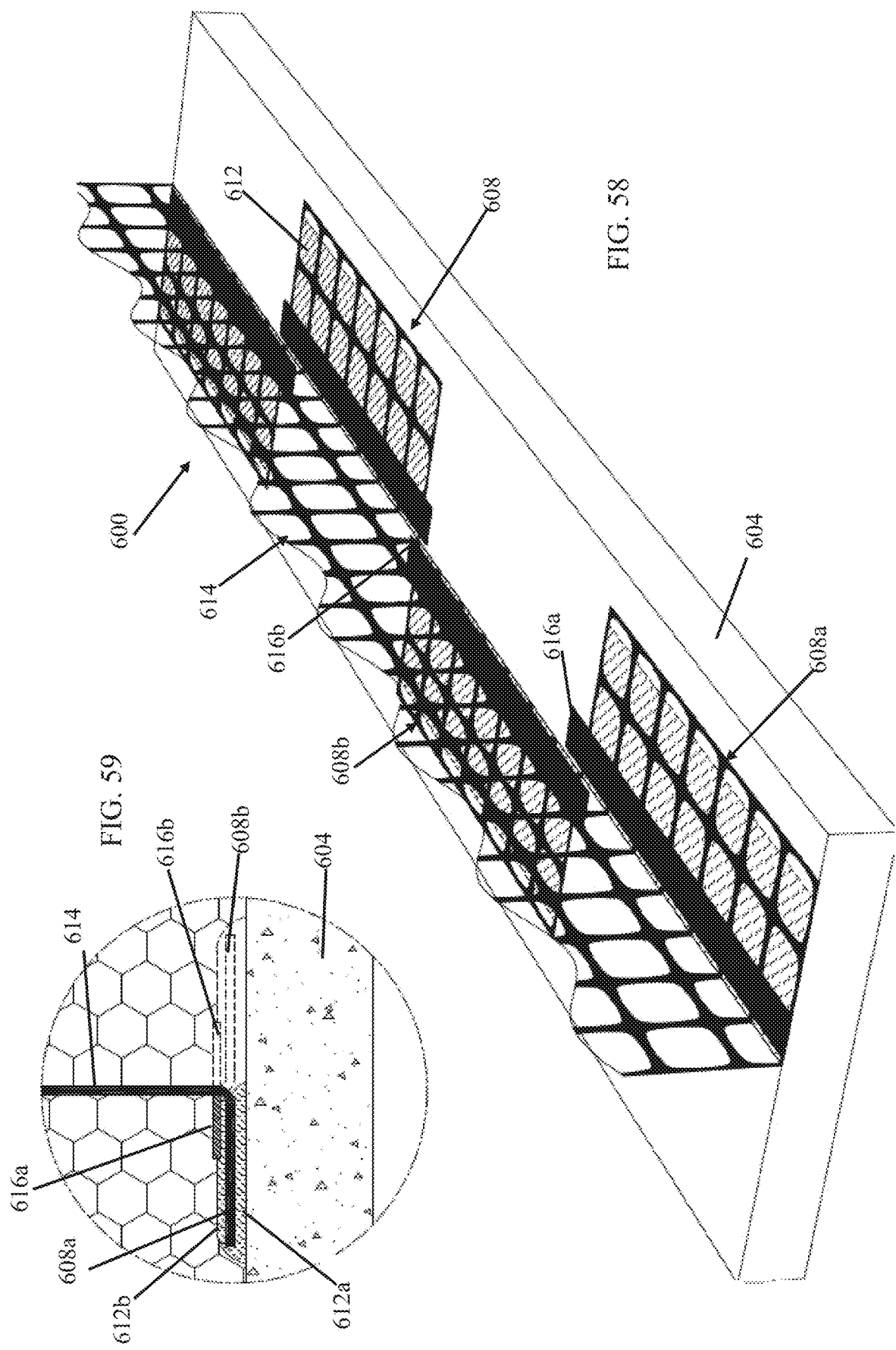

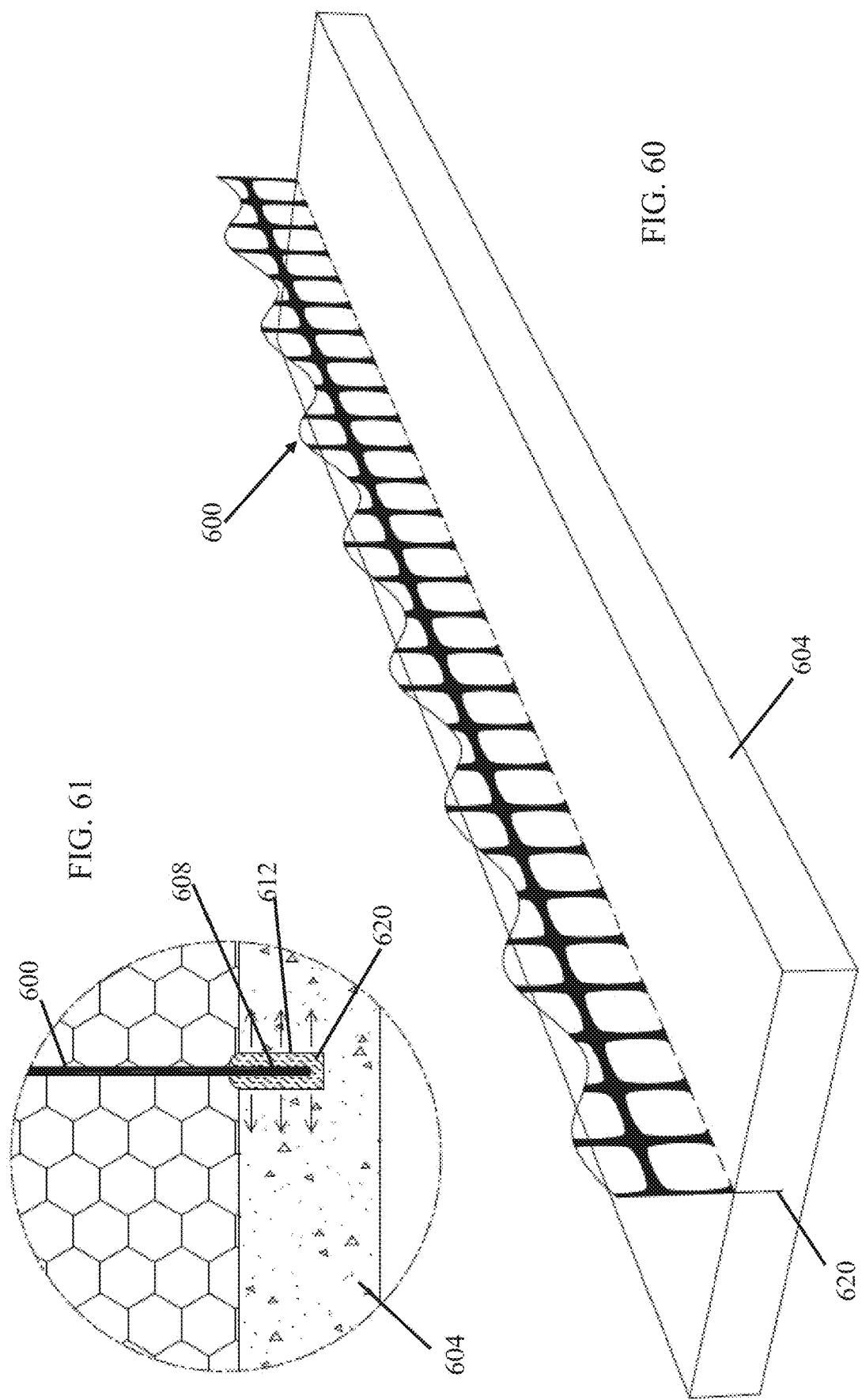

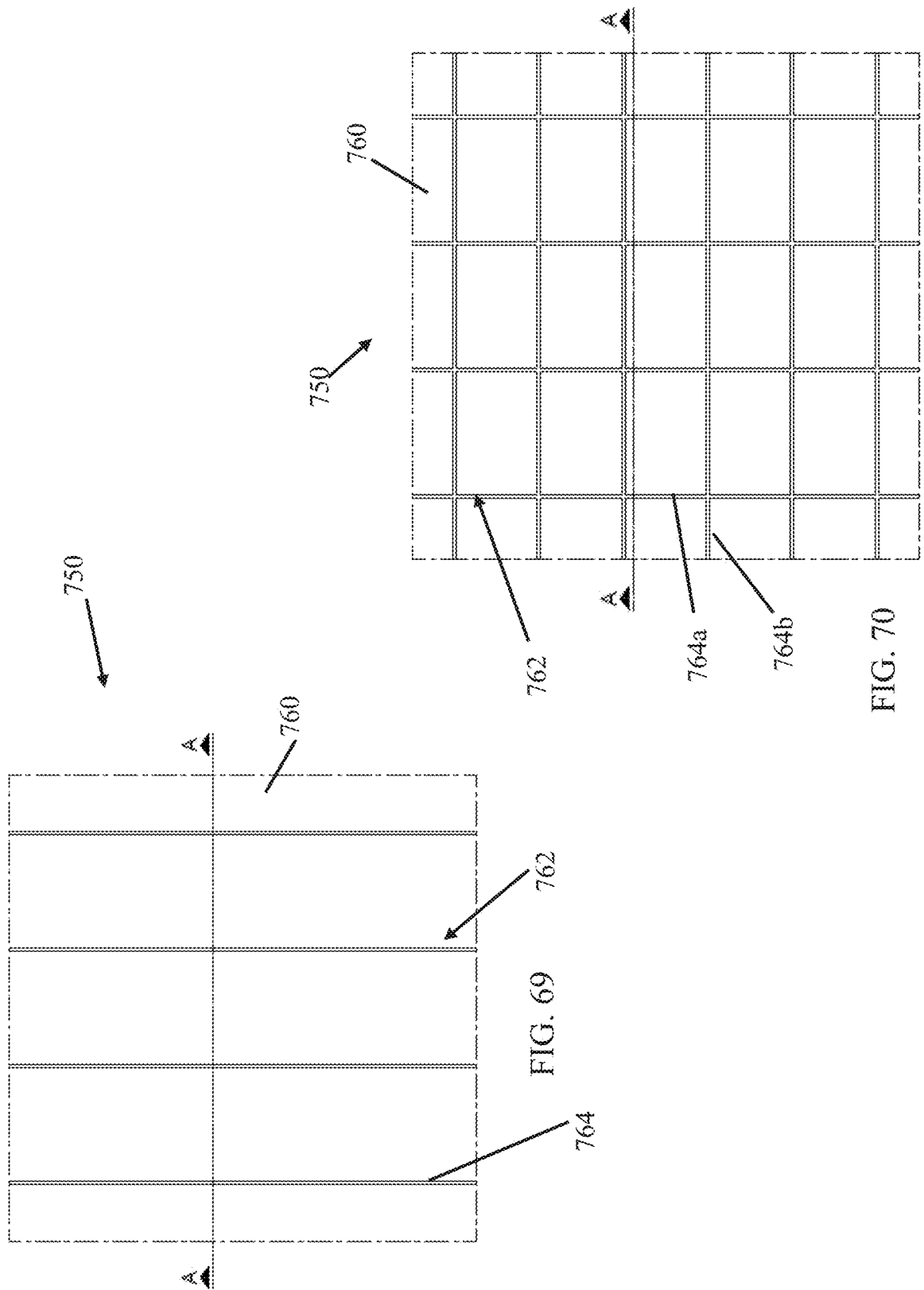

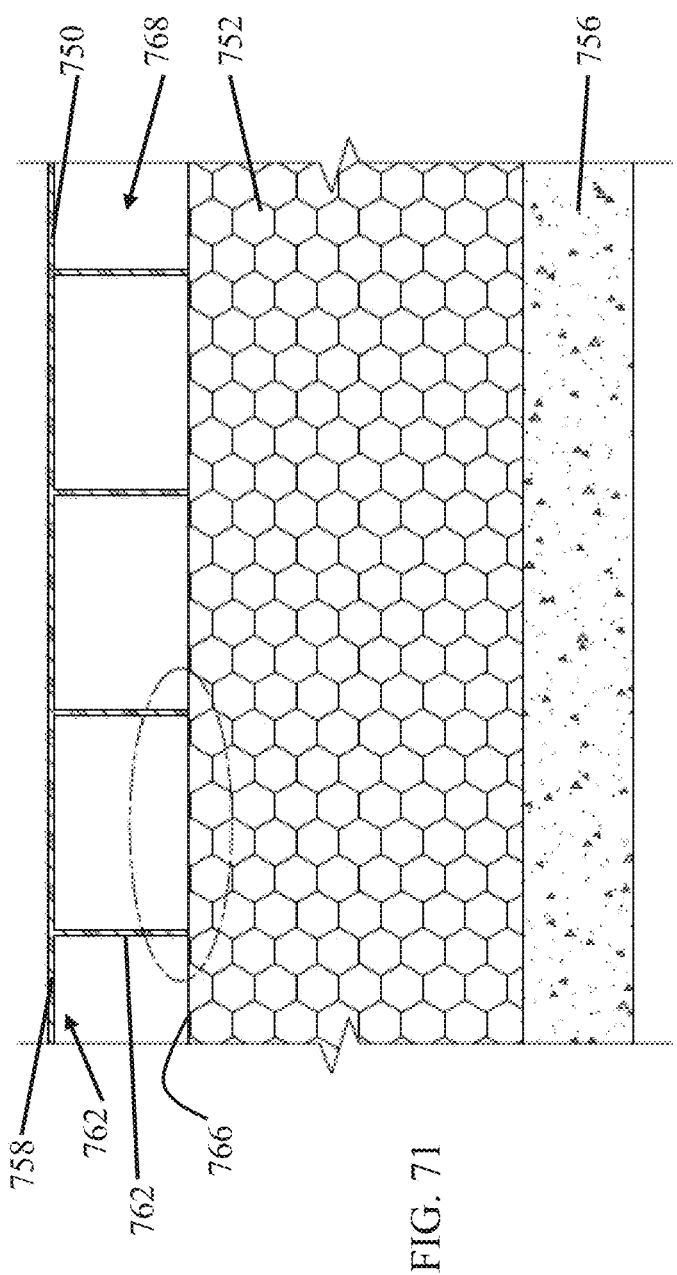
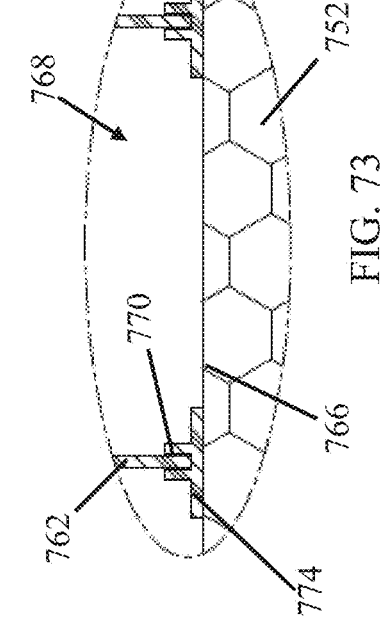
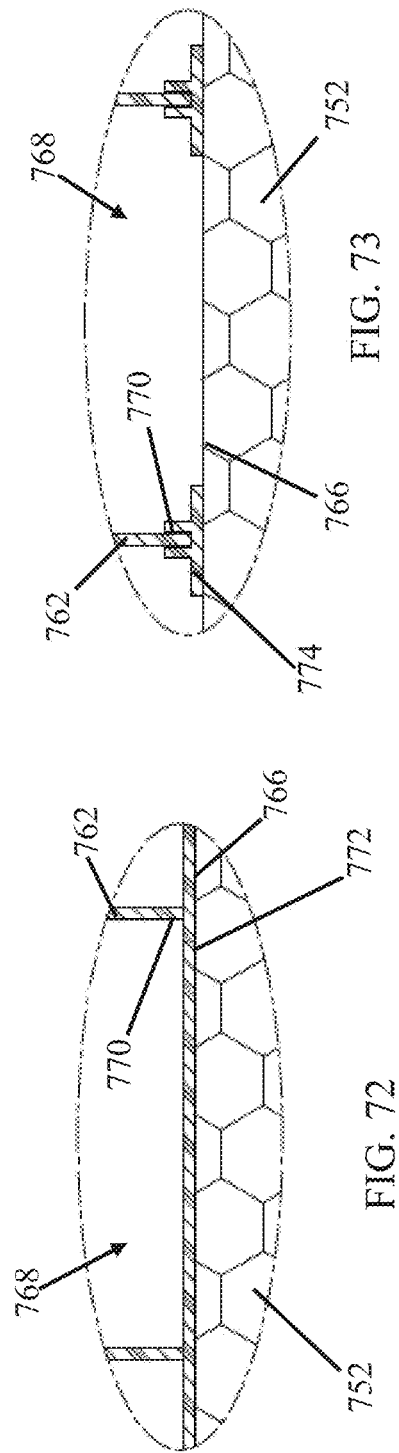
FIG. 71
FIG. 72
FIG. 73

ENGINEERED MATERIAL ARRESTING SYSTEM AND METHODS FOR FORMING SAME

This application is a continuation of U.S. patent application Ser. No. 15/912,422, filed Mar. 5, 2018, which claims the benefit of priority to U.S. Provisional Patent Application No. 62/466,922, filed Mar. 3, 2017, the contents of both which are incorporated herein by reference in their entirety.

BACKGROUND

1. Field of the Invention

The present application relates to a system for arresting aircraft that have overrun a runway end and methods for constructing such a system.

2. Description of the Related Art

Airport runways are configured to accommodate the take-off and landing of multiple types of aircraft. While the overwhelming number of those events occur without incident, there may be times when an aircraft overruns its runway and needs to be arrested. One such method for arresting aircraft is to position an engineered material arresting system (EMAS) in the safety area past the end of the runway. The EMAS includes an energy dissipating, deformable, crushable, and/or compactible material that engages the aircraft wheels and slows the aircraft by dissipating its kinetic energy. The material in the EMAS is designed to compact and give way to the aircraft tires during an overrun event.

EMAS installations may be located at one or both ends of a runway. The EMAS may be subjected to jet blast loads from aircraft taking off away from the EMAS or taxiing past the EMAS. Those loads typically generate upward lift on the EMAS, which may result in damage to an uncovered bed of material. As a result, the integrity of the EMAS may be at least partially compromised, debris may be spread across the runway area, and the effectiveness of the EMAS may be reduced.

One method for countering the uplift forces has been to embed continuous geogrid walls within the bed of compactible material, the walls placed in the overrun direction of the bed. The geogrid is a mesh-like structure that attaches to the underlying pavement using one or more anchors along its length. The geogrid may protrude above the compactible material when that material is first placed, which makes grading the material more difficult, and slows down the installation process. Moreover, in the event of damage to the geogrid, repair efforts may require excavating large portions of the compactible material in order to replace a length of geogrid.

During overrun events, in which an aircraft leaves the runway and is arrested by the EMAS system, it has been observed that arresting loads on the aircraft can increase at higher aircraft exit speeds. Thus, some aircraft for some EMAS systems may have maximum exit speeds that are limited by landing gear loading rather than available EMAS length.

It has been observed that smaller, lightweight aircraft may lack the weight and tire loading necessary for effective engagement with the EMAS during an overrun event. In those situations, rather than the aircraft tires engaging and/or embedding with the EMAS material, they may roll over the EMAS with little or marginal vertical penetration into the material, which can result in reduced effectiveness of that system.

BRIEF SUMMARY

In one aspect, a vehicle arresting system includes a base layer comprising a crushable aggregate and a cover layer comprising a cementitious material having an oven-dry density of 100 lb/ft3 or less. In another aspect, a vehicle arresting system includes a base layer comprising a crushable aggregate and a cover layer comprising a cementitious material having an oven-dry density between about 40 lb/ft3 and about 100 lb/ft3, or between about 40 lb/ft3 and about 90 lb/ft3, or between about 40 lb/ft3 and about 80 lb/ft3, or between about 40 lb/ft3 and about 70 lb/ft3, or between about 40 lb/ft3 and about 60 lb/ft3, or between about 40 lb/ft3 and about 50 lb/ft3.

In another aspect, a vehicle arresting system includes an arrestor bed and a plurality of anchors. Each anchor includes a support rod coupled to an associated puck, each support rod being secured to the safety area pavement underlying the arrestor bed, and each puck being embedded in the cover layer of the arrestor bed. Additionally, each support rod is coupled to its associated puck via a shear linkage designed to break at a predetermined load.

In another aspect a method for arresting a vehicle includes depositing a base layer on a region where the vehicle is to be arrested, the base layer comprising an aggregate, and depositing a cover layer over the base layer, the cover layer comprising a cementitious composition having an oven-dry density of 100 lb/ft3 or less.

BRIEF DESCRIPTION OF THE SEVERAL VIEWS OF THE DRAWINGS

FIG. 5 is an isometric view of a point anchor subassembly for use in an EMAS;

FIG. 6 is a section view of the point anchor subassembly of FIG. 5;

FIG. 7 is a top view of the point anchor subassembly of FIG. 5;

FIG. 8 is a bottom view of the point anchor subassembly of FIG. 5;

FIG. 9 is a side view of the point anchor subassembly of FIG. 5;

FIG. 21 is a flowchart depicting one method for installing an EMAS;

FIG. 29 is a bottom view of another view of a slab section utilized in an EMAS;

FIG. 30 is a section view through line A-A in FIG. 29;

FIG. 31 is a section view through line B-B in FIG. 29;

FIG. 35 is a bottom view of multiple slab sections having differently-sized, circular-shaped waffle portions;

FIG. 36 is a section view of an EMAS having a first type of void between slab and aggregate layers;

FIG. 51 is a section view of an EMAS, illustrating a first method of installing geogrid to the pavement using an adhesive;

FIG. 52 is an isometric view of the pavement and geogrid of FIG. 51;

FIG. 53 is a detail view of the adhesive connection of FIG. 51;

FIG. 56 is an isometric view of a third method of installing geogrid to the pavement using an adhesive;

FIG. 57 is a detail view of the adhesive connection of FIG. 56;

FIG. 58 is an isometric view of a fourth method of installing geogrid to the pavement using an adhesive;

FIG. 59 is a detail view of the adhesive connection of FIG. 58;

FIG. 60 is an isometric view of a fifth method of installing geogrid to the pavement using an adhesive;

FIG. 61 is a detail view of the adhesive connection of FIG. 60;

FIG. 69 is a section view of an EMAS incorporating a lid;

FIG. 70 is a bottom view of on type of lid used in the EMAS of FIG. 69;

FIG. 71 is a bottom view of a second type of lid used in the EMASS of FIG. 69;

FIG. 72 is a detail view of the interface between lid stiffening agents and a support sheet;

FIG. 73 is a detail view of the interface between lid stiffening agents and support props;

DETAILED DESCRIPTION

Figure 1:
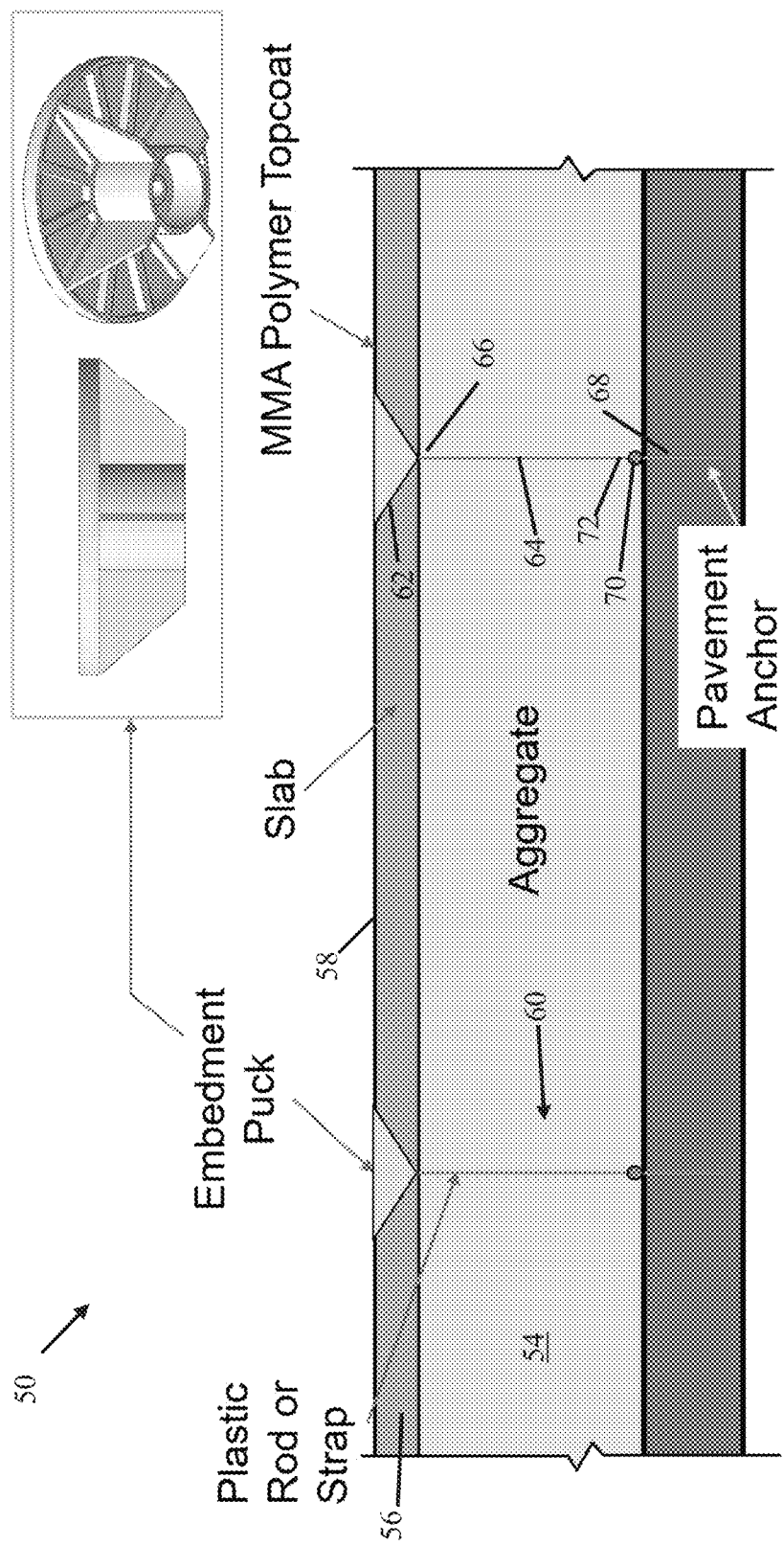
FIG. 1 is a section view of an EMAS including a plurality of point anchors taken perpendicular to a direction of travel.
Figure 2:
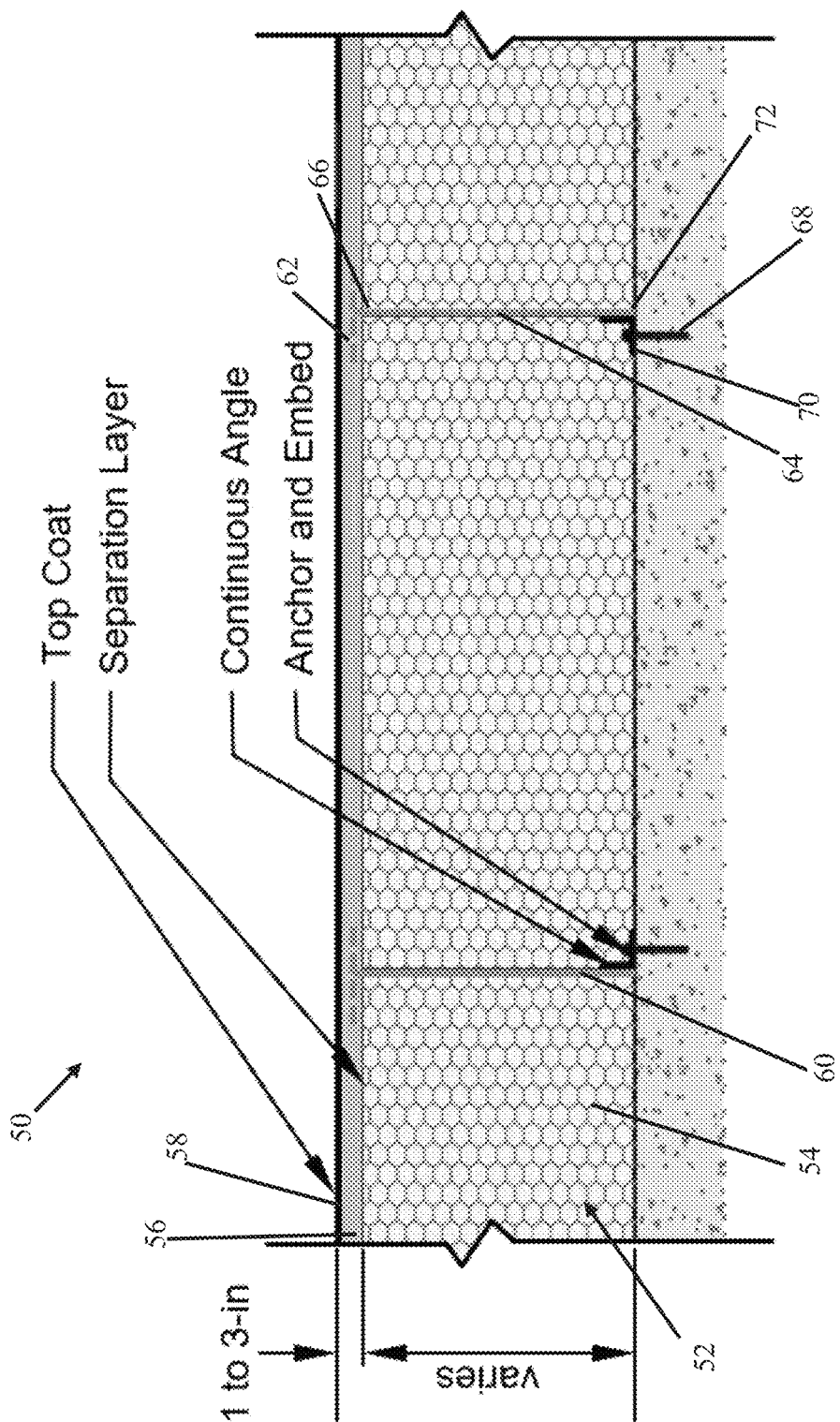
FIG. 2 is a second section view of an EMAS including a plurality of point anchors taken perpendicular to a direction of travel.
Figure 3:
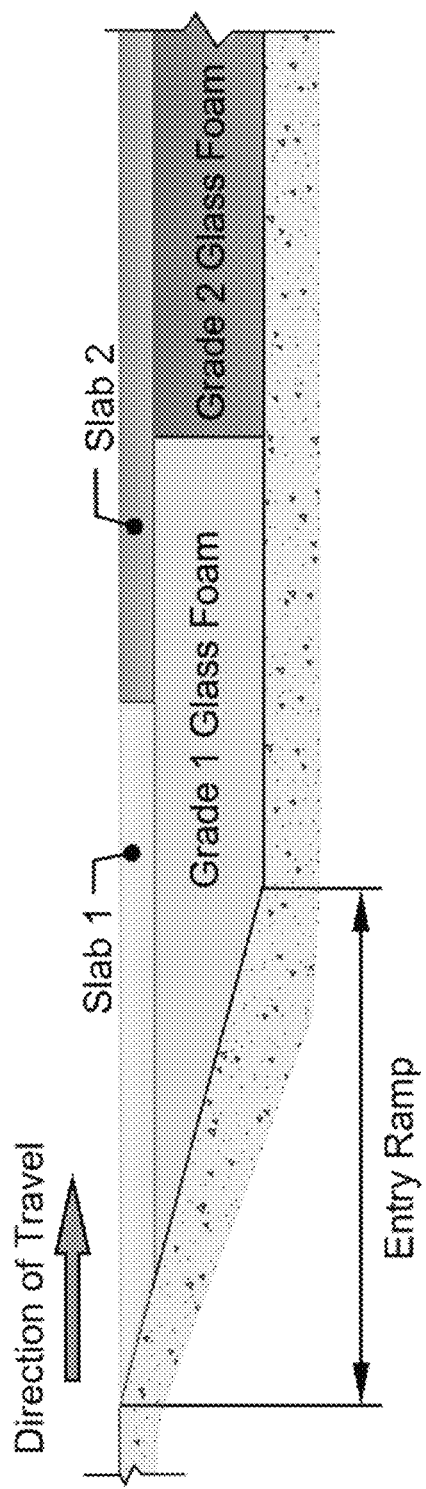
FIG. 3 is a section view of a below-grade basin filled with an EMAS for use with a plurality of point anchors, the section taken parallel to a direction of travel.
Figure 4:
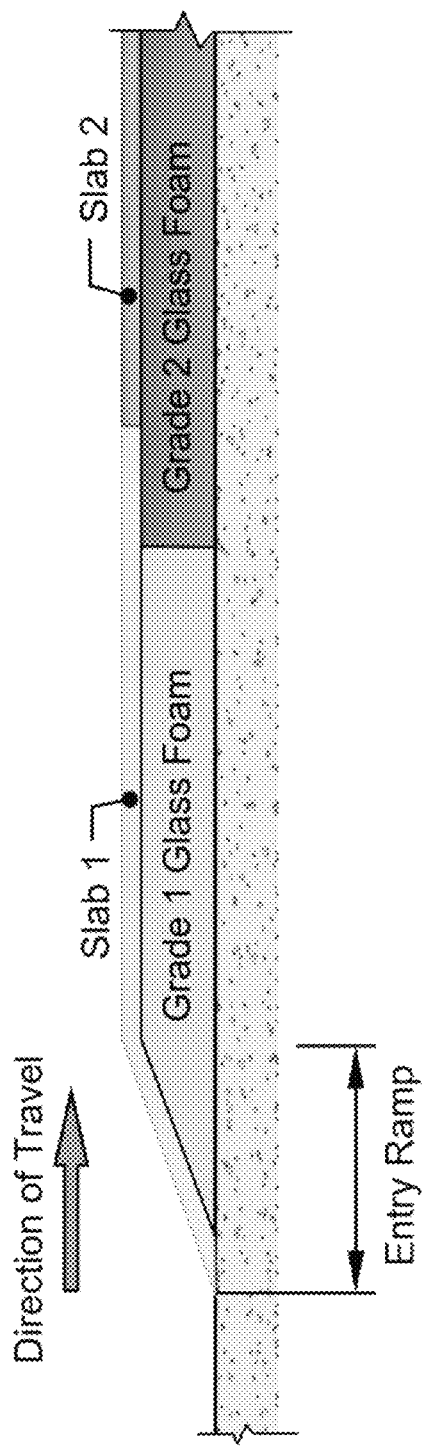
FIG. 4 is a section view of an above-grade embodiment of an EMAS for use with a plurality of point anchors, the section taken parallel to a direction of travel.

In one aspect, as seen in FIGS. 1-4, an engineered material arresting system (EMAS) 50 includes an arrestor bed 52 comprising a basin filled with an aggregate 54, a slab 56 disposed on top of the aggregate 54, and a topcoat 58. The arrestor bed 52 may be a basin that includes portions below-grade of the runway, as seen in FIG. 3. In another aspect, however, some or all of the EMAS may be at or above runway grade, as best seen in FIG. 4. For example, a bottom of the basin may be at runway grade, and there may be an incline, a mound, a ramp, or some similar structure extending above ground to a top of the basin.

Multiple materials may be used for each layer in the EMAS 50, as will be discussed in greater detail below. However, in one aspect, the aggregate 54 may be a glass foam aggregate such as the material available under the trade name Glasopor. The slab 56 may be a controlled low-strength material (CLSM) or a cellular concrete material. The topcoat 58 may be a high friction surface treatment such as methyl methacrylate (MMA) sold under the trademark TRANSPO T-18 or T-28. Alternatively, the topcoat 58 may comprise poly-urea, epoxy, or a sprayed- or poured-on finish.

The aggregate 54 may be a crushable, compactable material. For example, the aggregate 54 may be a glass foam fill with average aggregate sizes between 1 and 3 inches, and with a range of compaction strengths. In one aspect, the glass foam may be, e.g., grade 24 or grade 18 Glasopor, which have crush pressures of 24 psi and 18 psi, respectively. In one aspect, the EMAS bed may use a single aggregate 54 along its length. In another aspect, as seen in FIGS. 3 and 4, a first aggregate may fill a first portion of the bed, and a second, different grade of aggregate may fill a second portion of the bed. For example, the higher crush-strength aggregate may fill an entry portion of the bed. Alternatively, a lower crush-strength aggregate may fill the entry portion of the bed.

The slab 56 may be a low strength material that is configured to fail upon loading by an aircraft tire. One such material is CLSM, which is a particular form of cementitious material that may have a compressive strength between about 200 and about 600 psi, with a density of about 110 to 130 $lb/ft^3$. In one example, CLSM may be made by mixing sand, cement, fly ash, water, admixtures, and fibers. Due to its combined strength and density, CLSM may be well-suited to resisting jet blast uplift forces. At the same time, however, its high density may cause higher inertial loading during overrun, which may increase the forces placed on the aircraft tires that are then transmitted to the landing gear components. In one aspect, a single slab material may be used along the length of the system 50. In another aspect, as seen in FIGS. 3 and 4, a first slab material may fill a first portion of the bed, and a second, different slab material may fill a second portion of the bed. As those figures illustrate, the first slab portion may have a different longitudinal extent along a length of the EMAS than the first aggregate portion. For example, the first slab portion may extend longitudinally a greater distance than the first aggregate portion. In another aspect, the first slab portion may extend longitudinally a shorter distance than the first aggregate portion. In still another aspect, the first slab portion and the first aggregate portion may extend substantially the same longitudinal distance along the EMAS. Additionally, similar variations are possible for subsequent slab and aggregate portions.

In another aspect, the slab 56 may be formed from cellular concrete, which is a lightweight, cementitious material that contains stable air or gas cells uniformly distributed throughout the material, e.g., at a volume greater than 20%. As such, cellular concrete may include about 65% void space, allowing that material to undergo considerable volumetric compaction and energy dissipation, e.g., when being overrun by an aircraft tire. Cellular concrete may be formed, e.g., by mixing water and a foaming agent to generate a preformed foam. That preformed foam then may be mixed with cement and water. Fibers then may be added to the mix to help increase crack resistance and tensile strain capacity. Finally, the mixture may be poured and leveled, just like other cement compositions. The cellular concrete used herein may conform to specifications established by the American Concrete Institute.

Cellular concrete may have a compressive strength of between about 200 psi and about 600 psi, i.e., approximately the same strength as CLSM. At the same time, cellular concrete may be significantly lighter than CLSM, having a density of between about 40 $lb/ft^3$ and about 50 $lb/ft^3$. As a result, an EMAS 50 that incorporates cellular concrete within its slab 56 may have improved exit speed ratings and improved small-aircraft performance as compared to an EMAS that includes solely CLSM as its slab 56 material. Additionally, the use of cellular concrete may surprisingly provide substantially the same compressive strength as other materials such as CLSM, but at a fraction of the density, thereby cutting a weight of the slab 56 by a factor, e.g., of between about 3 and about 3.5.

Use of a slab 56 may dramatically alter the effective strength of the aggregate 54 during an overrun event. In particular, the aggregate 54 exhibits pressure-dependent shear strength behavior similar to that of soil or other geomaterials. By covering that layer, the slab 56 may confine and increase the material strength of the aggregate 54 by providing a dead load that causes mild and constant static overburden, by providing an inertial resistance to vertical aggregate movement and blunting a bow wave of aggregate ahead of a tire during the overrun, and by providing non-inertial resistance to aggregate movement through the flexural strength of the slab. Accordingly, the slab confines movement of the aggregate, increasing hydrostatic pressures and the effective shear strength of the aggregate.

The slab 56 also may dissipate energy during an overrun event through shear failure, as a shear failure line is formed on the inboard and outboard sides of each tire that cuts through the slab 56. The slab 56 also may absorb energy from the tire, as that tire pulls slab material underneath it and crushes that material through mixed-mode fracture and frictional grinding of the pulverized slab material against itself. The slab 56 also may provide inertial resistance to the aircraft tire and absorb momentum proportional to aircraft speed and the displaced slab mass.

Returning to FIG. 1, the EMAS 50 additionally may include a plurality of point anchors 60 configured to assist in retaining the rest of the EMAS 50 in place when subjected to upward forces generated by jet blast and/or to dissipate airplane energy during an overrun or arresting event. A point anchor 60 includes an embedment puck 62 and a strap or rod 64 coupled to the puck 62 at a proximal end 66 and depending, i.e., extending, downwardly from the puck 62. A pavement anchor 68 secures the rod 64 or strap to the pavement underlying the EMAS. For example, a bolt or rivet may secure a mounting plate 70 at a distal end 72 of the rod 64 to the underlying pavement.

Turning to FIGS. 5-9, the embedment puck 62 includes a hub 74 that receives the proximal end 66 of the rod 64 and a cap 76 frangibly coupled to the hub 74. The cap 76 includes an upper surface 78 that, in one aspect, may be substantially smooth. In another aspect, the upper surface 78 may include one or more marks 80 to facilitate breaking of the cap 76 into multiple pieces or to provide relief for post-molding cooling of the puck 62, thereby promoting uniform thickness of the cap 76. The marks 80 may be arranged in a pattern about the upper surface 78. For example, the marks 80 may radiate outward from a central cavity 82 of the upper surface 78 and may be substantially equidistantly spaced in order to divide the upper surface 78 into a plurality of wedges 84. The cap 76 may be substantially circular when viewed from above. Alternatively, the cap 76 may take on various other shapes, such as a triangle, rectangle, pentagon, hexagon, etc.

The point anchor 60 also may include a top plug (not shown) that covers some or all of the cap 76. In particular, the top plug may be configured to cover at least the central cavity 82 of the cap 76, thereby covering the nuts holding the puck 62 in place and preventing cover layer slurry, dirt, water, or other foreign body intrusion into the central cavity 82. The top plug in one aspect may be installed prior to pouring of the slab 56 and/or application of the topcoat 58, thereby preventing intrusion of slab slurry and/or topcoat materials into the central cavity 82.

The cap 76 also may include an underside 86 interrupted by a plurality of radial stiffeners 88. The stiffeners 88 may be equidistantly spaced around the puck and may extend radially from the hub 74 to an outer periphery 90 of the puck 62. Each stiffener 88 may extend downwardly from the underside 86 a greater longitudinal distance proximate the hub 74 than the outer periphery 90. For example, each stiffener 88 may be approximately triangular, with the hypotenuse 92 connecting the outer periphery 90 to the hub 74. The stiffeners 88 may take on other shapes, including, e.g., having a concave or convex edge replacing the hypotenuse, as would be appreciated by one of ordinary skill in the relevant art.

As seen in FIGS. 5 and 6, one or both of the hub 74 and the central cavity 82 may include an opening configured to receive the rod 64. For example, the rod 64 may include external threading 94, and the hub 74 and/or the central cavity 82 may include internal threading. Alternatively, the hub 74 and/or central cavity 82 may be configured to receive one or more nuts 96, the nuts 96 having threading 98 for engaging the threading 94 on the rod 64. For example, the hub 74 and/or central cavity 82 may be molded to have a hexagonal shape or another shape matching that of the nuts 96 or otherwise preventing rotation of the nuts 96 relative to the hub 74 and/or central cavity 82. The system may include a pair of nuts 96a, 96b disposed within the hub 74, proximate the cap 76 and a third nut 96c spaced from the first two nuts 96a, 96b and disposed proximate a bottom of the hub 74. A washer 100 may be disposed between the pair of nuts 96a, 96b and the third nut 96c, the washer 100 resting on a flange 102 formed within the hub 74. As such, the washer 100 and nuts 96a, 96b may be inserted into the hub 74 from the top, through the central cavity 82, and the nut 96c may be inserted into the hub 74 from the bottom. The washer 100 may be compressible in order to accommodate thermal expansion and compression of the point anchor components, including the rod 64.

Figure 11:
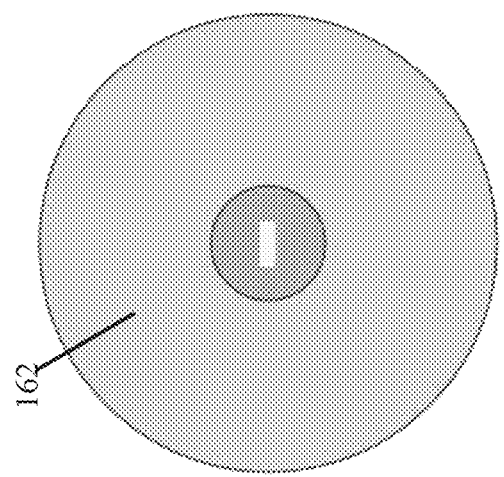
FIG. 11 is a top view of the point anchor subassembly of FIG. 10.
Figure 10:
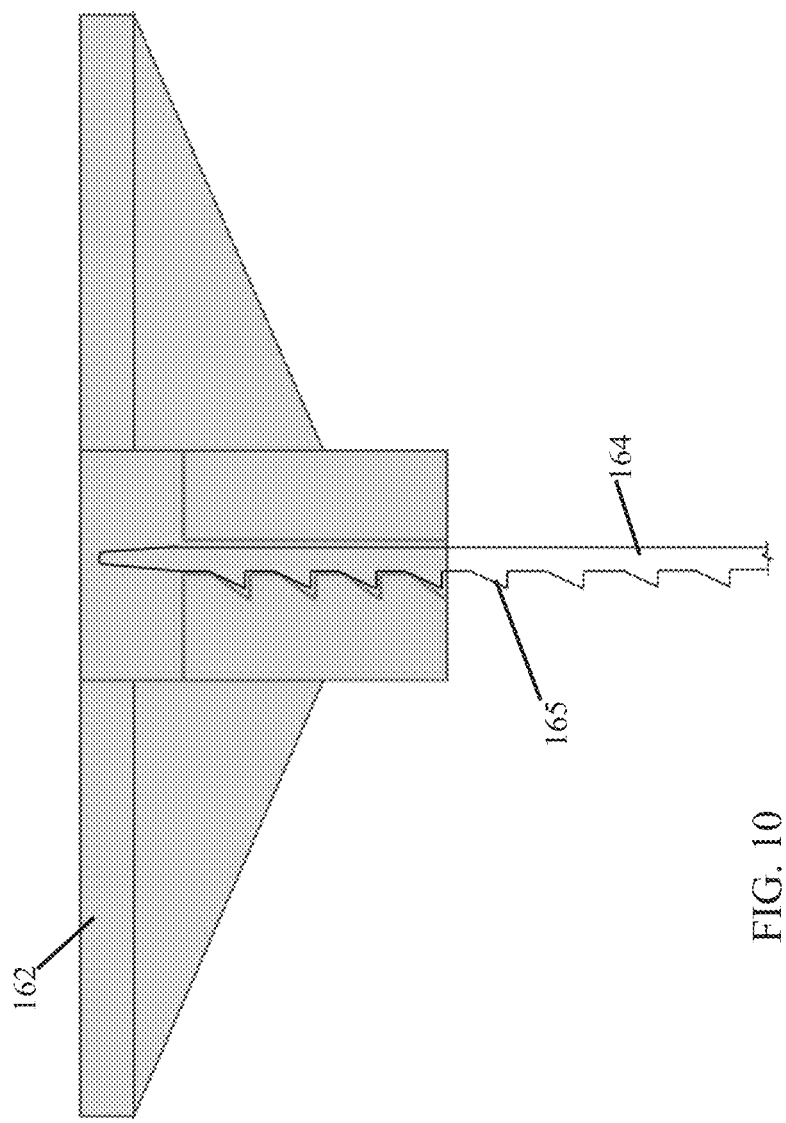
FIG. 10 is a section view of another embodiment of a point anchor subassembly.

In another aspect, instead of a threaded connection, the rod 164 may include a plurality of teeth 165, and the puck 162 may include or be operatively coupled to a ratchet configured to slide along the teeth, similar to a zip tie-type connection, as best seen in FIGS. 10 and 11. In the event the puck 162 is depressed too far, the ratchet may include a release mechanism that disengages the ratchet from the teeth, thereby permitting the puck 162 to be reversed in direction along the rod 164. Such a connection may permit rapid installation of a plurality of pucks 162 while also preventing vertically upward displacement of the pucks 162 during normal jet blast uplift due to the one-way nature of such connectors.

Figure 12:
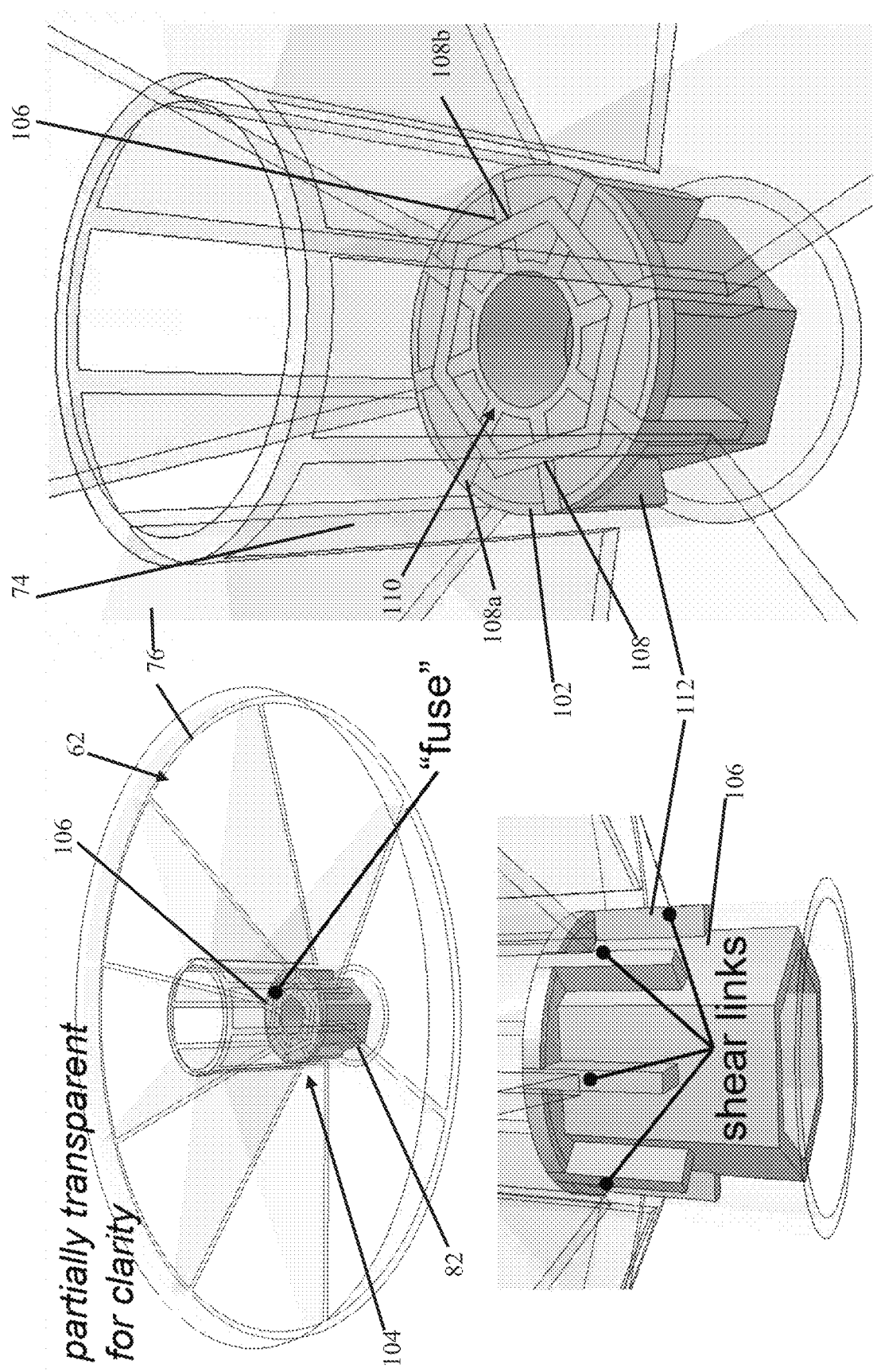
FIG. 12 is a series of isometric detail views of a break-away or frangible fuse within a point anchor subassembly.
Figure 13:
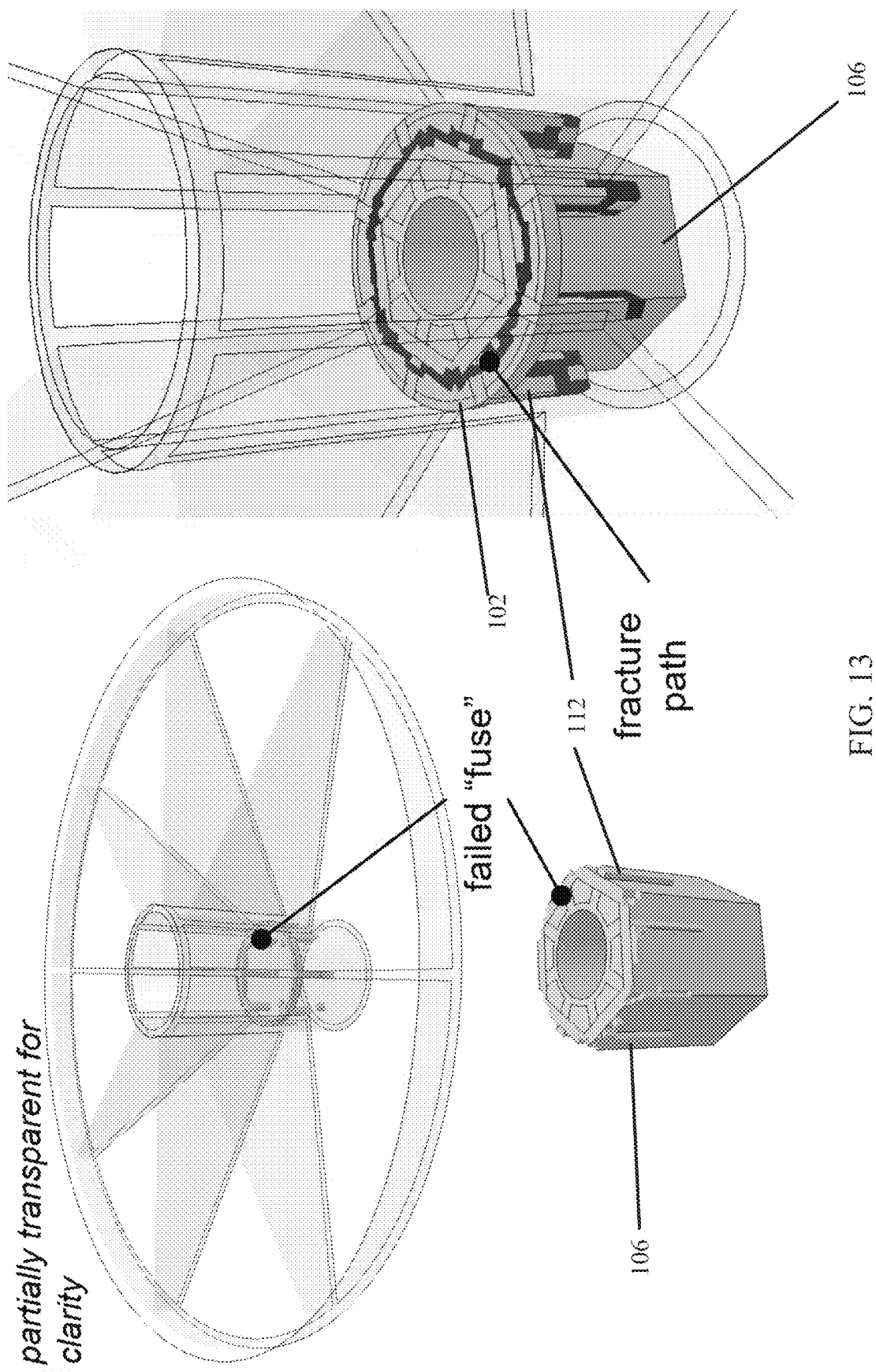
FIG. 13 is a series of isometric detail views of a break-away or frangible fuse within a point anchor subassembly depicting failure of the fuse along an engineered fracture path.

Turning now to FIGS. 12 and 13, and with reference to the puck of FIGS. 5-9, the puck 62 further may include an intentional weak link 104, which may take the form of a fuse 106 at the center of the puck 62. The fuse 106 may be formed within the hub 74 or the central cavity 82 and may include a plurality of shear links or ribs 112 spaced about a periphery of the fuse 106 and extending longitudinally along at least a portion of the length of the fuse 106 for facilitating separation of the rod 64, nuts 96, and washers 100 from the hub 74.

The puck 62 and other elements of the point anchors 60 may be sized according to the loads to which they are expected to be exposed. For example, the strength of the slab 56 may drive the sizing of the puck 62. In one example, the slab 56 may have a strength of about 200 to 600 psi. When accounting for a factor of safety, the cap 76 of the puck 62 then may have a diameter between about 4 inches and about 12 inches, or between about 4 inches and about 8 inches, and in one aspect, about 6 inches. Relatedly, a lower slab strength may require the use of larger pucks 62.

The puck 62 also may have a height between about 1 inch and about 6 inches, or between about 1 inch and about 4 inches, and in one aspect, about 2 inches. Between about ¼ inch and 1 inch of that height, or between about ½ inch and 1 inch of that height, or in one aspect, about ⅝" of that height may correspond to a portion of the hub 74 free from stiffeners 88. Moreover, the wedges 84, stiffeners 88, the hub 74 all may have a substantially different or similar thickness. For example, each of those components may have a thickness of about 1/32 inch to ¼ inch, or in one aspect, about 1/16 inch, although other thicknesses for one or more of the components may be possible, e.g., depending on the size of the remainder of the puck 62, the number of pucks 62 in an installation, the design load, etc.

The rod 64, nuts 96, and washer 100 may be selected based on the common availability of such components. For example, the rod 64 may have a threaded diameter of about ¼ inch to ½ inch, or in one aspect, about ⅜ inch, and the nuts 96 and washer 100 similarly may having internal diameters of about ¼ inch to ½ inch, or in one aspect, about ⅜ inch. The rod 64 and nuts 96 also may have similar thread counts, e.g., 16 to 24 threads per inch, in order to successfully couple to one another.

In still another aspect (not shown), the puck 62 may be molded with internal threads as a unitary structure, thereby eliminating one or more of the plurality of nuts 96 and/or the washer 100.

In the event of an airplane overrun, the airplane tires likely will come in direct contact with one or more of the point anchors 60. Thus, the point anchor 60, with the exception of the pavement anchor 68 and the mounting plate 70 preferably are formed from non-metallic materials, so as to prevent punctures, cutting, or other damage to the tires. At the same time, the point anchor 60, and the puck 62 in particular, preferably are rigid enough to withstand jet blast forces under normal conditions without deforming plastically or failing. Thus, in one aspect, the puck 62 may be a non-ductile injection molded glass filled nylon, such as a 33% glass filled nylon having a fracture stress $f_u$ of about 21,000 psi and an ultimate strain $\varepsilon_u$ of about 4.5%. For example, the puck 62 may be made of a 70G33HSIL NC010 nylon sold by DuPont under the trademark ZYTEL. Other suitable materials include, but are not limited to, plastic polymers that are relatively stiff, including, e.g., natural acrylonitrile butadiene styrene (ABS), glass filled ABS, natural polypropylene, glass filled polypropylene, and high density polypropylene (HDPE).

Figure 14:
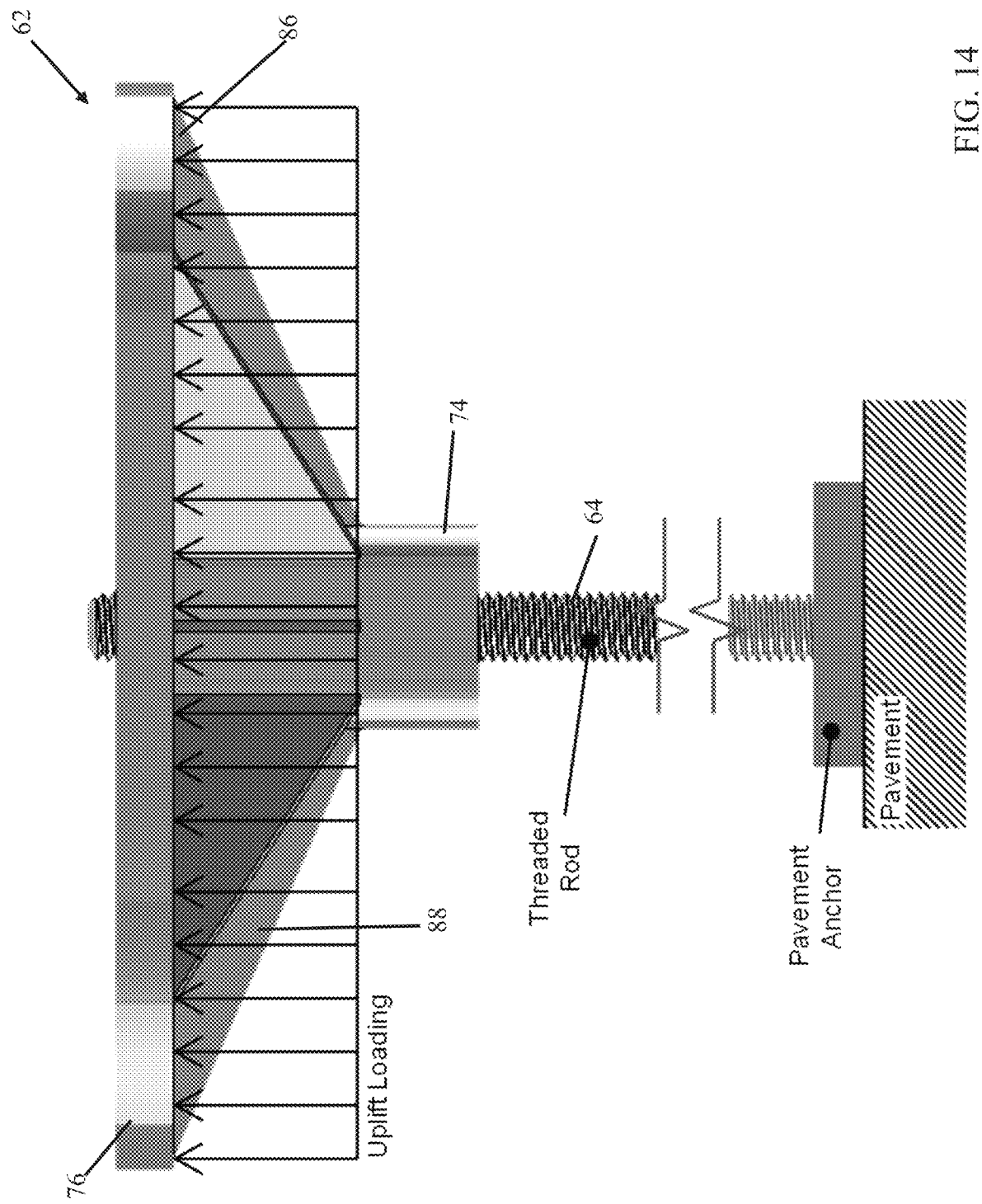
FIG. 14 is a side view of the point anchor subassembly of FIG. 5 also depicting distributed upward loading forces caused by slab uplift loads from aircraft jet blast.

Similarly, the rod 64, nuts 96, and washer 100 also may be made of non-metallic materials. The rod 64 may be high-strength fiberglass, the nuts 64 also may be fiberglass, and the washer may be made of nylon. Other materials, including other plastic polymers, may be used for each of these components, as well as for the puck 62, as would be appreciated by one of ordinary skill in the relevant art, provided those materials cause the point anchor 60 to behave as follows under different loading conditions:

Under normal service operation, the loads from a top surface of the cover slab 56 may be transferred to the underside 86 of the puck 62, which is embedded in the slab 56, due to the cap 76 bearing against the top face of the slab 56. Bearing forces may be idealized as a uniformly distributed load, as shown in FIG. 14, and that load may be transferred to the rod 64 through the stiffeners 88 and the hub 74. During normal operation, each puck 62 may be configured to withstand an uplifting force caused by jet blast of about 750 to about 3000 lbs, and in one aspect, about 1,500 lbs. Thus, the system 50 may include a plurality of point anchors 60 in order to distribute the jet blast force and to keep the maximum loading on any one point anchor 60 at or below the load threshold. For example, a greater number of point anchors 60 may be disposed along an edge closest to and perpendicular to the runway or taxiway, since the largest jet blasts may be experienced there. In another example, a plurality of point anchors may be disposed in a grid of substantially perpendicular rows and columns, a grid of staggered rows and/or columns in which adjacent row or column elements are offset from one another rather than being inline, or some other generally uniform distribution.

Figure 15:
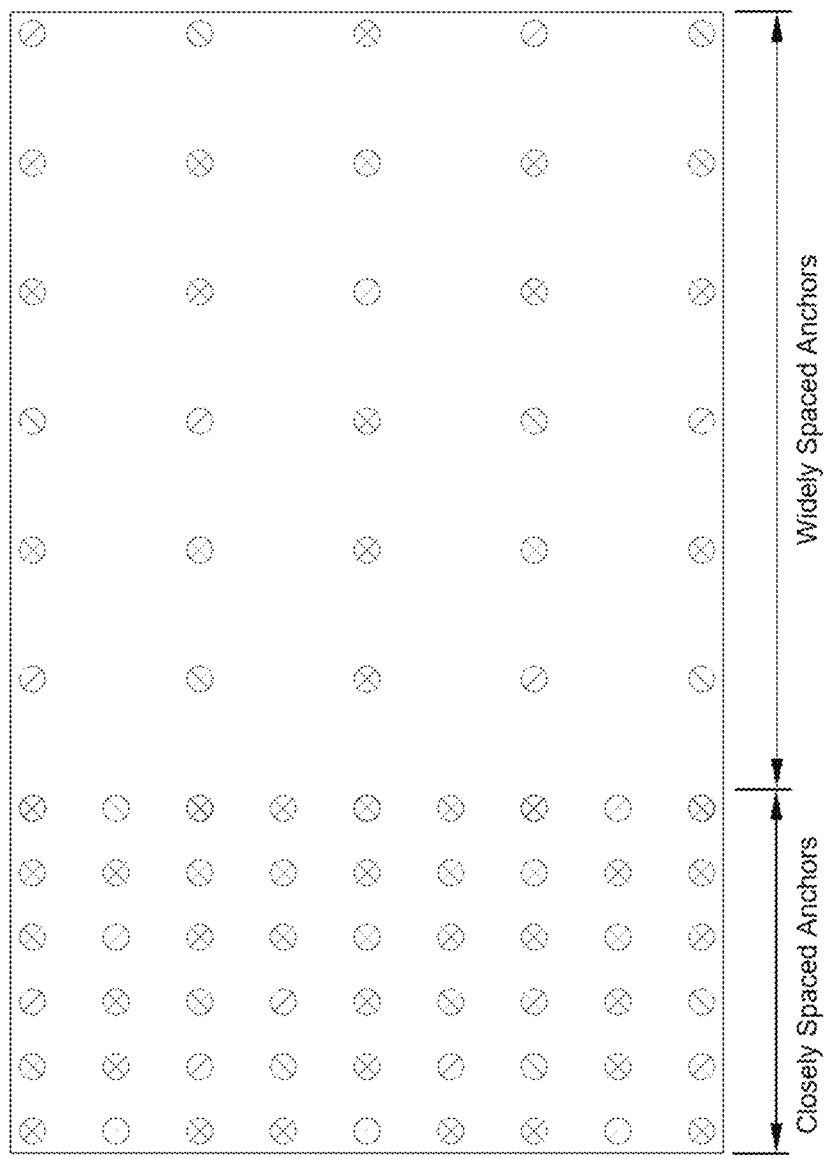
FIG. 15 is one depiction of a top view of an EMAS divided into a plurality of zones having different anchor configurations.
Figure 16:
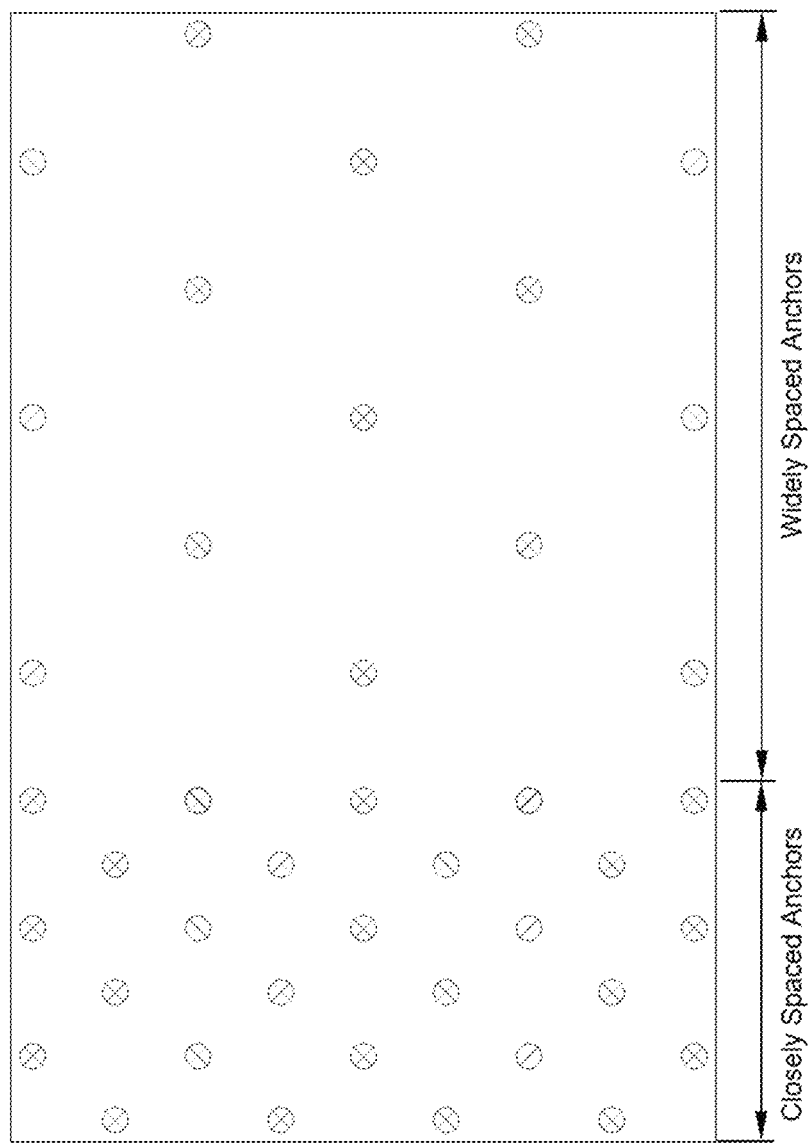
FIG. 16 is a second depiction of a top view of an EMAS divided into a plurality of zones having different anchor configurations.

In still another example, as seen in FIGS. 15 and 16, the bed may be divided into a plurality of zones alternating between closely anchored and widely anchored zones. The anchors in both zones in FIG. 15 are arranged in a square grid of aligned rows and columns. In contrast, the anchors in both zones in FIG. 16 are arranged in a diamond pattern, whereby successive rows and/or columns of anchors are offset from one another. It will be appreciated that an EMAS may include both square and diamond grid layouts, as well as other arrangements of point anchors.

Additionally, in both figures, a first zone nearest an end of the runway includes anchors more closely spaced than in a successive second zone, although it will be appreciated that the arrangement of zones may be reversed. It also will be appreciated that an EMAS may include more than two zones of varying arrangements, where the zones may be of equal or unequal lengths.

Spacing between point anchors 60 may be determined by the sizing of the anchors, the characteristics of the EMAS arrestor bed (e.g., a thickness of a slab cover), and the uplift loads that may be generated by the design fleet of each individual airport, e.g., smaller airports may not require the point anchors 60 to be as closely spaced since smaller aircraft normally generate less upward lift.

In one aspect, a spacing of between about 2.0 feet and about 6 feet, or between about 2.5 feet and about 5 feet, between point anchors 60 may be sufficient. In another aspect, the spacing may vary based on distance from the jet blast. For example, the bed may be divided into multiple zones, with the zones closer to the jet blast having pucks 62 that are more closely spaced than zones spaced further from the jet blast. In a specific example, the bed may be divided in half, with the half closer to the jet blast having pucks 62 spaced about 2.5 feet apart and the half further from the jet blast having pucks 62 spaced about 5 feet apart.

Figure 18:
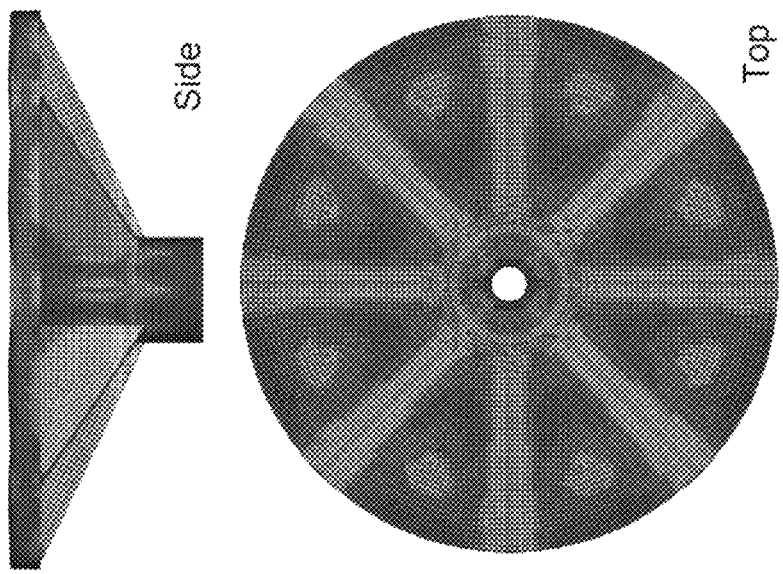
FIG. 18 is a finite element fringe plot representing the Von Mises stresses of the puck of FIG. 14 during the same loading.
Figure 17:
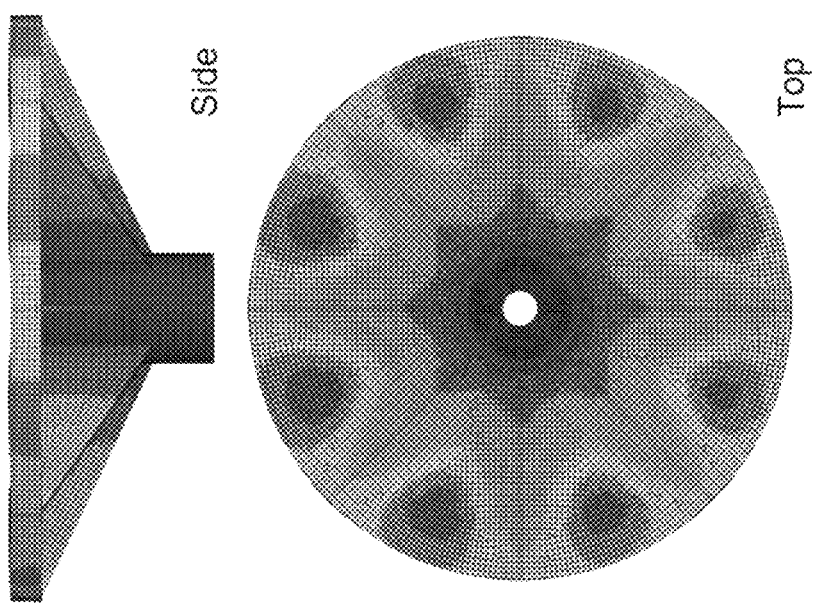
FIG. 17 is a finite element fringe plot representing deflections within a puck component of a point anchor subassembly is subjected to 1,500 pounds of upload force.

FIG. 17 depicts a fringe plot representing deflections within the puck 62 when subjected to a 1,500 lbf upload force. Peak displacements occur between the stiffeners 88 proximate the outer periphery 90 of the puck 62 and are less than 0.1 inch. Such displacement levels may be considered negligible and further may represent elastic deformations, such that they may not have any negative impact on the serviceability performance of the EMAS 50 nor degradation of the embedment puck 62 itself. FIG. 18 depicts the stresses on puck 62 during the same loading. Stresses are generally under 10,000 psi, with a peak stress of less than about 16,000 psi, both of which are well below the design limit of about 21,000 psi. Thus, under normal service operation, the puck 62 resists the upload forces associated with typical jet blast loads while remaining relatively undeformed. Similarly, stresses are low enough that deformations may be elastic and, thus, the deformations are completely reversible once loading is removed.

Under extreme uplift loading conditions, the puck 62 is configured to break and fail at one or more predetermined locations when a predetermined load amount is reached. For example, the puck 62 may fail at the fuse 106, and specifically at one or more of the ribs 112. Those elements may remain essentially undeformed until failing in shear once they are overloaded. As such, the fuse 106 may separate from the rest of the puck 62, e.g., along the fracture path depicted in FIG. 13. Due to the factor of safety built in to the puck as a result of its design and choice of materials, fracture may not occur until the puck 62 experiences an uplift load about 65% greater than the standard operating load. Thus, as a result of failing at a predetermined location, inspection of pucks 62 for overloading and subsequent replacement or repair may be simplified.

In addition to failing at the fuse 106, the point anchor 60, by way of material choice and design, may be configured to fail at one or more additional locations, although such failure may occur at higher loads than the failure load of the fuse 106. Such additional failure modes may include: 1) punching failure of the topcoat 58 and/or slab 56 by the puck 62 in the vicinity of the puck 62; 2) stripping of the threads 94, 98 of one or both of the rod 64 and the nuts 96; 3) fracturing of the rod 64; and 4) pulling-out failure of the pavement anchor 68 that attaches the point anchor 60 to the underlying pavement. The EMAS 50 preferably employs a balanced design, such that these failure modes are generally listed in increasing order of the loading required to cause such failures. Thus, as can be seen, failures of the point anchor 60 proximate a top of the EMAS 50 are more likely to occur first, which again simplifies inspection and repair since those failed elements can be replaced without having to remove all of the aggregate 54, slab 56, and topcoat 58 around the point anchor in order to reach the pavement where the anchor 68 has pulled out.

Figures 19, 20:
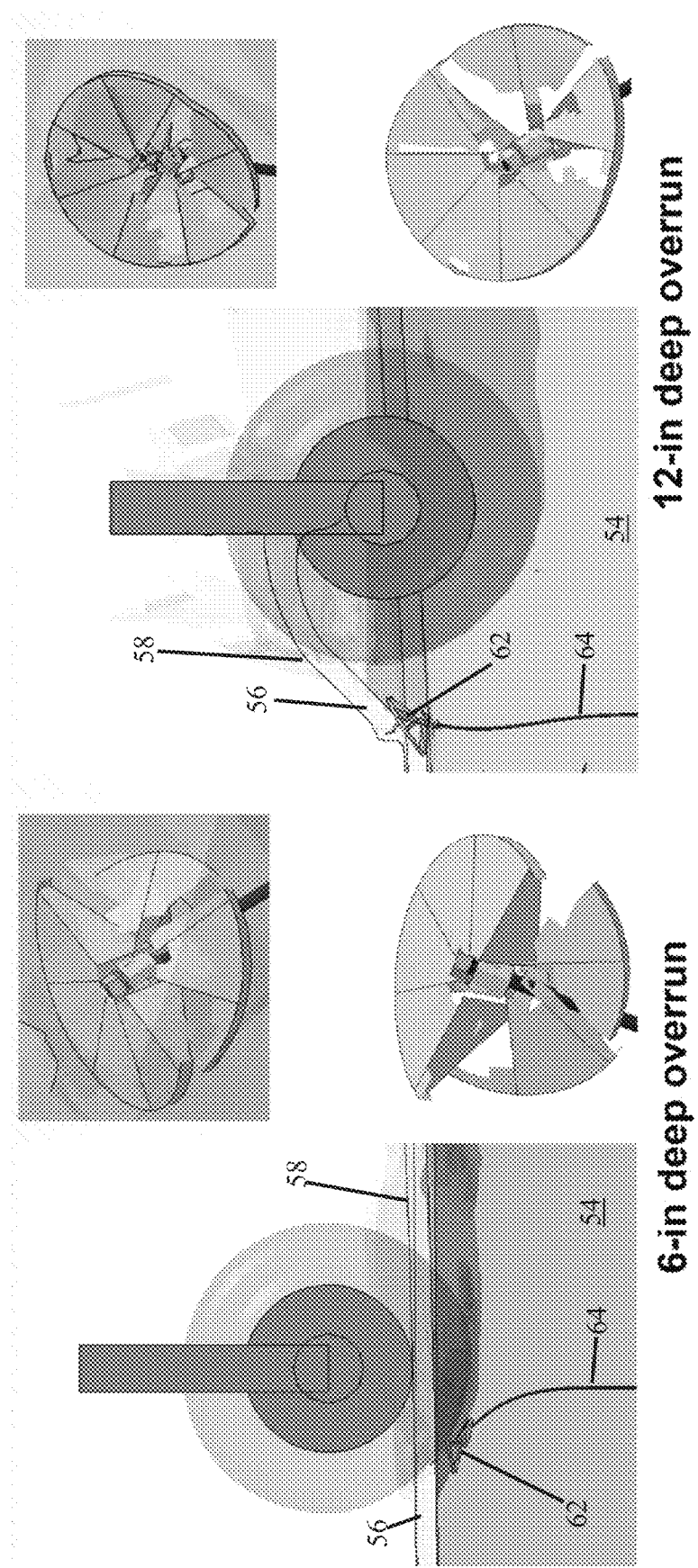
FIG. 19 is a finite element depiction of an overrun simulation in which an airplane tire penetrates the EMAS by 6 inches.
FIG. 20 is a finite element depiction of an overrun simulation in which an airplane tire penetrates the EMAS by 12 inches.

Under airplane overrun conditions, the point anchor 60 is configured to deflect away from the airplane tire and/or to fracture at one or more locations. For example, FIGS. 19 and 20 depict the results of two finite element overrun simulations in which an airplane tire penetrates the EMAS 50 by 6 inches and 12 inches, respectively. From those simulations, it can be seen that the point anchors act as breakaway elements during an overrun event and do not cause damage to the tires that run over them. In the shallower overrun event of FIG. 19, the puck 62 is displaced forward by the tire, while staying connected by the rod 64. Eventually, the puck 62 fractures at the fuse 106, while the cap 76 further fractures at multiple locations, including along the score marks 80. Similar failure modes are seen for the deeper overrun event of FIG. 20. In that latter event, it also will be seen that the tire displaces the aggregate and slab 56, forcing the slab 56 vertically upward. That displacement may apply sufficient uplift to cause fracturing of the fuse 106 even before being contacted by the tire. Thus, the cap 76 may provide little to no resistance to the tire, further reducing the likelihood that the cap damages the tire. As such, it may be understood that a primary focus of the point anchor 60 is to keep the aggregate 54 and slab 56 in place, while the goal of slowing down the airplane in an overrun event is handled mainly by the aggregate 54 and slab 56.

In another aspect, one of the nuts 96 may be metallic. Alternatively, the puck 62 may include an embedded metallic component, while remaining primarily non-metallic. As such, it may be possible to locate the point anchors 60 using a metal detector, even when covered by the slab 56 and/or the topcoat 58.

The usage of point anchors 60 in the EMAS 50 may ease construction of the arrestor bed, including generating time savings during installation and repair. Without having to work around geogrid sections already installed in the bed, the filling, compacting, and leveling of the aggregate 54 in the current system and method may occur more quickly than in previous installations and ultimately may result in a slab 56 having a more uniform thickness to provide more consistent arresting characteristics. Additionally, rather than having to excavate large sections of the arrestor bed, full replacement of a point anchor 60 may only require excavating a small area in order to reach the anchor 68 at the bottom of the bed. Still further, if the rod 64 remains intact but the puck 62 fractures in one or more locations, it may be possible to replace just the puck 62 without any excavation or by only excavating a few inches of the bed. Such time savings may be particularly important when applied to busy runways that cannot remain closed for long periods of time. Moreover, because the puck 62 may be embedded underneath the topcoat 58, it may be possible to drive snow removal equipment over the EMAS 50 without causing damage to any of the pucks 62, thereby maintaining the integrity of the EMAS 50.

Additionally, the use of the point anchors 60 in the EMAS 50 may improve the performance of the EMAS during overrun events. Arrestor beds that employ the point anchors 60 may have a uniform arresting performance, regardless of a rolling direction of the aircraft tires.

Turning to FIG. 21, the following method 200 may be employed to install the EMAS 50 at the end of a runway. The method 200 may include securing 202 the point anchors 60 to the pavement or other base of a bed, e.g., through the use of a pavement anchor 68 passed through a mounting plate 70 at a distal end 72 of the rod 64 and then embedded in the pavement or base. Before or after the securing 202 step, the method 200 also may include securing 204 the rod 64 to the point anchor 60. Additionally, the method 200 may include filling 206 the bed area with aggregate 54. The method 200 also may include adjusting the puck 62 relative to the rod 64, e.g., by rotating it along the threading to raise or lower it, until a desired puck position is reached.

After the filling 206 of the bed area with the aggregate 54, the method 200 includes compacting 208 and leveling 210 the aggregate 54 until a desired height is reached. As a result of the compaction, the aggregate may become divided into a plurality of horizontal layers generally stacked one above the other. For example, the aggregate may include a first section and a second section, where the first section is disposed below the second section, and the second section is in contact with a separation layer installed above the aggregate. The second section may be better compacted, such that it may be denser than the first section.

After that, the method 200 may include installing 212 the separation layer to prevent intrusion of slab slurry into the aggregate. In one aspect, the separation layer may be a geotextile fabric, although other separation layer materials may be employed, such as a polypropylene plastic sheet, as would be appreciated by one of ordinary skill in the relevant art. The method 200 may further include coupling 214 the puck 62 to the proximal end 66 of the rod, e.g., through use of the threading 94, 98, the nuts 96, and the washer 100. Optionally, the method 200 also may include attaching 216 a top plug over the puck 62.

Following the installing step, the method 200 may include pouring 218 slab material 56 onto the bed. The slab material may be in the form of a cementitious slurry, such that it may flow underneath the embedment puck 62 as it is poured, filling in the spaces between the stiffeners 88. The method 200 then may include screeding 220 or otherwise leveling the slab such that the slab is at or above the upper surface 78 of the puck 62. For example, the slab 56 may be poured to a height that substantially covers the puck 62, such that the puck 62 is embedded within the slab 56.

In one aspect, the slab 56 may comprise a single material such as cellular concrete or CLSM. In another aspect, the slab 56 may comprise multiple materials such as cellular concrete and CLSM. In this latter aspect, the multiple materials may be poured as multiple zones within the EMAS 50. For example, CLSM may be used to form the portion of the slab 56 closest to the runway, i.e., an entry portion of the EMAS 50, and the cellular concrete may be used to form the portion of the slab 56 farthest from the runway. In another aspect, the multiple materials may form alternating zones perpendicular to the direction of the runway. Still other slab configurations employing multiple materials may be possible.

After the slab 56 has cured sufficiently, the method 200 may include overlaying 222 the topcoat 58 to produce a finished EMAS 50.

The rod 64 may be sufficiently rigid that it may remain substantially vertical under its own weight after being secured to the underlying pavement or base of the bed. In another aspect, a support sleeve may be placed around the rod 64 in order to position it vertically. After the aggregate 54 is placed, the sleeve may be removed, leaving the rod 64 in the desired final location. In this alternative, the puck 62 may not be coupled to the rod 64 until after the sleeve is removed.

Figure 22:
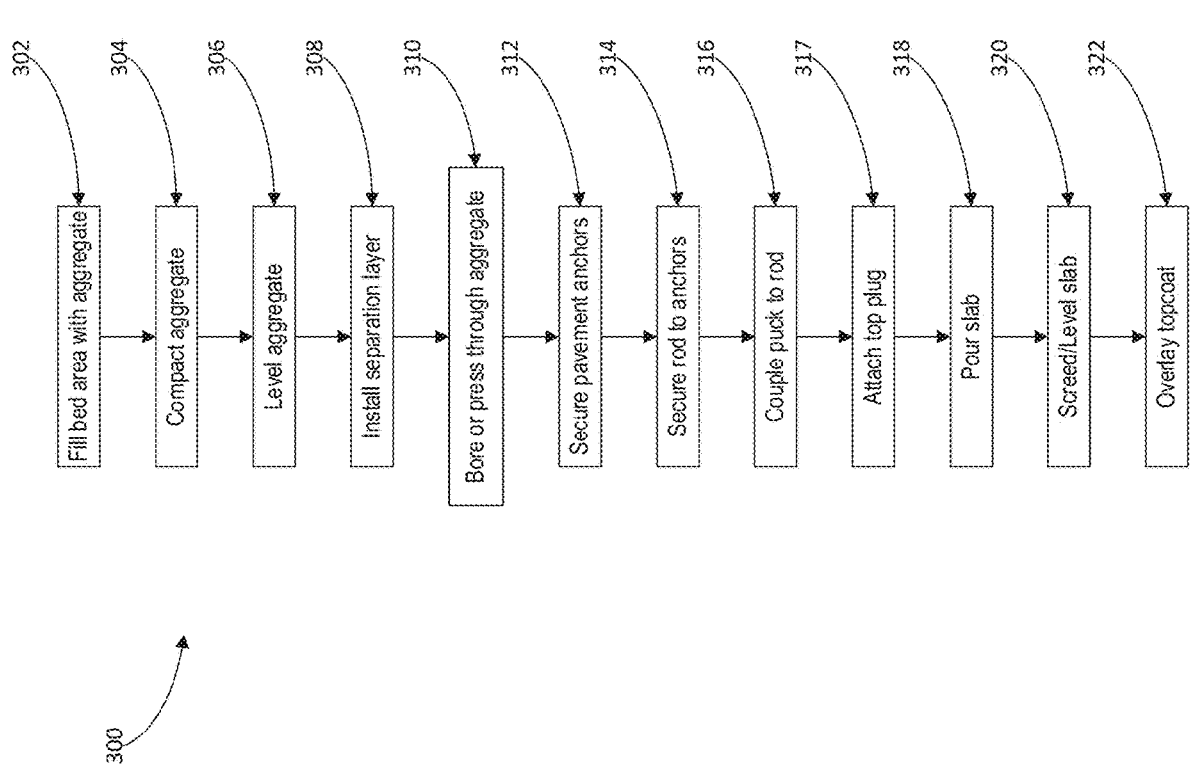
FIG. 22 is a flowchart depicting a second method for installing an EMAS.

In an alternative embodiment, as seen in FIG. 22, the method 300 may include filling 302 the bed area with the aggregate 54, then compacting 304 and leveling 306 the aggregate 54, and installing 308 a separation layer. The method 300 next may include boring or pressing 310 through the aggregate to the foundation of the bed, followed by securing 312 the pavement anchors 68 to the underlying pavement or base of the bed, e.g., joining the rod to the pavement anchor using a coupler, and securing 314 pavement anchors 68 to their respective rods 64. The method 300 also may include coupling 316 the puck 62 to the proximal end 66 of the rod, e.g., through use of the threading 94, 98, the nuts 96, and the washer 100, such that an underside 86 of the puck 62 rests on or just above the top of the aggregate 54. Although shown as following the securing steps 312, 314, the coupling step 316 alternatively may precede either or both of those securing steps. In either event, the method 300 also may include adjusting the puck 62 height relative to the rod 64, e.g., by rotating it along the rod threading to raise or lower it, until a desired puck height is reached. Optionally, the method 300 also may include attaching 317 a top plug over the puck 62.

The method 300 then may include pouring 318 slab material 56 onto the bed. The slab material may be in the form of a slurry, such that it may flow underneath the puck 62 as it is poured, filling in the spaces between the stiffeners 88. The method 300 then may include screeding 320 or otherwise leveling the slab such that the slab is at or above the upper surface 78 of the puck 62. For example, the slab 56 may be poured to a height that substantially covers the puck 62, such that the puck 62 is embedded within the slab 56.

After the slab 56 has cured sufficiently, the method 300 may include overlaying 322 the topcoat 58 to produce a finished EMAS 50.

Figure 23:
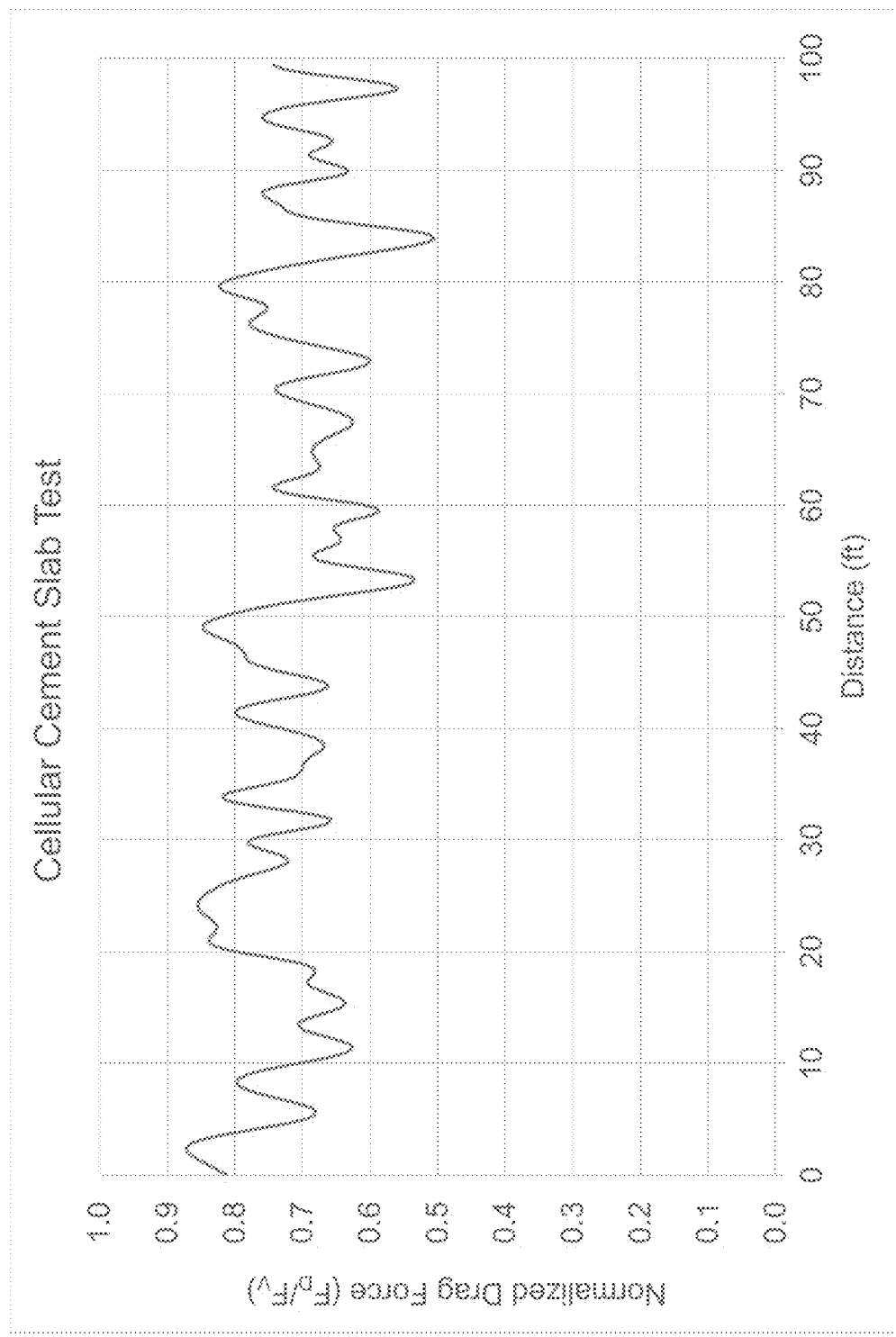
FIG. 23 is a graph of normalized drag force versus distance for one example of the present EMAS.

Turning now to FIG. 23, one example of the normalized drag force versus distance is depicted for a physical test involving an aircraft tire traveling through an EMAS bed with a cellular concrete cover layer. As seen in that figure, the normalized drag force tends to decrease as the aircraft travels through the EMAS as a function of speed during the test. That normalized force also remains generally between 0.5 and 0.9, indicating that the aircraft tire experiences generally constant drag loading, and further indicating the absence of any extreme loading effects.

Figure 24:
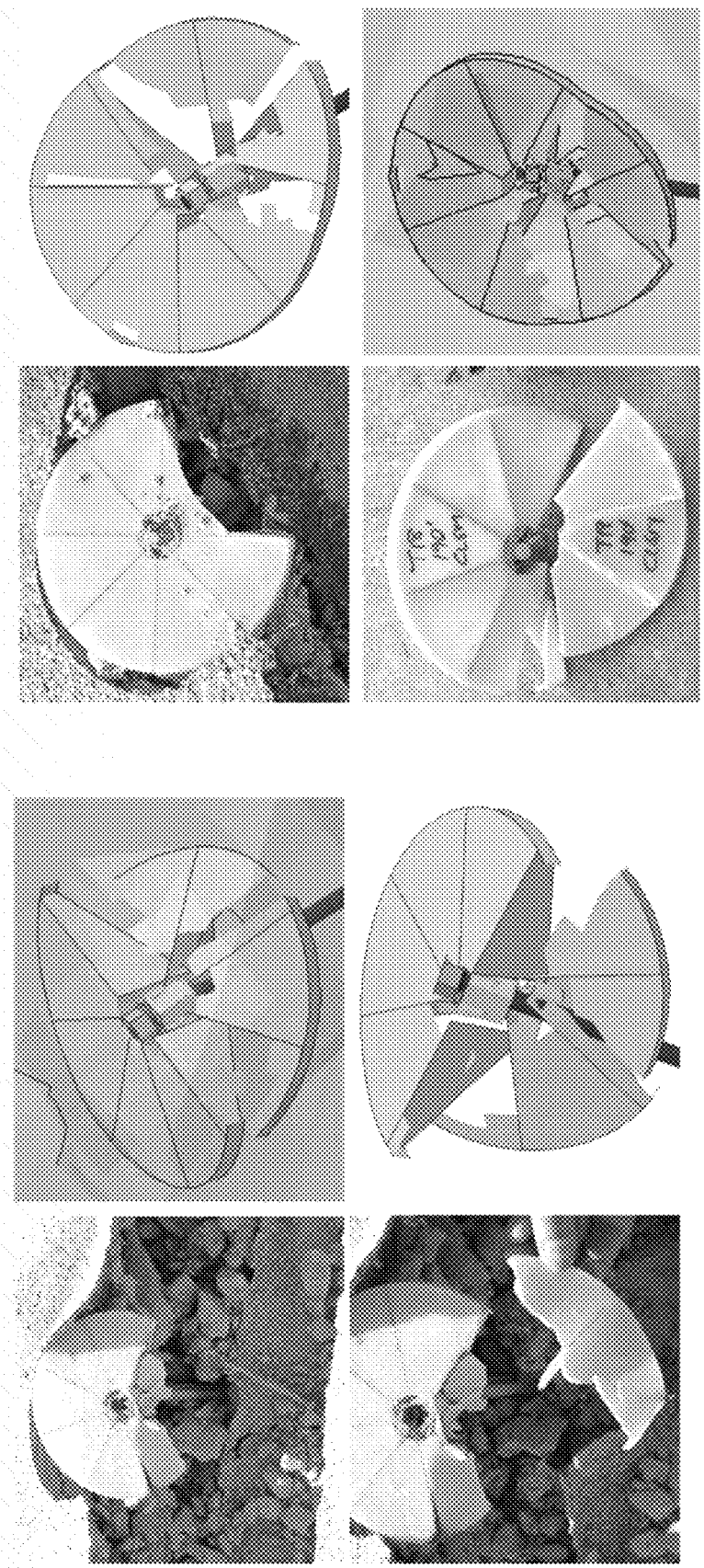
FIG. 24 depicts several examples of actual versus predicted failure modes of a puck utilized in an EMAS.

FIG. 24 depicts several examples of actual versus predicted failure modes of the puck 62, when those pucks were embedded in an EMAS of the sort described herein and were exposed to an aircraft tire traveling through the EMAS as would be likely during an overrun event. As the figure illustrates, the pucks failed at various points along the cap 76. While not shown in this figure, none of the pucks 62 damaged or otherwise harmed the test tire.

From this testing, it can be observed that point anchors 60 are usable with both cellular concrete and CLSM as the slab material. Also, those point anchors 60 are much easier to work with than geogrid, providing ease and rapidity of installation, good breakaway performance, and a lack of apparent aircraft tire damage.

Turning now to FIGS. 25-34, additional variants to the slab portion of the EMAS are contemplated. In particular, the underside of the slab may be specifically configured to include voids between the aggregate and the overlying slab. Each of the variants described herein may be employed with the various aggregate configurations discussed above, or they may employed on top of other aggregates as would be appreciated by those skilled in the relevant art.

Figure 25:
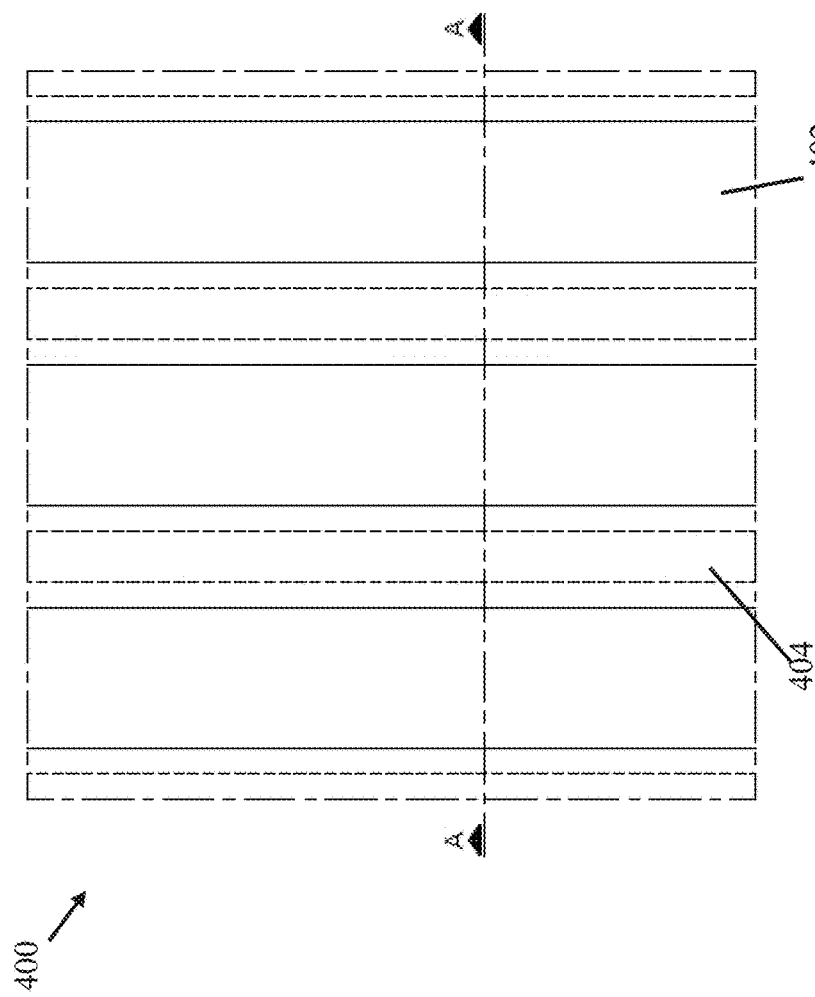
FIG. 25 is a bottom view of one view of a slab section utilized in an EMAS.
Figure 26:
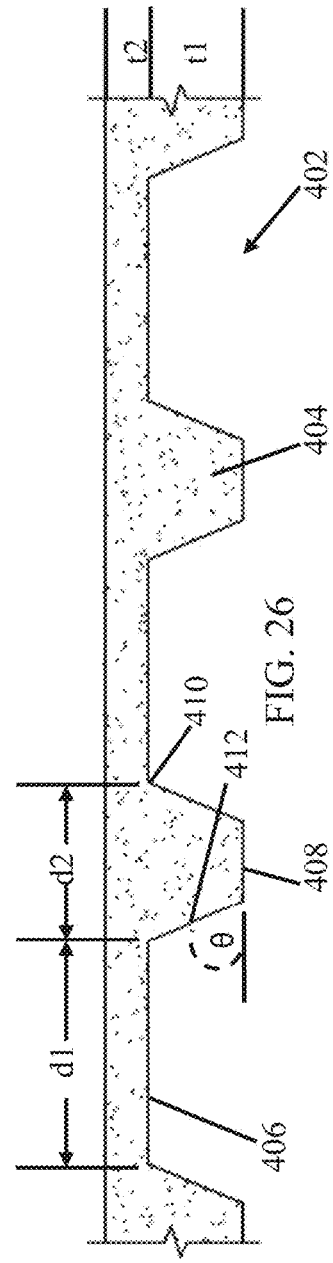
FIG. 26 is a section view through line A-A in FIG. 25.

FIGS. 25 and 26 illustrate a slab 400 having an underside 402 that includes a plurality of ribs 404 depending downwardly therefrom. Each rib 404 may have a first thickness $t_1$, while the portions 406 of the slab 400 between the ribs 404 may have a second thickness $t_2$. In one instance, the first thickness may be as large or larger than the second thickness. For example, the first thickness may be between about 1½ and about 3 times that of the second thickness or, in another example, about twice that of the second thickness. The ribs 404 may be tapered, such that a free distal end 408 may have a width smaller than the width at a proximal end 410. Each side 412 may form an angle θ with the distal end 408, where that angle preferably is between about 45 degrees and about 90 degrees, and in one embodiment is about 60 degrees. Additionally the distance $d_2$ of the distal end 408 may be different than a distance $d_1$ of the portions 406 between ribs 404. For example, the distance $d_1$ may be at least as large as the distance $d_2$ and, preferably, is larger than that distance. FIG. 26 illustrates that, in one instance, the distance $d_1$ may be about twice the distance $d_2$.

Ribs 404 may be substantially parallel to one another along a length of the EMAS. As seen in FIG. 25, the ribs 404 may be substantially linear along their lengths, although other variations are within the scope of this disclosure. For example, ribs may be zig-zagged, sinusoidal, or otherwise curvilinear, while still remaining substantially parallel to one another.

Figure 27:
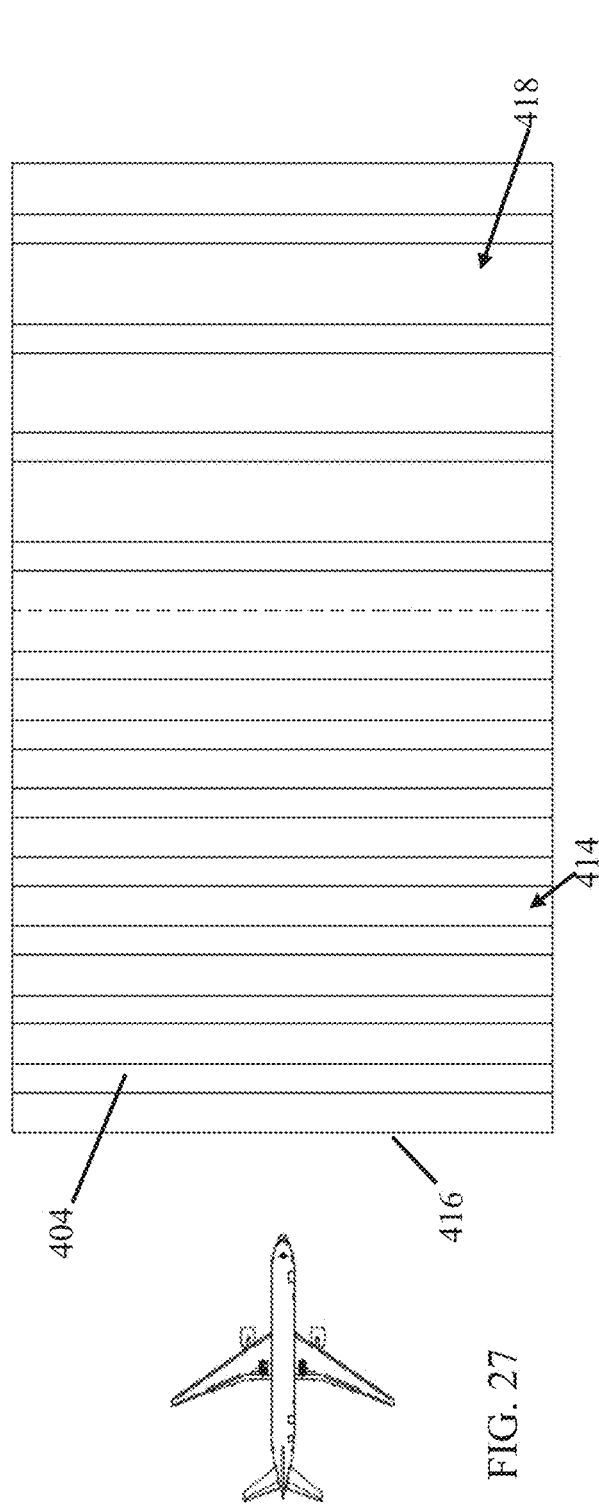
FIG. 27 is a bottom view of multiple slab sections having ribbed portions disposed perpendicular to a runway direction.
Figure 28:
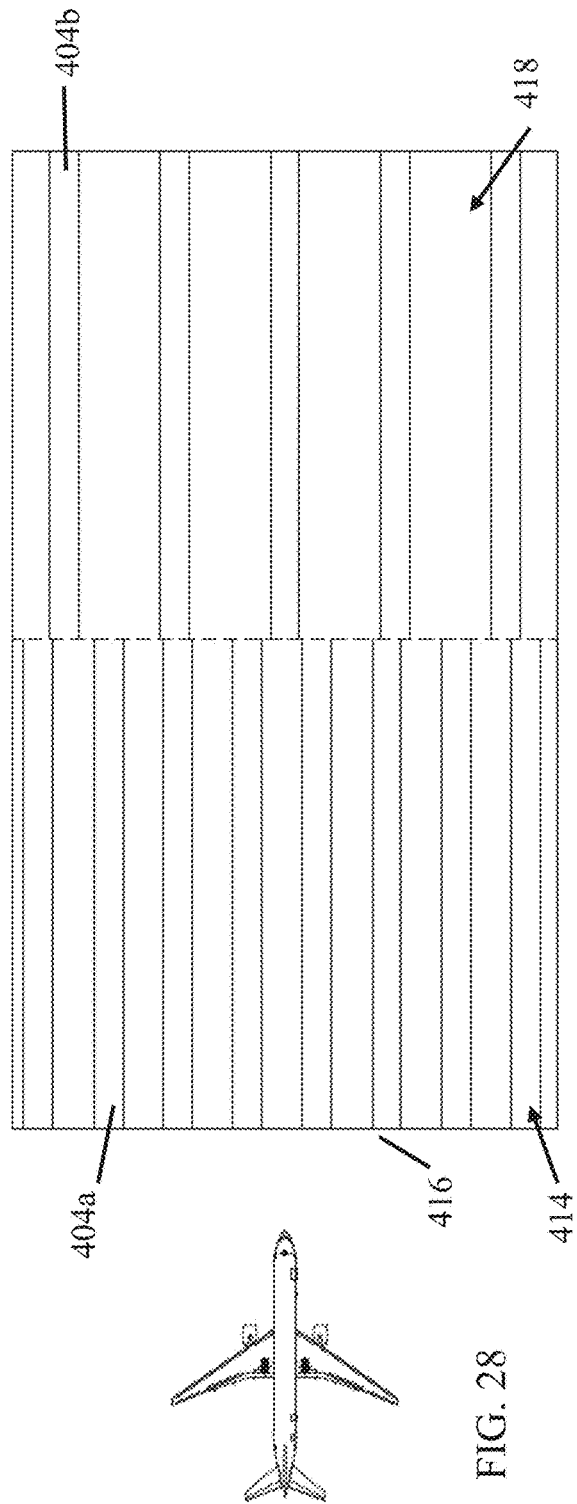
FIG. 28 is a bottom view of multiple slab sections having ribbed portions disposed parallel to a runway direction.

Turning now to FIGS. 27 and 28, it will be appreciated that the ribs 404 may be oriented in one or more ways along an EMAS relative to a direction of travel of an aircraft, i.e., relative to a direction of a runway adjacent to which the EMAS is installed. FIG. 27 illustrates that the ribs 404 may be oriented generally perpendicular to that direction of travel, whereas FIG. 28 alternatively illustrates that the ribs 404 may be oriented generally parallel to the direction of travel. In yet another alternative, the ribs 404 may be offset at some angle between the orientations of FIGS. 27 and 28, e.g., at a 45 degree angle relative to both.

FIGS. 27 and 28 also illustrate that the EMAS may be divided into a plurality of zones, including a first zone 414 adjacent an entrance 416 to the EMAS and a second zone 418 adjacent the first zone 414. The first zone 414 may include ribs 404a more closely spaced together than ribs 404b in the second zone 418, which may result in increased resistance and deceleration of aircraft tires passing through the first zone 414 as compared to the second zone 418. Alternatively, spacing between ribs may vary within a zone, e.g., from one set of ribs to another, rather than having multiple distinct zones where rib spacing is substantially identical within a given zone.

Additionally, the ribs 404a, 404b may serve to stiffen their respective slab zones 414, 418 and enhance bending strength. As a result of the increased number of ribs 404a proximate the entrance 416 to the EMAS, the first zone 414 may exhibit better strength characteristics, thereby better resisting uplift loads due to jet-blast and wind, which may be significant when aircraft are pointed away from the EMAS, e.g., when using the end of the runway at which the EMAS is located as a start end for aircraft takeoffs.

Turning to FIGS. 29-31, in another aspect, the slab 430 may include an underside 432 with a waffle-shaped pattern 434 depending downwardly therefrom. The waffle-shaped pattern 434 may comprise a first series of ribs 436 depending downwardly from the underside 432 in a first direction and a second series of ribs 438 depending downwardly from the underside 432 in a second direction, where the second direction may be perpendicular to or otherwise angled with respect to the first direction.

In one aspect, the first and second series of ribs 436, 438 may be similarly shaped, e.g., having a similar shape as the ribs 404 described above. For example, ribs 436 may have a first thickness $t_3$, while the portions 440 of the slab 430 between the ribs 436 may have a second thickness $t_4$. Ribs 438 similarly may have a first thickness $t_5$, while portions of the slab 430 between ribs 438 may have a second thickness $t_6$. The thickness $t_3$ may be substantially equal to the thickness $t_5$, and the thickness $t_4$ may be substantially equal to the thickness $t_6$. Alternatively the respective first thicknesses may be different and the respective second thicknesses may be different, although a total of the first and second thicknesses for each series of ribs 436, 438 may be substantially equal. In still another embodiment, the first thicknesses may be different than the second thicknesses and the total of the first and second thicknesses of the first series of ribs 436 may be different than the total of the first and second thicknesses of the second series of ribs.

Additionally, each of the first series of ribs 436 and the second series of ribs 438 may be tapered, such that a free distal end 444, 446, respectively, may have a width smaller than the width at a proximal end 448, 450, respectively. Each side 452 of the first series of ribs 436 may form an angle α with the distal end 444, and each side 454 of the second series of ribs 438 may form an angle β with the distal end 445. Each of angles α and β may be between about 45 degrees and about 90 degrees, and in one embodiment each is about 60 degrees.

Additionally the distance $d_4$ of the distal end 444 of the first series of ribs 436 may be different than a distance $d_3$ of the portions 440 between ribs 436. For example, the distance $d_4$ may be at least as large as the distance $d_3$ and, preferably, is larger than that distance. The second series of ribs 438 may be similarly configured with regard to the respective distances $d_6$ and $d_5$. FIG. 30 illustrates that, in one instance, the distance $d_3$ may be between about one and two times as large as the distance $d_4$. Conversely, the distance $d_5$ may be between about 3 and about 5 times the distance $d_6$. The respective distances $d_1$ through $d_6$ may be modified as needed, e.g., in order to customize the frangibility of the respective slabs 400, 430 or in order to change the shapes of the waffle pattern. For example, the ribs 436, 438 in FIG. 29 result in a waffle pattern in which a central recessed area 456 is rectangular. Alternatively, FIGS. 32 and 33 depict a waffle pattern in which the ribs 436, 438 are sized and spaced such that the central recessed area is square.

Figure 32:
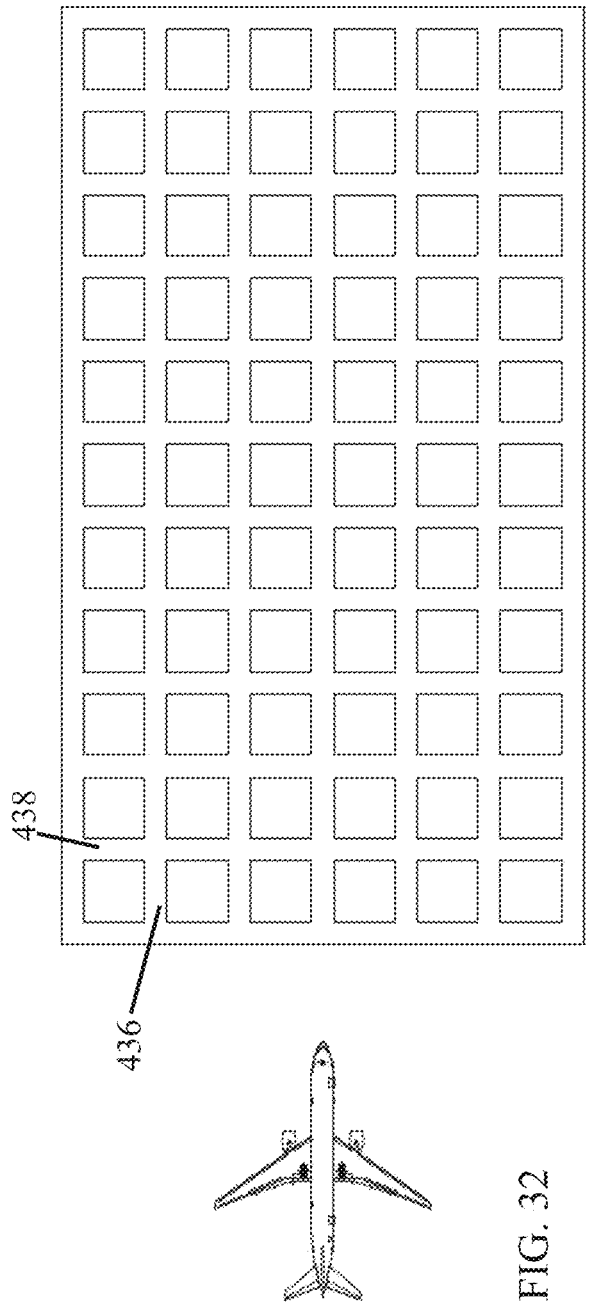
FIG. 32 is a bottom view of a slab section having waffle portions disposed perpendicular to a runway direction.
Figure 33:
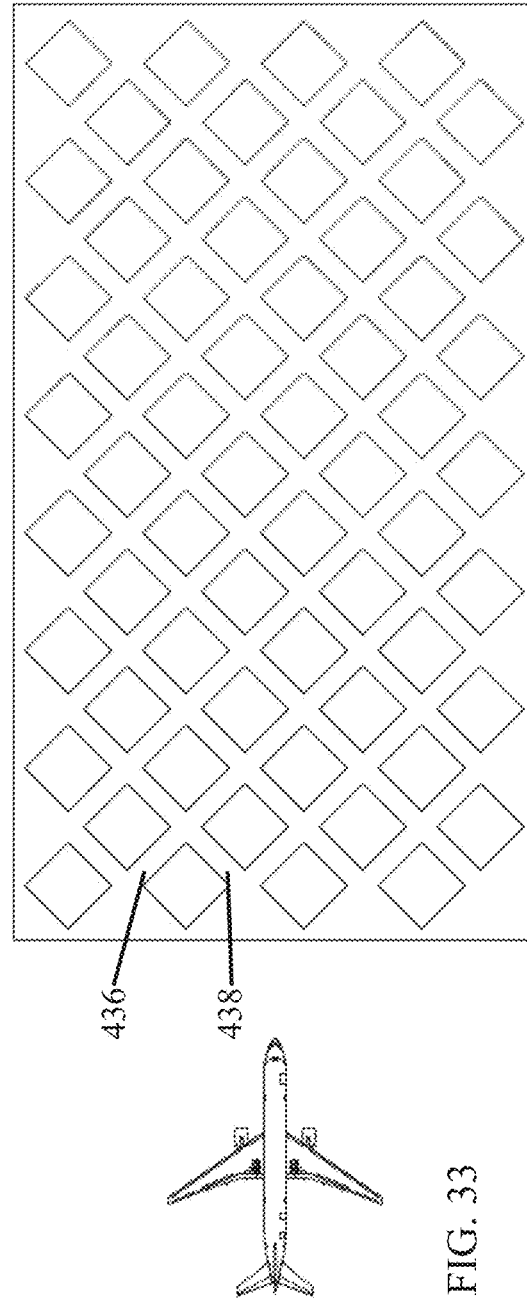
FIG. 33 is a bottom view of a slab section having waffle portions disposed at an angle to a runway direction.
Figure 34:
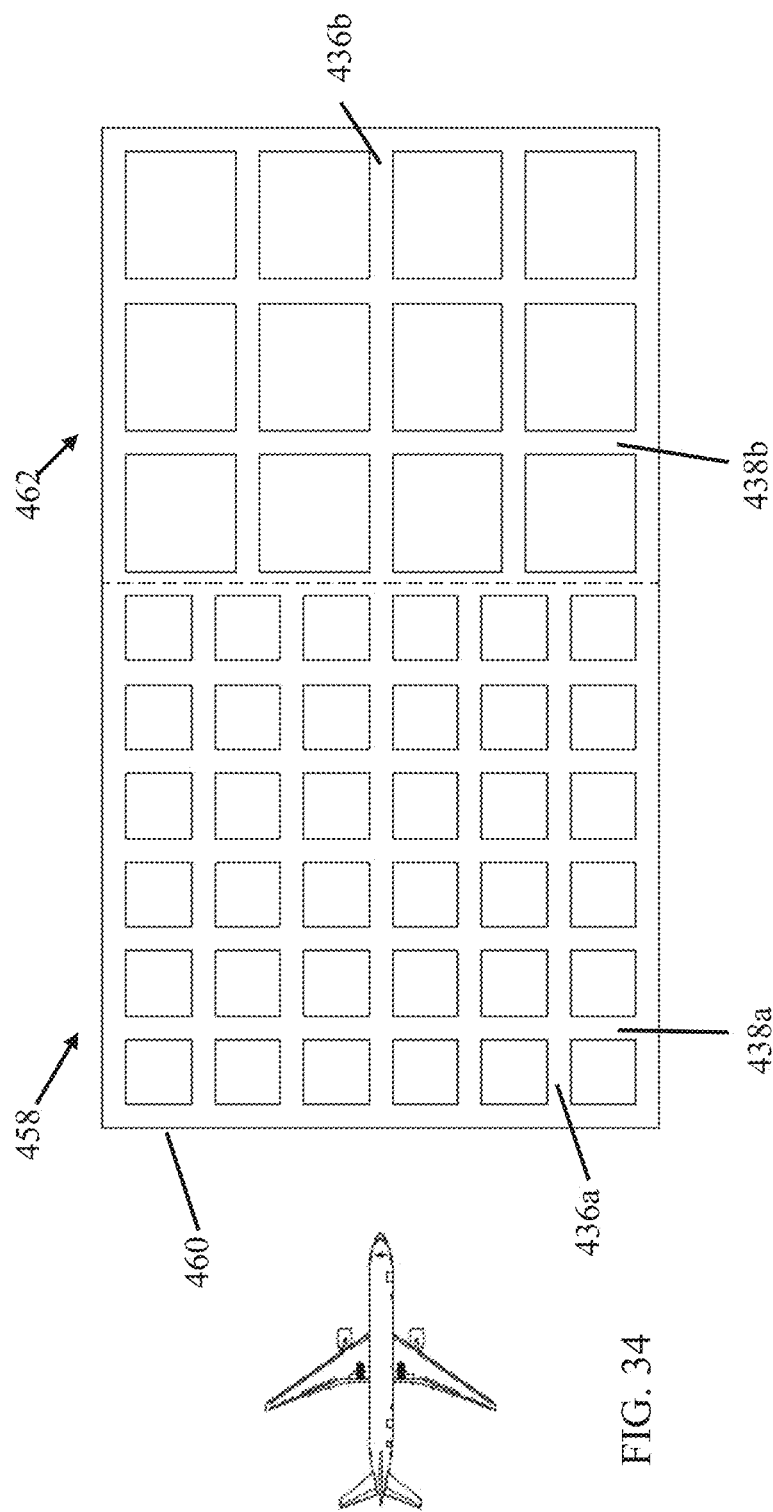
FIG. 34 is a bottom view of multiple slab sections having differently-sized waffle portions disposed perpendicular to a runway direction.

Turning now to FIGS. 32-34, it will be appreciated that the first and second ribs 436, 438 may be oriented in one or more ways along an EMAS relative to a direction of travel of an aircraft, i.e., relative to a direction of a runway adjacent to which the EMAS is installed. FIG. 32 illustrates that the first ribs 436 may be oriented generally parallel to that direction, while the second ribs 438 are oriented generally perpendicular to that direction. Alternatively, FIG. 33 illustrates that both ribs 436, 438 may be offset at some angle relative to the direction of travel e.g., at a 45 or 135 degree angle, although other offset amounts are possible. Additionally, in FIG. 33, the first and second ribs 436, 438 remain generally perpendicular to one another. In another aspect, the ribs may be angled acutely or obtusely to one another.

FIG. 34 illustrates that the EMAS may be divided into a plurality of zones, including a first zone 458 adjacent an entrance 460 to the EMAS and a second zone 462 adjacent the first zone 458. The first zone 458 may include first and second ribs 436a, 438a more closely spaced together than ribs 436b, 438b in the second zone 462. FIG. 34 further illustrates that the relative spacing between first and second ribs may vary from the first zone 458 to the second zone 462, e.g., causing the shape of the waffle patterns to change from generally square to rectangular. Rib alignment and sizing within each zone and between zones may be modified to achieve similar outcomes discussed above with regard to the arrangements of FIGS. 27 and 28.

In another aspect, rib configuration may vary from zone to zone, whereby a first zone may include only ribs and a second zone may include waffle-patterned ribs or vice-versa. In still another aspect, the EMAS may include one or more flat zones without ribs or waffles where the flat zone(s) may be disposed ahead of the other zones, between one or more other zones, or after the other zones. In yet another aspect, the waffles may be something other than rectangular. For example, FIG. 35 depicts an EMAS with various circular waffles. Other shapes for the underside of the slab are possible, as would be appreciated by one of ordinary skill in the relevant art.

The rib or waffle configurations discussed above may improve upon flat slabs that are installed directly on top of an aggregate by providing for easier punch-through by an aircraft tire and for less confinement to the underlying aggregate. In particular, the latter benefit may permit increased energy transfer from the aircraft into the aggregate, permitting the EMAS to arrest the aircraft more quickly.

Figure 38:
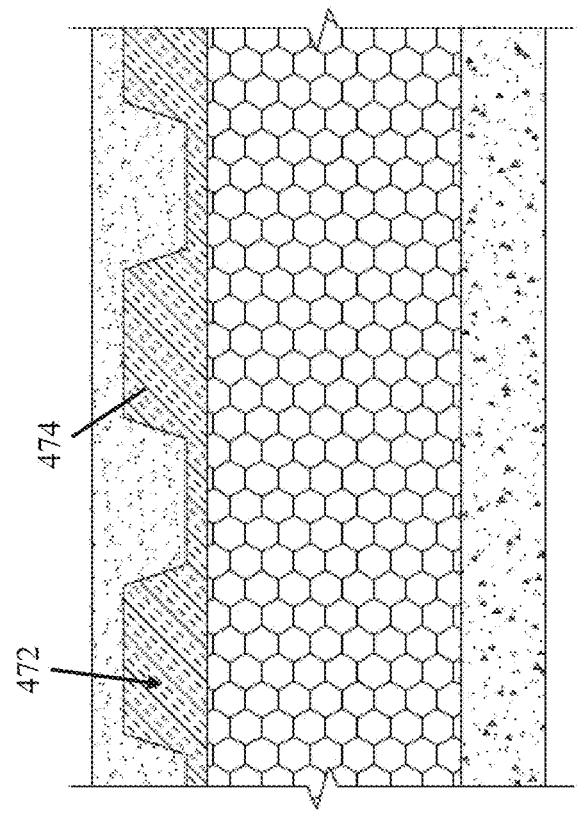
FIG. 38 is a section view of an EMAS having a third type of void between slab and aggregate layers.
Figure 37:
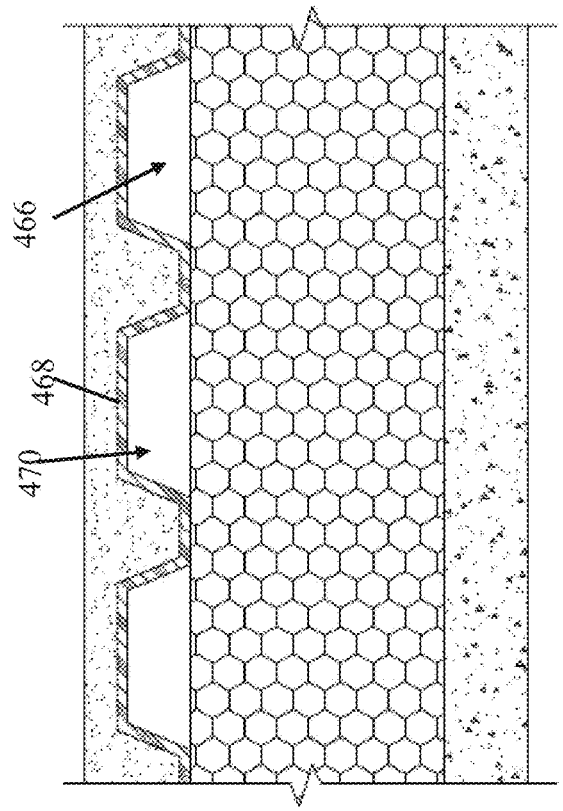
FIG. 37 is a section view of an EMAS having a second type of void between slab and aggregate layers.

Such benefits may be achieved by causing the ribs or waffle patterns to define a plurality of voids between the slab and the underlying aggregate. In this regard, it should be understood that a void does not necessarily refer to an empty or air-filled space between the two structures. Rather, a void should be considered one or more areas between the aggregate and slab that are filled with something other than slab. FIG. 36 depicts an EMAS with a first void 464, where that void is air-filled. FIG. 37 depicts an EMAS with one or more second voids 466, where the voids 466 are defined by a formwork 468 that provides a shape of the resulting ribs in the slab, as well as an air-filled portion 470 between the formwork 468 and the aggregate. FIG. 38 depicts still another EMAS with one or more third voids 472, where the third void 472 is defined by a formwork 474 resting on the aggregate and substantially completely filling an area between the aggregate and the slab. In still another aspect, the voids of FIGS. 36 and 37 may replace one or more of the air-filled portions with a different medium, e.g., a lightweight foam or plastic.

With regard to FIGS. 37 and 38, the formworks 468, 474 may comprise a material that provides sufficient strength to support the slab while being brittle enough to fracture easily under the loads caused by aircraft tires passing through the EMAS. For example, the formwork may comprise a plastic or polymer with brittle characteristics including, but not limited to polystyrene, polyactic acid (PLA), polyvinyl chloride (PVC), polymethyl methacrylate, or other acrylics.

As discussed above, one method for fabricating a slab is to pour the slab material, e.g., CLSM, cellular concrete, or another slab material, on top of the aggregate. In those cast-in-place (CIP) instances, the method may be modified to include the step of positioning a formwork on top of the aggregate prior to pouring the slab. As such, the slab material may flow to conform to the shape of the formwork, resulting in formation of both the slab and the underlying void. In the event that the void includes some medium other than air and in addition to the formwork, that additional medium may be installed on top of the aggregate or in the spaces of the formwork, prior to installing the formwork.

As an alternative to CIP methods, the slab may be pre-cast (PC) into its desired shape prior to installing the slab on top of the aggregate. Pre-casting may be favorable, because it reduces the time needed to construct the EMAS, which may be significant when that EMAS is being installed at the end of active runways or when that installation requires shutting down an active runway. In such instances, the slab material may be poured into a mold forming the desired underside shape and permitted to cure. Once cured, the slab may be separated from the formwork, permitting just the slab to be installed on top of the aggregate. Alternatively, the formwork may remain adhered to or otherwise in contact with the poured slab, with both components being installed on top of the aggregate, such that the formwork becomes a permanent component of the EMAS.

Figure 39:
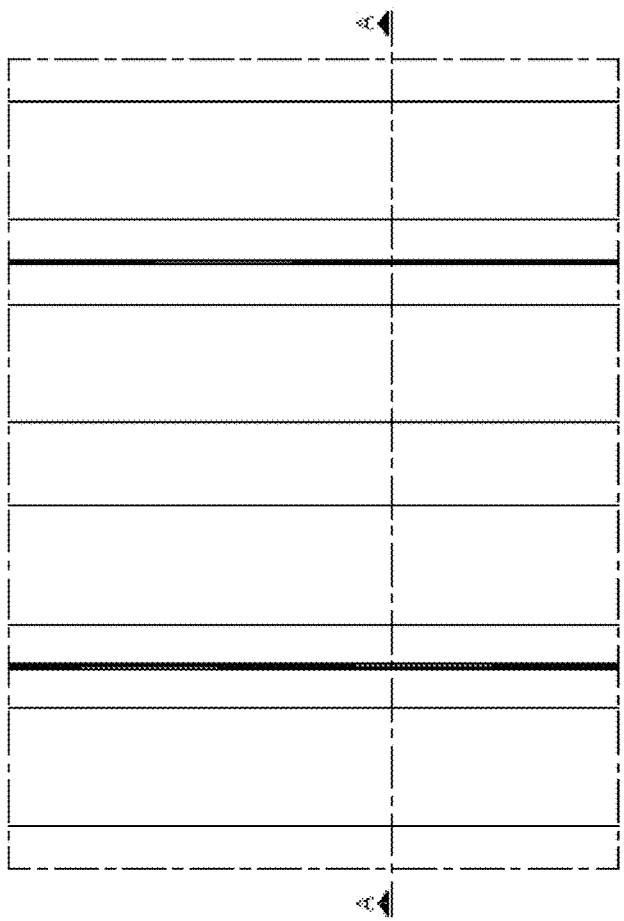
FIG. 39 is a top view of an EMAS with geogrid being used to secure the slab to an underlying pavement.
Figure 40:
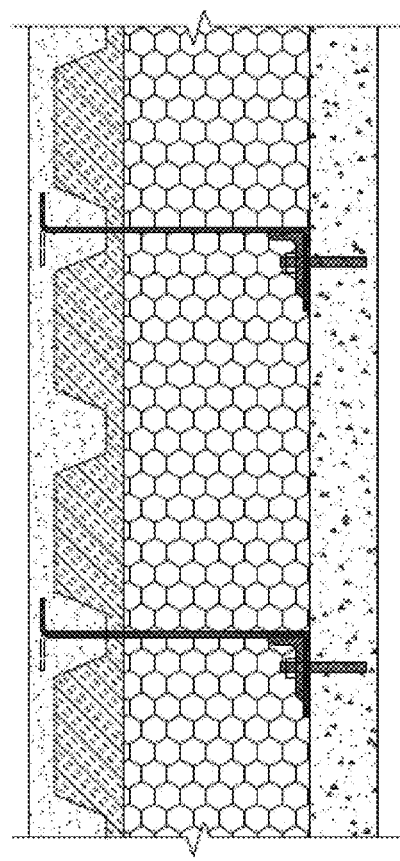
FIG. 40 is a section view through line A-A in FIG. 39.
Figure 41:
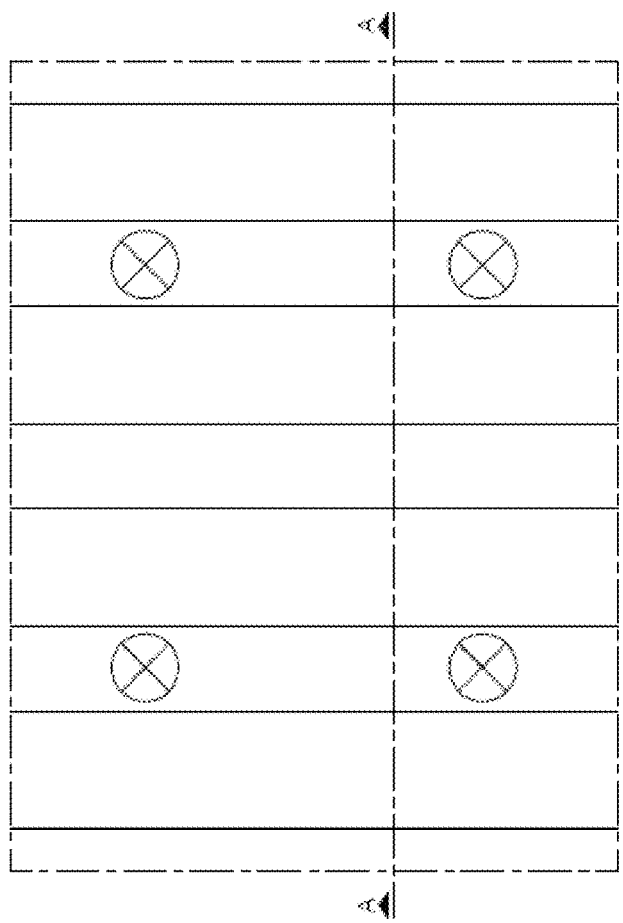
FIG. 41 is a top view of an EMAS with point anchors being used to secure the slab to an underlying pavement.
Figure 42:
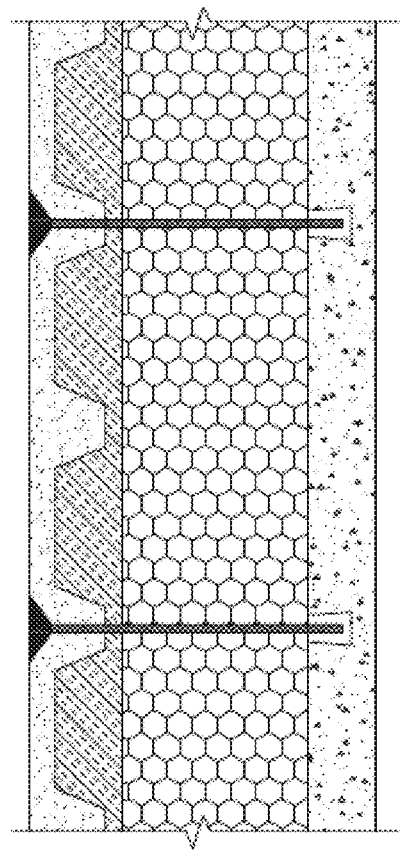
FIG. 42 is a section view through line A-A in FIG. 41.

Any of the slabs discussed above also may be secured to the EMAS using one or more of the securement structures discussed herein, or using another securement method as would be appreciated by those of ordinary skill in the relevant art. For example, FIGS. 39 and 40 illustrate one example of a ribbed slab being installed using geogrid, and FIGS. 41 and 42 illustrate an example of a ribbed slab being installed using puck-type retainers. In both examples, the geogrid and the pucks are installed in-line with the ribs, which may increase the thickness of the slab through which those attachment mechanisms pass, thereby increasing their effectiveness. At the same time, a geogrid, puck, or other attachment mechanism may be installed through other parts of the slab. Additionally, in both examples, the void is depicted as a single, uniform medium, which may be air or another medium such as polystyrene. As discussed above, however, the void may comprise a plurality of different media, which may have no effect on the method of attaching the slab to the rest of the EMAS.

Figure 43:
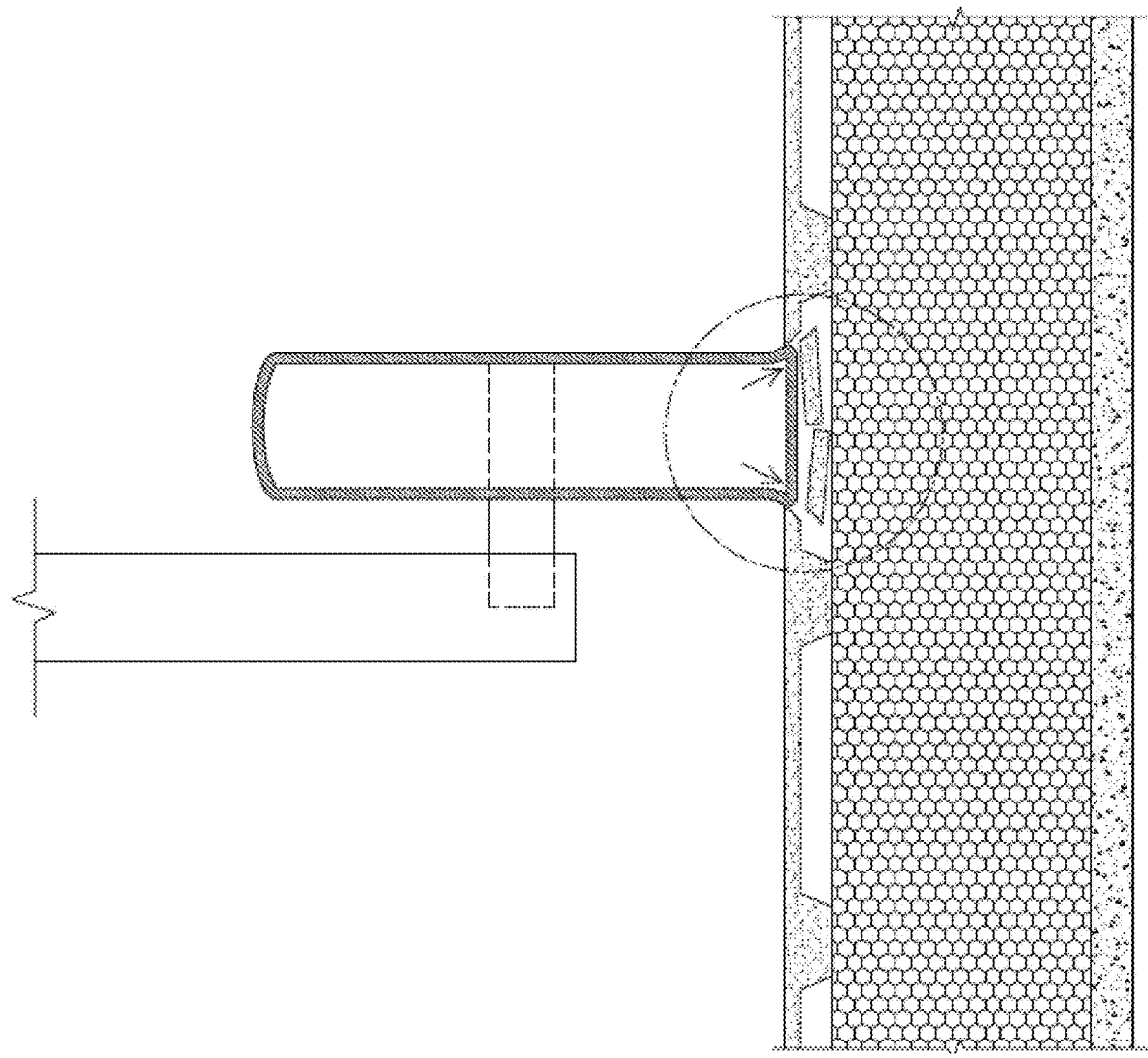
FIG. 43 is a section view of an EMAS taken perpendicular to a runway direction illustrating an aircraft tire punching through a slab layer at a location above a void.

Slab structures that include the ribs or waffle structures described herein may be stiffer and lighter than an equivalent flat slab and, relatedly, may be formed using less material than a flat slab. At the same time, such slabs exhibit better strength characteristics with regard to resisting uplift loads on the slab. For example, the inclusion of ribs or a waffle-like structure may serve to stiffen the slab and increase its bending strength as compared to a flat slab. As a result, fewer anchors (e.g., geogrid or the puck anchors discussed herein) may need to be used to secure the slab, further reducing materials and construction time. Still further, as seen in FIG. 43, the formation of thinner slab regions between the ribs may result in comparatively weaker regions that permit punch-through or fracturing of the slab during an overrun event by smaller and/or lighter aircraft, thereby permitting a single EMAS to be effective for a larger range of aircraft than a flat slab.

Figure 44:
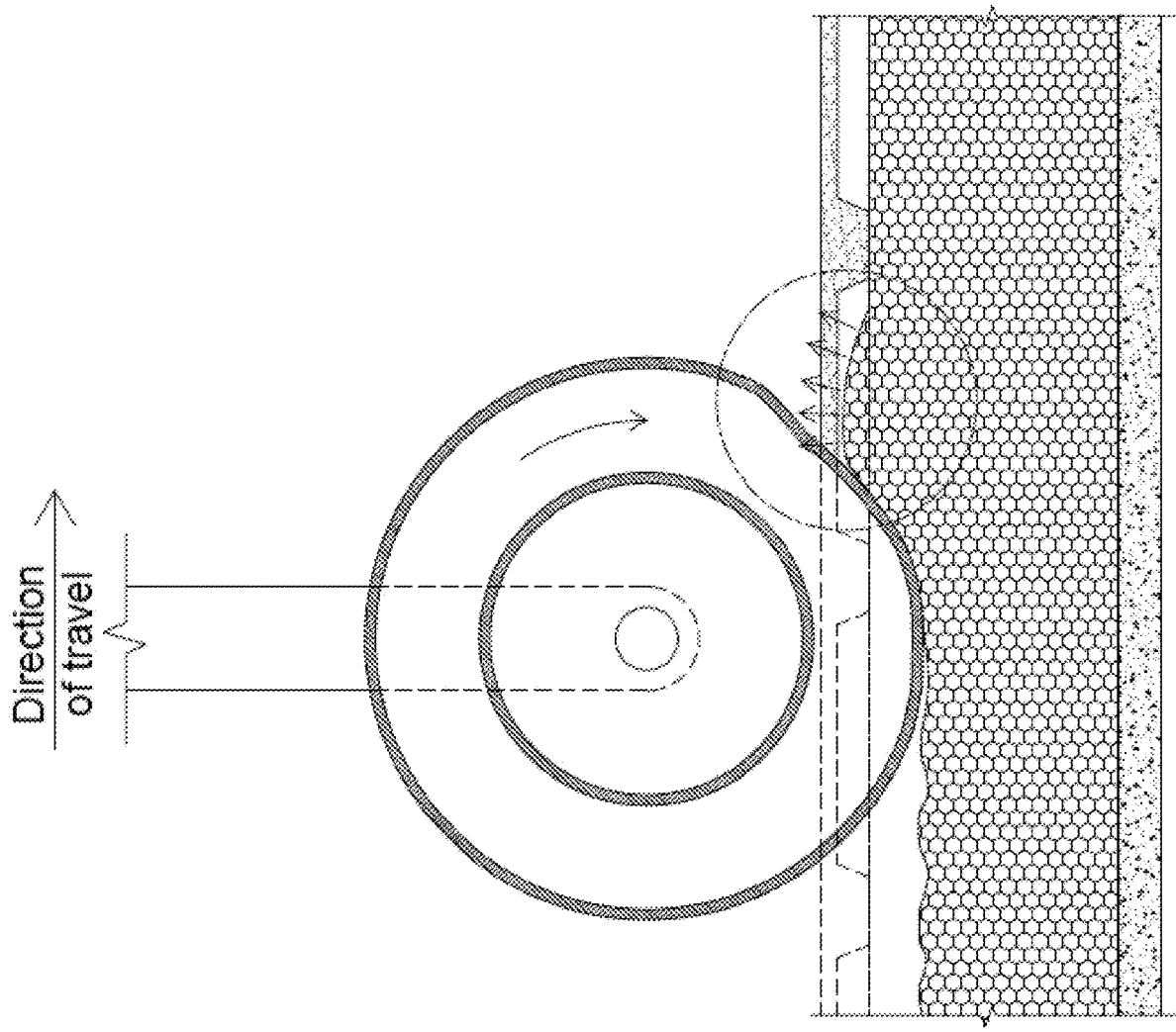
FIG. 44 is a section view of an EMAS taken parallel to a runway direction illustrating displacement of aggregate into a void between the aggregate and slab during an overrun event.

Furthermore, as seen in FIG. 44, the inclusion of one or more voids between the aggregate and the slab may permit or enhance the disbursement of aggregate material, i.e., reducing confinement of that material. That improved behavior may lead to the EMAS having a more uniform response to a wider range of vertical loads caused by a wider range of tire sizes and aircraft. The size and shape of the voids also may be customized to tune the level of confinement to the airport being serviced by the EMAS. For example, regional or local airports may have primarily smaller aircraft use their runways as compared to international airports, where the latter may require a larger degree of aggregate displacement to disperse energy, as well as a stiffer slab to better resist updrafts caused by larger engines. Alternatively, less confinement of the aggregate may result in a softer effective response, as though a softer grade of material is being used. As such, allowing for less confinement in an EMAS designed to service smaller planes may permit deeper penetration and greater arresting forces.

Turning now to FIGS. 45-50, and further with regard to the cast-in-place and pre-cast slabs discussed above, the slabs may be formed by a formwork system 500 comprising a plurality of abutting and potentially overlapping formworks 502*a-d*. One common feature to the formworks shown in these figures is that each formwork is designed to remain with the resultant slab portion 504*a-d* that it forms. Additionally, each formwork includes an anchor point 506*a-d* to assist in securing an embedment puck such as the anchors 60 described herein. Such anchors may be modified to include a plurality of legs 508 to assist in aligning the anchors 60 in a desired orientation.

Figure 45:
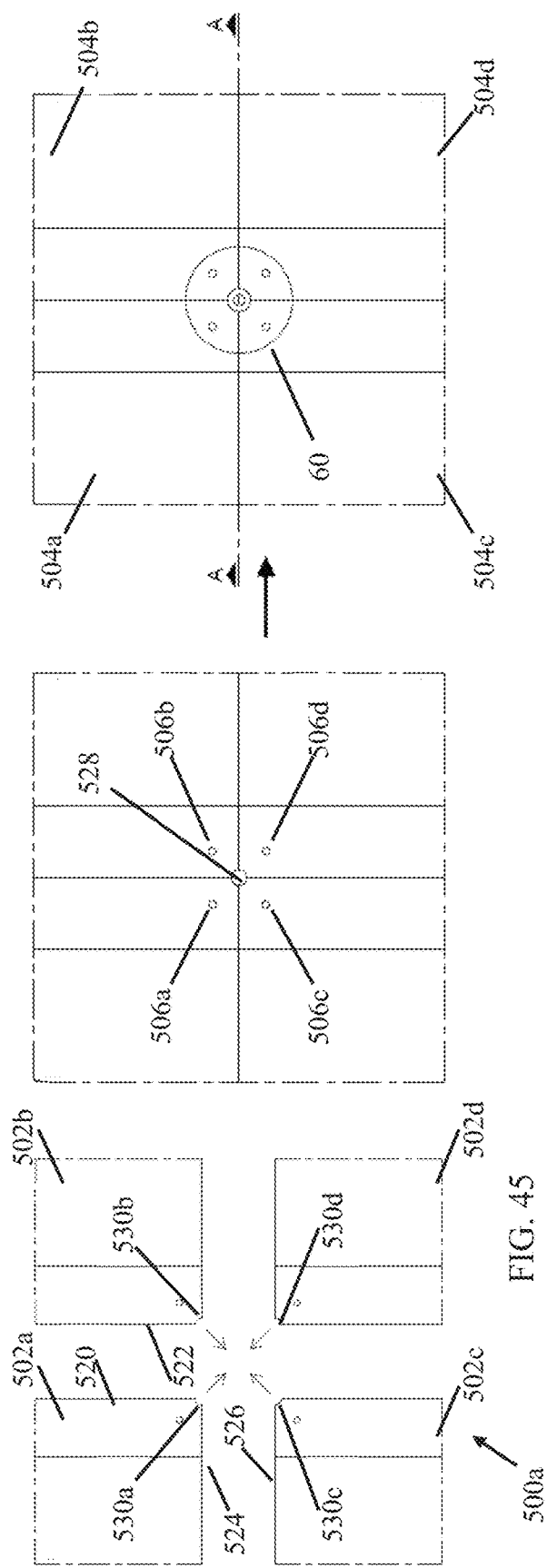
FIG. 45 is a sequence of top views of abutting aggregate portions used to form the aggregate layer of an EMAS.
Figure 46:
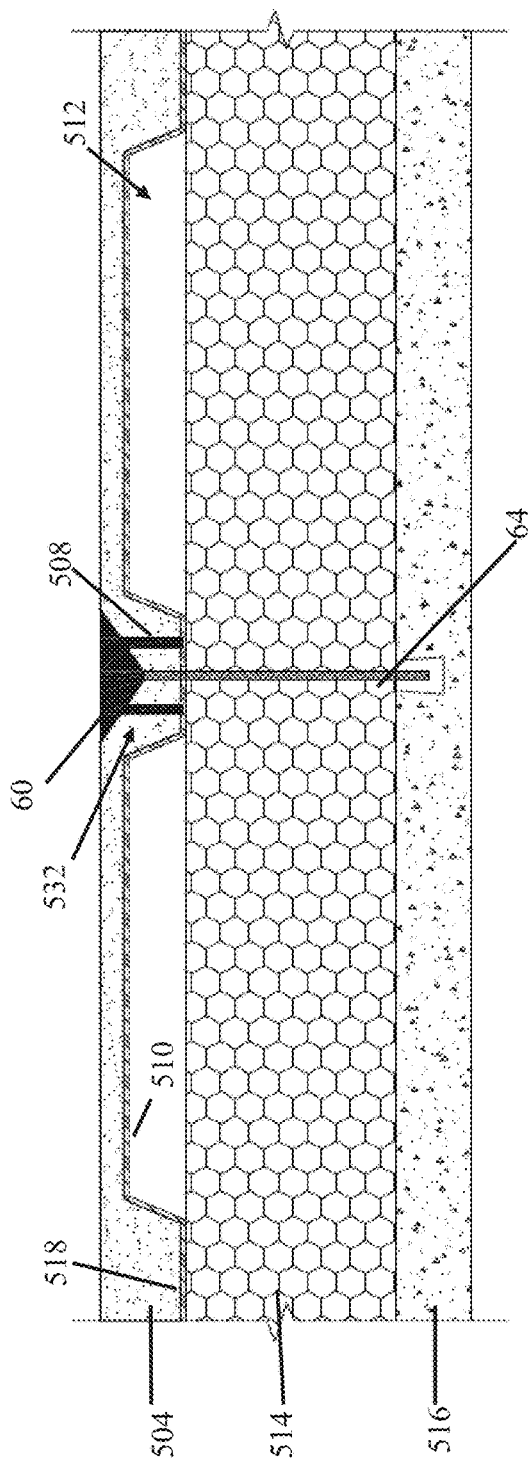
FIG. 46 is a section view through line A-A in FIG. 45.

FIGS. 45 and 46 illustrate a first aspect of one such formwork system 500*a*. The system includes a plurality of formworks 502*a-d* that are designed to form the ribs or waffle patterns described above, each formwork having an underside 510 shaped to form the void 512 between the aggregate 514 resting on top of the pavement 516 and the resulting slab 504. Each formwork also has an upper side 518 configured to receive the slab material. Additionally, a first formwork 502*a* includes a first side 520 configured to abut an opposing side 522 of a second, or first adjacent formwork 502*b*. The first formwork 502*a* also may include a second side 524 configured to abut an opposing side 526 of a third formwork 502*c* that is adjacent in a different direction, e.g., perpendicular to the first adjacent formwork 502*b*. Still further, the formwork system may include at least a fourth formwork 502*d* adjacent to the second and third formworks 502*b*, 502*c*. As seen in FIG. 45, the fourth formwork 502*d* also may be generally diametrically opposed to the first formwork.

In one aspect, the abutting sides may be substantially linear. In another aspect, the abutting sides may have curvilinear, jagged, or other shapes, provided that the sides are generally mirror images of one another to facilitate abutment.

When abutting, at least one opening 528 may be defined between the adjacent formworks. For example, in FIG. 45, each of the formworks 502*a-d* includes a concave notch 530*a-d*. As such, the abutting formworks define a circular opening 528. Other notch shapes are possible, as would be appreciated by one of ordinary skill in the relevant art, e.g., a linear segment that effectively removes a triangular corner of the formwork such that the abutting formworks define a square or other rectangular opening.

As discussed above, the EMAS may include a plurality of point anchors 60 to secure the slab 504 to the underlying pavement 516 via a strap or rod 64. The opening 528 defined between the formworks 502*a-d* may be sized to accommodate that strap or rod 64, such that the point anchor 60 may be generally centered over the intersection between abutting formworks 502*a-d*. As such, each point anchor 60 may operate to secure at least a portion, e.g., a corner, of each formwork 502*a-d* and its respective slab 504*a-d* to the pavement 516.

As discussed above, each formwork 502*a-d* also may include a respective anchor point 506*a-d* configured to receive an anchor leg 508 defined by or in communication with the point anchor 60. In addition to a compressive force generated between the point anchor 60 and the slab portions 504*a-d*, the anchor legs 508 may further secure the point anchor 60 to those slab portions 504*a-d* and also may prevent rotational movement of the point anchor 60 relative to the slab 504.

Alternatively, rather than extending downward from the point anchor 60, the anchor legs 508 may be secured in and extend upwardly from the aggregate 514 prior to installation of the formworks 502*a-d* and their respective slabs 504*a-d*. The anchor points 506*a-d* then may be lowered around the anchor legs 508, serving to accurately position the slabs 504*a-d* in the EMAS.

Also as discussed above, the formworks 502*a-d* may be made of a low strength, brittle material in order to fracture relatively easily during an overrun event. The region 532 underlying the point anchor 60 may be reinforced or formed of a higher strength material in order to resist fracturing caused by the compressive forces exerted by the point anchor 60.

In addition to providing for a securement point for the point anchors, the openings 528 between formworks may allow for easy access to those anchor systems, permitting rapid inspection and more targeted maintenance as compared to systems in which the slab is a continuous bed of material. The openings 528 also may reduce the time needed to construct the EMAS bed, as they may reduce or eliminate the need to drill separate openings for the strap or rod 64 and the anchor legs 508. For example, a column having the same or a similar cross-section to the anchor points 506a-d and/or the opening 528 may be placed in those openings prior to pouring of the slab. As the slab material then is poured, it may flow around those columns so that a clear path is established through the slab to those openings, reducing or eliminating the need for subsequent drilling to create those paths.

Additionally, although the formworks 502a-d in FIG. 45 are depicted as having a single anchor point 506a-d and notch 530, it will be appreciated that each formwork may include multiple such anchor points and notches. For example, a formwork may include similar features in one or more other corners of the formwork, at one or more points more centrally located along the sides of the formwork, or at one or more locations more internally defined away from the sides of the formwork.

Figure 47:
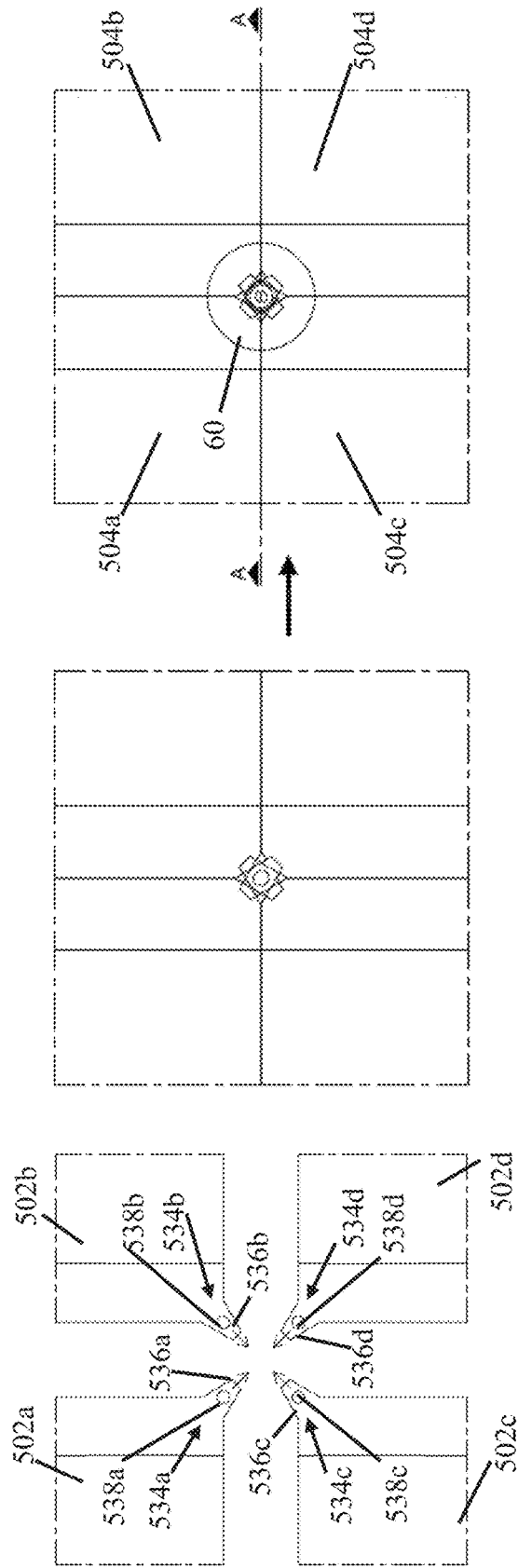
FIG. 47 is a sequence of top views of a first instance of overlapping aggregate portions used to form the aggregate layer of an EMAS.
Figure 48:
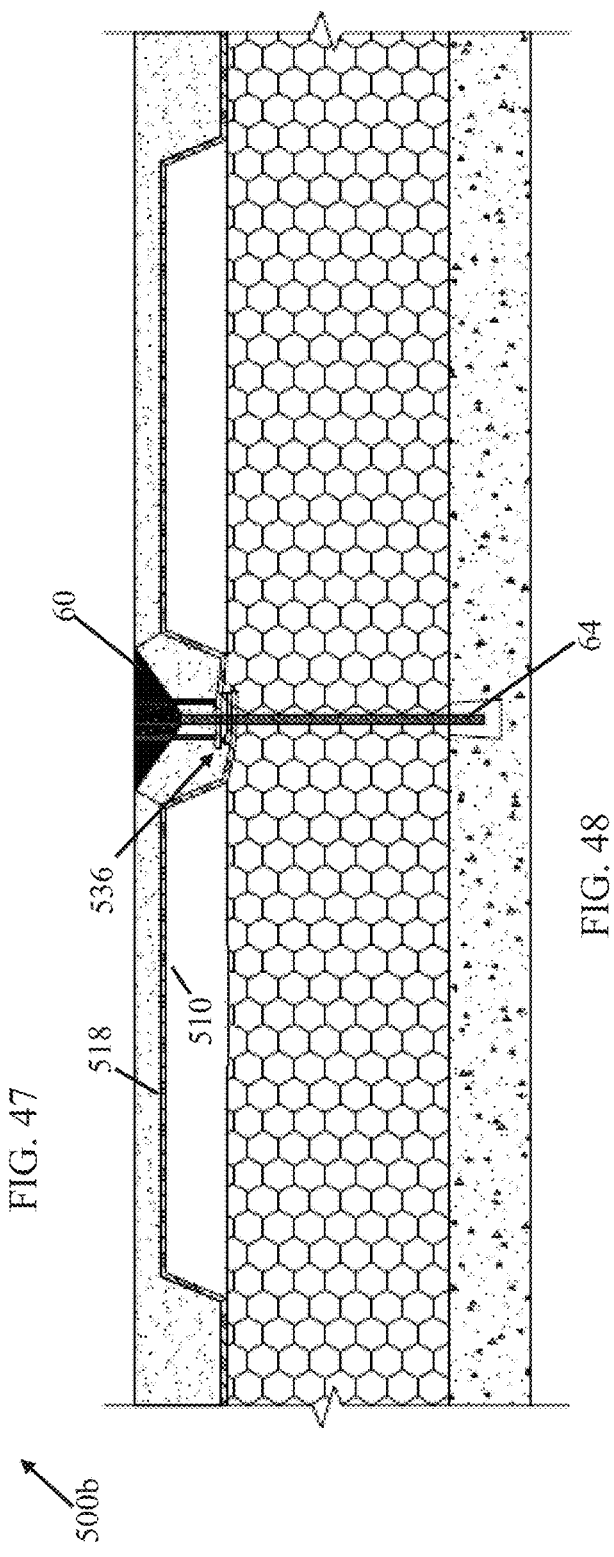
FIG. 48 is a section view through line A-A in FIG. 47.

Turning now to FIGS. 47 and 48, in another aspect, the formworks 502a-d, in addition to abutting one another along their lengths, also may overlap at distinct points, e.g., at the corners 534a-d. Rather than having a plurality of notches defining an opening, these formworks each may include a protrusion 536a-d extending from the corners 534a-d. As seen in FIG. 48, the protrusions 536 may extend to different depths and at different angles relative to both an underside 510 and an upper side 518 of the formworks 502a-d, thereby permitting the protrusions to substantially stack on top of one another when their slab portions 504a-d are installed in the EMAS.

Each protrusion 536a-d may include one or more complementary openings 538a-d that may align vertically when the formworks 502a-d and their respective slabs 504a-d are installed in the EMAS, those openings 538a-d combining to provide a pathway for the strap or rod 64. Each formwork 502a-d also may include one or more other openings (not shown) for receiving the anchor legs 508 to position the formworks 502a-d in the proper location within the EMAS. Those openings may align with one another so that an anchor leg 508 may pass through multiple openings. Alternatively, one or more of those openings may be sized and/or positioned such than an anchor leg passes through that anchor leg only.

Figure 49:
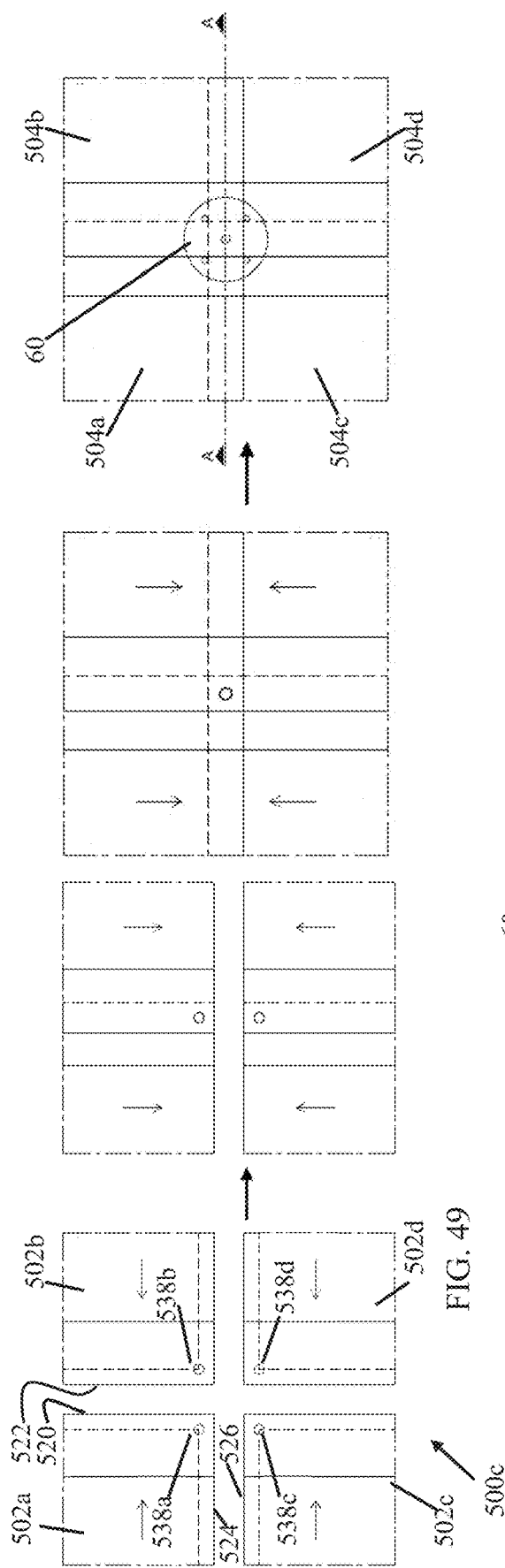
FIG. 49 is a sequence of top views of a second instance of overlapping aggregate portions used to form the aggregate layer of an EMAS.
Figure 50:
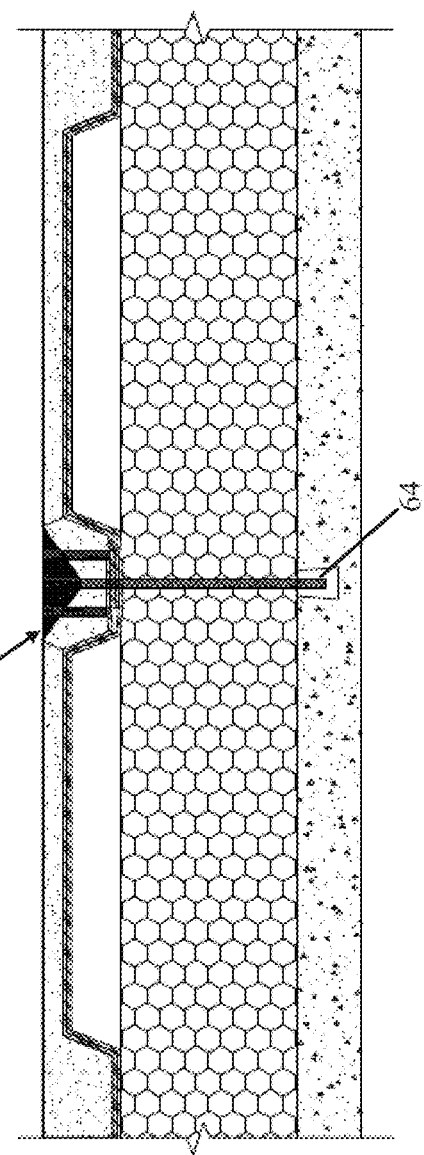
FIG. 50 is a section view through line A-A in FIG. 49.

Turning now to FIGS. 49 and 50, in still another aspect, the formworks 502a-d may be configured to have one or more sides that overlap with adjacent formworks. For example, the first side 520 of the first formwork 502a may overlap with the first side 522 of the adjacent formwork 502b, and the second side 524 may overlap with the first side 526 of a different adjacent formwork 502c. As with the overlapping protrusions in the aspect discussed above, each side may include one or more complementary openings 538a-d that align vertically when the formworks 502a-d and their respective slabs 504a-d are installed in the EMAS in order to provide a pathway for the strap or rod 64.

In the overlapping aspects, the formworks may be used in cast-in-place installations, so that slab material may be poured on top of all of the overlapping portions, i.e., the protrusions 536a-d or the sides, once the formworks 502a-d are installed. In pre-cast installations, the slabs may be formed into the formworks, but the slabs may include removable or permanent walls (not shown) that separate the overlapping portions from a remainder of the formworks. In this way, there may not be any precast slab material poured over the overlapping portions that would inhibit later stacking or overlapping of those portions. In that case, the installation process then may include filling in the area above the overlapping portions with slab material on-site, and after the slabs 504a-d have been installed.

Alternatively, all but one of the overlapping formworks 502a-d may include walls that separate their overlapping portions from a remainder of the formwork. The overlapping portion that would be uppermost in the overlapping process may not include any such wall such that that formwork may receive slab material when being cast, thereby permitting overlapping of the portions and reducing or eliminating a need for additional pouring of slab material after installation of the slabs 504a-d.

Turning now to FIGS. 51-61, it will be appreciated that a geogrid mesh 600 can be used instead of or in addition to the puck retainers described above, in order to connect a cover layer 602 of the EMAS to an underlying pavement 604. In such instances, the geogrid 600 also may extend through an aggregate layer 606 and/or a slab layer (not shown). The geogrid 600 may be installed in an overrun direction of the bed, although it also may be installed perpendicular to or at angle to the overrun direction.

In order to function properly, the geogrid 600 should be connected at a proximal end 608 and a distal end 610 to the underlying pavement 604 and the cover layer 602, respectively. Conventionally, geogrid is installed with point anchors securing the proximal end 608 to the pavement 604 and rigid straps between the anchors so as to provide uniform confinement of the geogrid between point anchor locations. Installation of each point anchor requires drilling a hole in the pavement 604 and then driving the anchor through the geogrid and the pavement 604, which is a labor intensive and lengthy process. As seen in FIG. 51, the anchors may be replaced by the use of an adhesive 612 to secure one or more sections of geogrid 600 to the pavement. In another aspect (not shown), the adhesive may be used in conjunction with one or more anchors, although the adhesive may permit the use of fewer anchors than would be necessary without the adhesive.

The adhesive selected should substantially retain its holding characteristics over time and under an extreme range of weather conditions, should not degrade, and should provide sufficient strength to resist projected loads. Exemplary adhesives include thixotropic adhesives such as bituminous-based adhesives, epoxies, or silicone-based adhesives.

FIGS. 52-61 depict various methods for installing geogrid 600 using adhesive. In each instance, the proximal end 608 of the geogrid 600 is bent at substantially a right angle relative to a central region 614 of the geogrid 600.

In FIGS. 52 and 53, a layer of adhesive 612 is applied to the pavement 604, and the proximal end 608 is pressed into the adhesive and allowed to cure—with or without the addition of heat, depending on the type of adhesive used. Optionally, an additional layer of adhesive then may be applied on top of the first layer and the geogrid. The process then is repeated as necessary in order to install additional sections of geogrid within the EMAS bed. Once all geogrid sections have been installed, with the central regions 614 being disposed generally vertically upward, the bed is filled with aggregate and overlaid with a slab, as discussed herein.

Figures 54, 55:
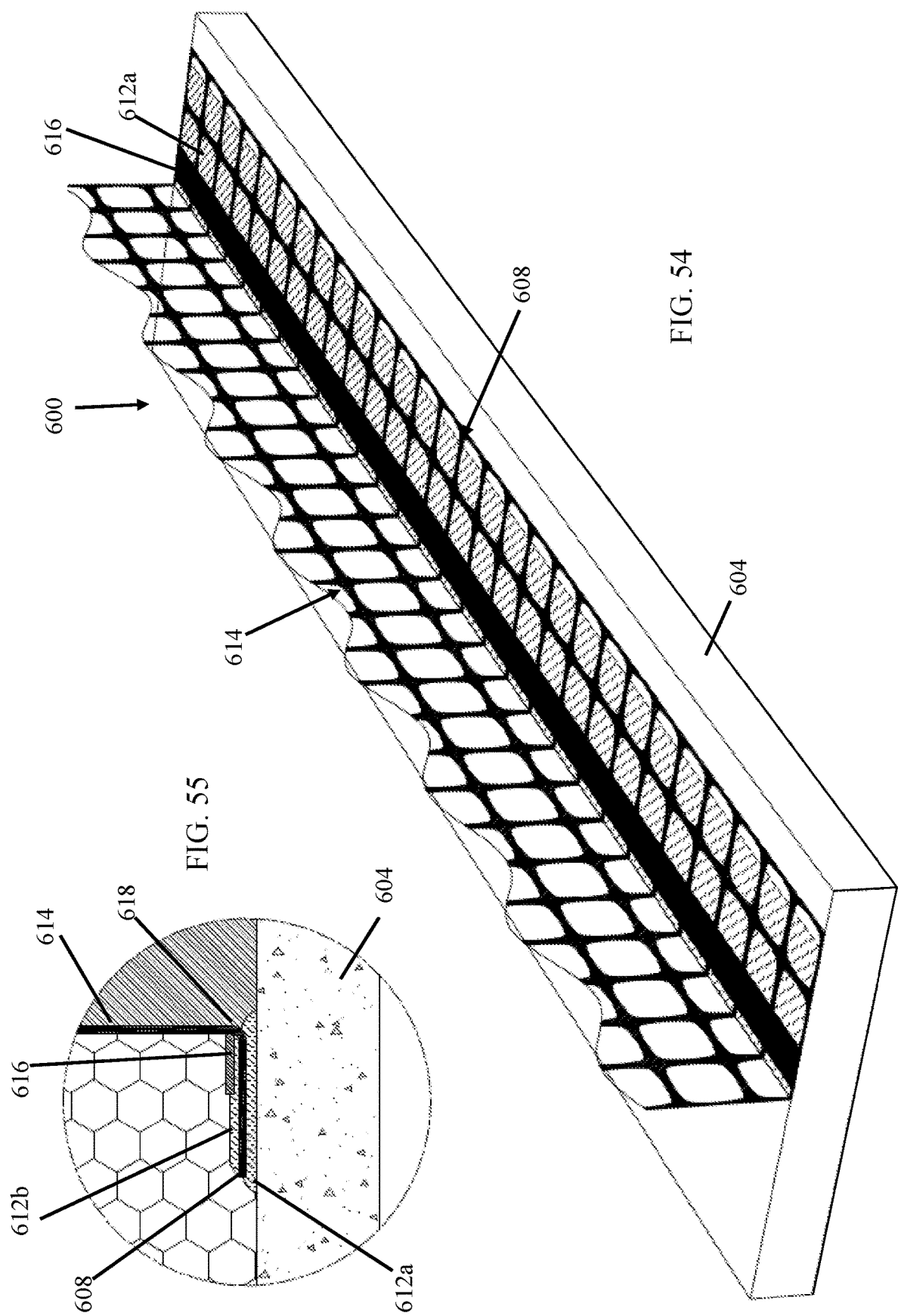
FIG. 54 is an isometric view of a second method of installing geogrid to the pavement using an adhesive.
FIG. 55 is a detail view of the adhesive connection of FIG. 54.

FIGS. 54 and 55 depict an aspect in which a supplemental bar or plate 616 is added and positioned above the pavement 604 and the adhesive. In this aspect, a first layer of adhesive 612a is applied to the pavement, the proximal end 608 is pressed into that first layer, a second layer of adhesive 612b then is added on top of the proximal end 608—either before or after the first layer is allowed to cure, the plate 616 is pressed into the second layer of adhesive 612b, and that adhesive layer is permitted to cure. In one instance, the plate 616 has a width less than a width of the proximal end 608, and the plate 616 is disposed proximate an intersection 618 of the proximal end 608 and the central region 614 of the geogrid. In another instance, the plate 616 has a width less than a width of the proximal end 608, and the plate 616 is located anywhere along the width of the proximal end 608, provided that all or at least a part of the plate 616 overlaps the proximal end 608. In still another instance, the plate 616 has a width equal to or greater than that of the proximal end 608, and the plate 616 is disposed either proximate or spaced from the intersection 618. Additionally, the plate 616 is depicted in these figures as a flat, substantially planar member, although it alternatively may be an L-shaped, U-shaped, or other angled member that secures and/or aids in orienting the central region 614 in a generally vertical or other direction. The plate 616 may be sufficiently rigid to prevent the geogrid 600 from peeling away from the adhesive 612 and/or from forming stress concentrations relative to the adhesive 612. Exemplary materials for the plate 616 include steel, aluminum, and various rigid polymers. Additionally, the plate 616 may be formed so as to avoid such stress concentrations. For example, stress concentrations may form at the ends of each plate 616, so those ends may be enlarged or rounded as compared to a remainder of each plate 616.

FIGS. 56 and 57 depict an additional aspect in which the proximal end 608 of the geogrid 600 is divided into one or more first portions 608a extending laterally away from one side of the central region 614 and one or more second portions 608b extending laterally away from an opposite side of the central region 614. First and second portions 608a, 608b may have predetermined lengths, wherein the proximal portion 608 of the geogrid may be segmented prior to delivery of the geogrid at the installation location. Alternatively, the proximal portion 608 may be scored at periodic intervals, permitting the installer to select the locations at which to separate the proximal end 608 into first and second portions 608a, 608b. In still another aspect, the geogrid 600 may arrive at an installation site as a single, unified piece, and the installer then may use some kind of cutting implement to section the geogrid proximal end 608 into the first and second portions 608a, 608b at the time of installation. To install this geogrid, the installer first may deposit one or more regions of adhesive 612 on the pavement 604. The geogrid may be prepared such that the first portions 608a and the second portions 608b alternate and extend in opposite directions. Those portions 608a, 608b then are pressed into the adhesive and allowed to cure—with or without the addition of heat, depending on the type of adhesive used. Optionally, an additional layer of adhesive then may be applied on top of the first layer and the geogrid. The process then is repeated as necessary in order to install additional sections of geogrid within the EMAS bed. Once all geogrid sections have been installed, with the central regions 614 being disposed generally vertically upward, the bed is filled with aggregate and overlaid with a slab, as discussed herein.

FIGS. 58 and 59 depict a variation of the aspect of FIGS. 56 and 57 in which a plurality of supplemental bars or plates 616a, 616b are situated on top of the geogrid proximal end portions 608a, 608b. Those figures depict the plates 616a, 616b as flat, substantially planar members, although they alternatively may be L-shaped, U-shaped, or other angled members that secure and/or aid in orienting the central region 614 in a generally vertical or other direction. Additionally, the plates 616a, 616b are depicted in these figures as being discrete elements generally equal in length to the lengths of their respective proximal portions 608a, 608b. In another aspect, the plates 616a, 616b may be substantially longer than the geogrid proximal portions 608a, 608b. For example, plates 616a, 616b may span approximately an entire width of the geogrid 600, or a distance sufficient to cover two of the proximal end portions 608a or two of the proximal end portions 608b, or approximately five portions, or approximately ten such portions, or approximately twenty such portions. In this aspect, a first layer of adhesive 612a is applied to the pavement, the proximal end portions 608a, 608b are pressed into that first layer, a second layer of adhesive 612b then is added on top of the proximal end portions 608a, 608b—either before or after the first layer is allowed to cure, the plates 616a, 616b are pressed into the second layer of adhesive 612b, and that adhesive layer is permitted to cure.

In each of the aspects shown in FIGS. 52-59, the geogrid 600 additionally may be secured to the pavement 604 with one or more fasteners. Due to the inclusion of the adhesive, however, fewer fasteners may be required to provide equivalent adhesion for the geogrid 600 than a similar system that does not include the use of adhesives.

Turning now to FIGS. 60 and 61, in still another aspect, a channel 620 is formed in the pavement 604, the channel 620 being slightly wider than a width of the geogrid 600. An adhesive 612, e.g., a self-expanding adhesive, and the proximal end 608 then are placed in the channel 620. The adhesive then is permitted to cure. The process then is repeated as necessary to install additional geogrid elements, and an aggregate then is added around the geogrid elements. As seen in FIG. 61, the channel 620 may have a depth at least as large as a width, or at least twice as large as a width, or at least 2.5 times as large as a width.

Turning now to FIGS. 62-68, additional modifications to the aggregate and/or slab layers may improve operability of the EMAS. While not shown in these figures, it will be understood that the EMAS may include a topcoat or covering of some kind, as well as one or more types of anchoring systems, as such features as discussed in greater detail herein.

Figure 62:
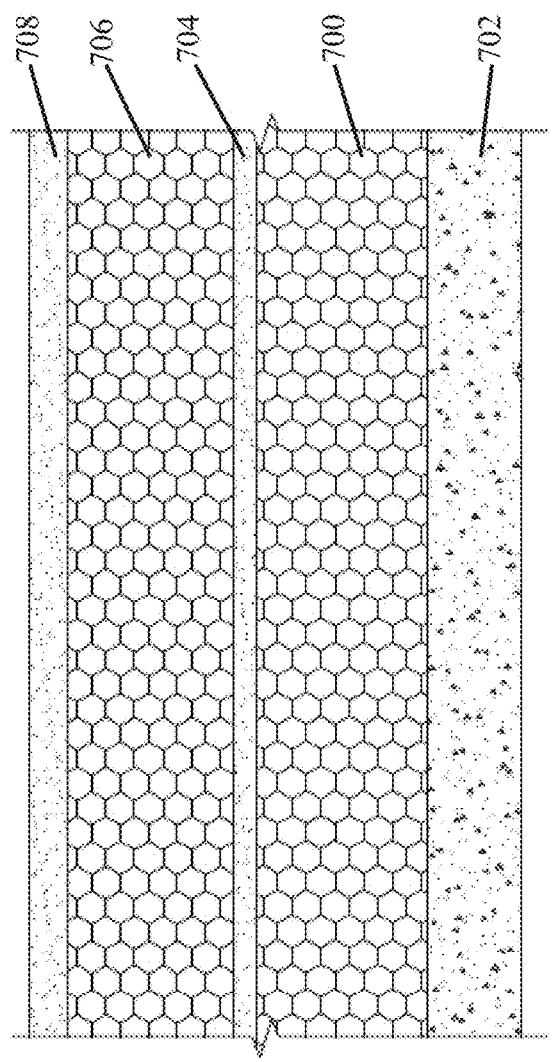
FIG. 62 is a section view of one aspect of an EMAS depicting multiple aggregate layers.

FIG. 62 depicts one aspect in which a first aggregate layer 700 is poured on top of an underlying pavement 702. The aggregate is compacted and a first slab layer 704, either PC or CIP, is installed on top of the first aggregate layer 700. A second aggregate layer 706 then is poured on top of the first slab layer 704 and compacted. A second slab layer 708, either PC or CIP, then is installed on top of the second aggregate layer 706. The aggregate layers 700, 706 may comprise the same material and the same compaction method, e.g., using a bobcat, vibrator plate, etc. Alternatively, the aggregate layers may comprise different materials and/or different compaction methods. FIG. 62 also illustrates that the aggregate layers are approximately equal depths, although it will be appreciated that they may be poured to different depths to provide different arresting characteristics. For example, the first aggregate layer 700 may be deeper than the second aggregate layer 706, or vice versa. It also will be appreciated that additional aggregate and/or slab layers may be added on top of or between the layers shown.

Figure 63:
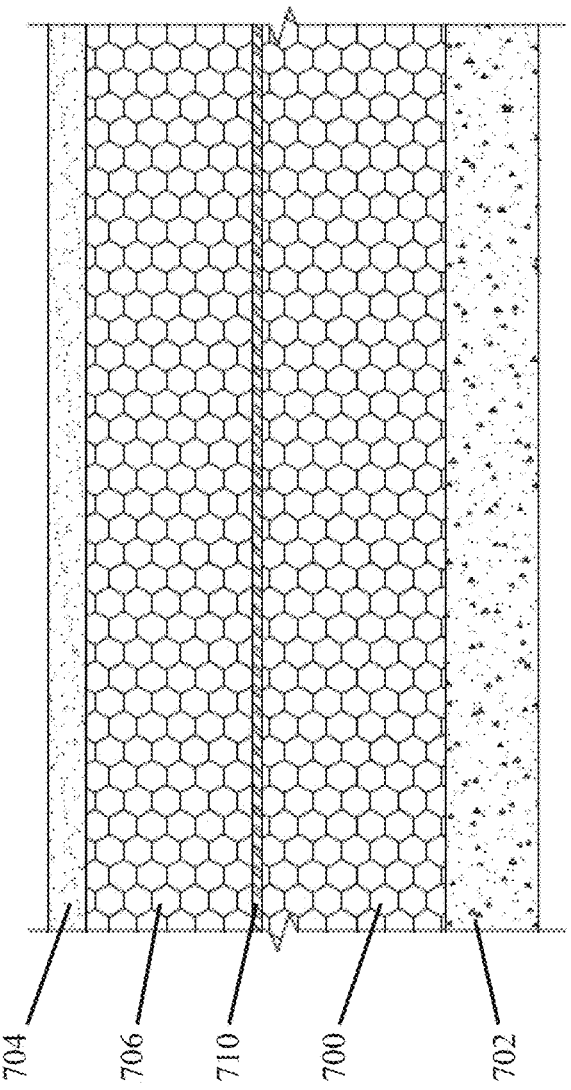
FIG. 63 is a section view of a second aspect of an EMAS depicting multiple aggregate layers.

FIG. 63 depicts a second aspect in which a first aggregate layer 700 is poured on top of the pavement 702 and compacted. A thin separation layer 710 is installed on top of the first aggregate 700, and the second aggregate layer 706 is poured on top of the separation layer 710 and then compacted. Finally, the slab layer 704 is installed on top of the second aggregate layer, e.g., using one or more of the methods described herein. In this instance, the separation layer 710 may be a relatively thin, relatively brittle or frangible material such as fiberglass, fiber cement board, or rigid polypropylene, having a thickness between about 1 mm and about 13 mm. Additionally, the first and second aggregate layers in this aspect are shown to be the same material, compacted using the same method, and having substantially the same depth. It will be appreciated, however, the different aggregate materials, compaction methods, and/or depths may be used for the different aggregate layers. It also will be appreciated that additional aggregate, separation, and/or slab layers may be added on top of or between the layers shown.

Figure 64:
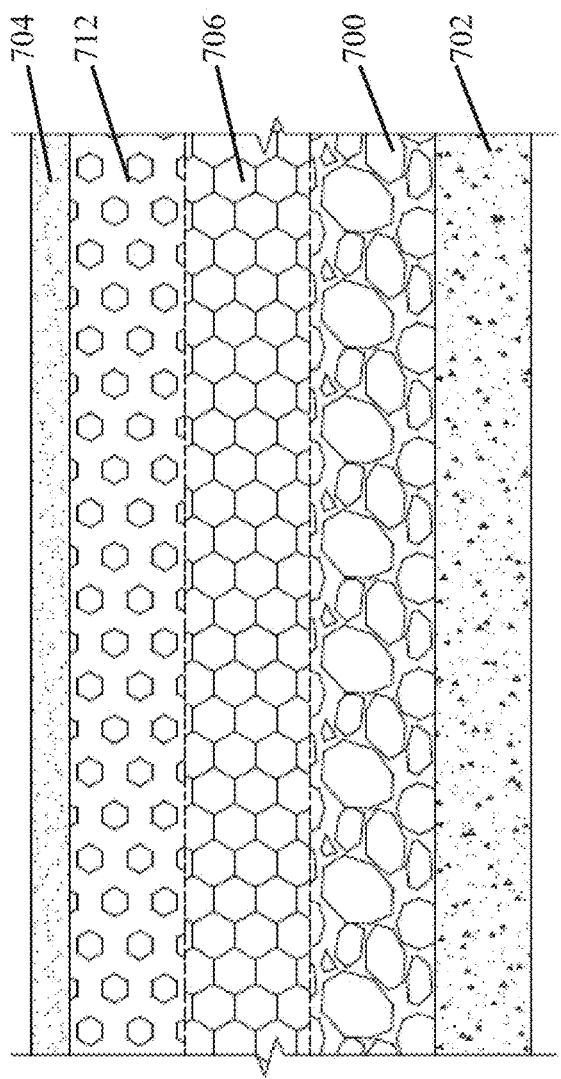
FIG. 64 is a section view of a third aspect of an EMAS depicting multiple aggregate layers.

FIG. 64 depicts a third aspect in which a first aggregate layer 700 is poured on top of the pavement 702 and compacted. A second aggregate layer 706 is poured on top of the first layer and compacted, and a third aggregate layer 712 is poured on top of the second layer and compacted. Finally, the slab layer 704 is installed on top of the third aggregate layer, e.g., using one or more of the methods described herein. In this aspect, the aggregate layers may comprise different types of aggregates, e.g., different grades of glass foam aggregate or different types of aggregate material generally. The aggregate layers may be compacted using the same method, although it also is possible to compact one or more of the layers using a different method. Additionally, the aggregate layers are depicted as having substantially the same depth, although it will be appreciated that one or more of the layers may have a different depth than the other layers. It also will be appreciated that additional aggregate, separation, and/or slab layers may be added on top of or between the layers shown.

Figure 65:
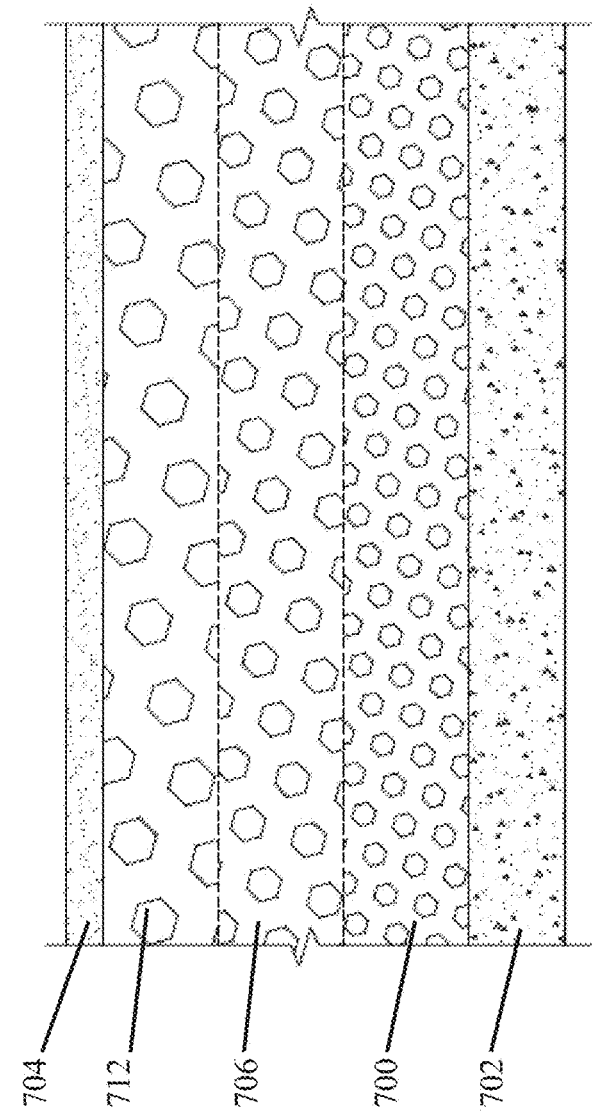
FIG. 65 is a section view of a fourth aspect of an EMAS depicting multiple aggregate layers.

FIG. 65 depicts a fourth aspect in which a first aggregate layer 700 is poured on top of the pavement 702 and compacted. A second aggregate layer 706 is poured on top of the first layer and compacted, and a third aggregate layer 712 is poured on top of the second layer and compacted. Finally, the slab layer 704 is installed on top of the third aggregate layer, e.g., using one or more of the methods described herein. In this aspect, the aggregate layers may comprise the same type of aggregate, although one or more of the layers may comprise a different type of aggregate as compared to the other layers. Also in this aspect, different compaction methods may be used on at least one of the aggregate layers. Additionally, the aggregate layers are depicted as having substantially the same depth, although it will be appreciated that one or more of the layers may have a different depth than the other layers. It also will be appreciated that additional aggregate, separation, and/or slab layers may be added on top of or between the layers shown.

Figure 66:
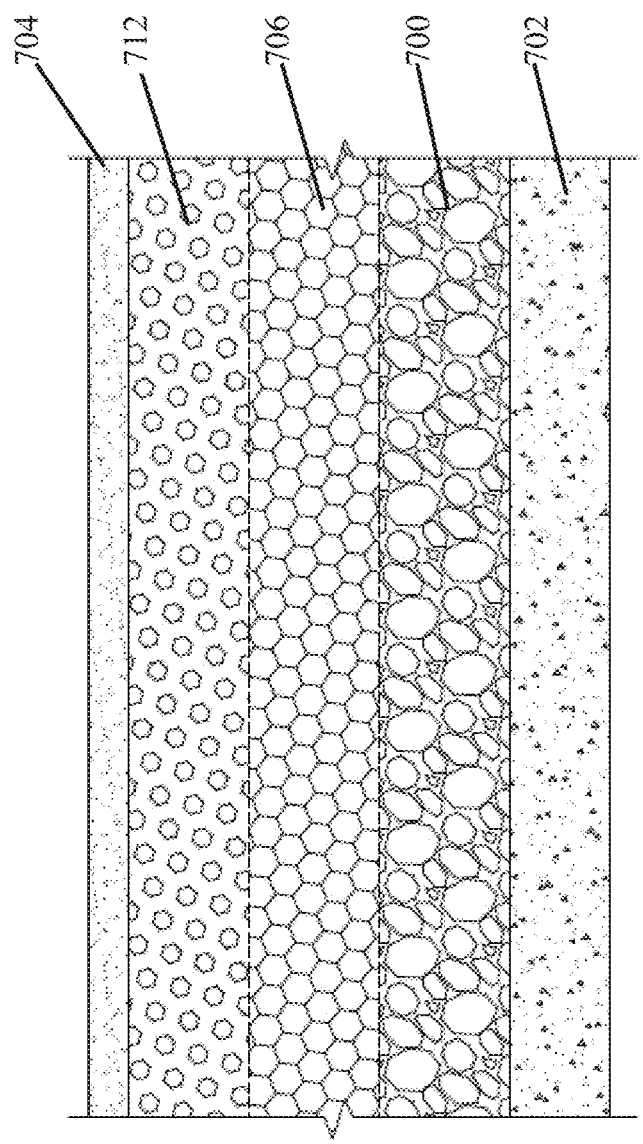
FIG. 66 is a section view of a fifth aspect of an EMAS depicting multiple aggregate layers.

FIG. 66 depicts a fifth aspect in which a first aggregate layer 700 is poured on top of the pavement 702 and compacted. A second aggregate layer 706 is poured on top of the first layer and compacted, and a third aggregate layer 712 is poured on top of the second layer and compacted. Finally, the slab layer 704 is installed on top of the third aggregate layer, e.g., using one or more of the methods described herein. In this aspect, each of the aggregate layers may comprise a different aggregate composition and may be compacted using a different method, although at least two of the layers may comprise the same composition and/or compaction method. Additionally, the aggregate layers are depicted as having substantially the same depth, although it will be appreciated that one or more of the layers may have a different depth than the other layers. It also will be appreciated that additional aggregate, separation, and/or slab layers may be added on top of or between the layers shown.

Figure 67:
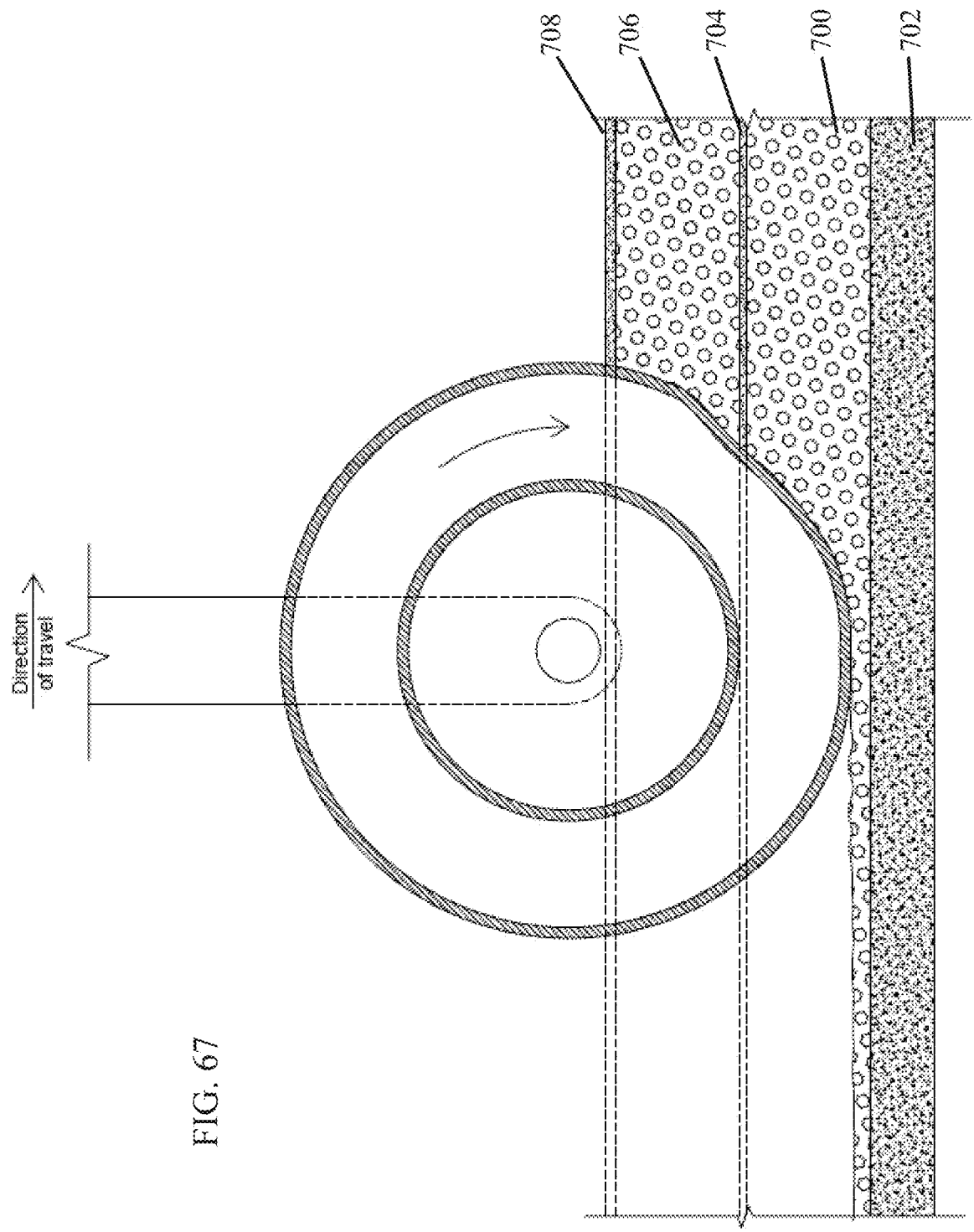
FIG. 67 is a section view of a large aircraft tire rolling through the EMAS of FIG. 62.
Figure 68:
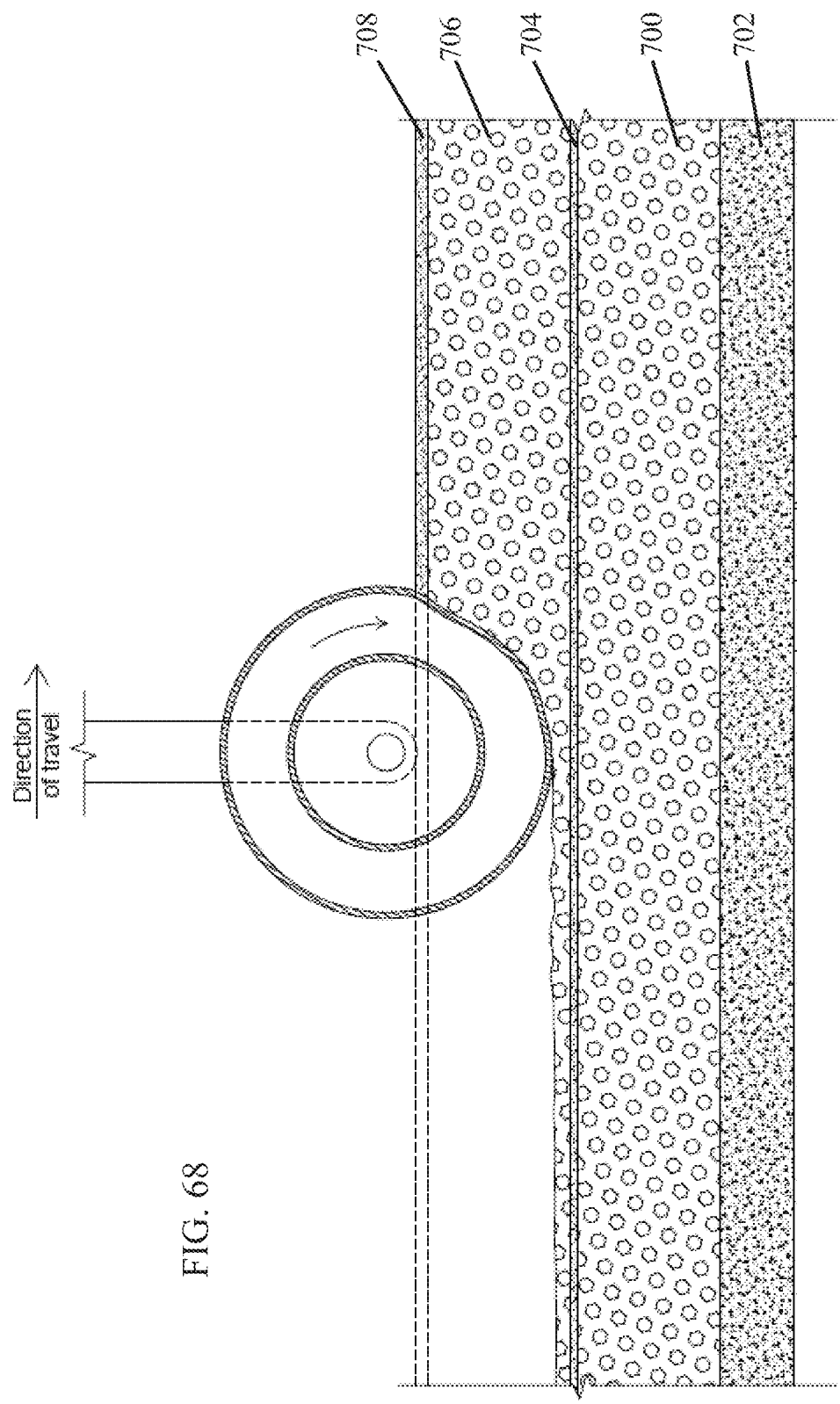
FIG. 68 is a section view of a smaller aircraft tire rolling through the EMAS of FIG. 62.
Figure 75:
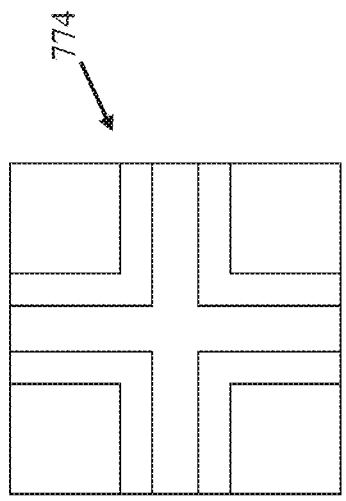
FIG. 75 is a depiction of a second type of support prop.
Figure 74:
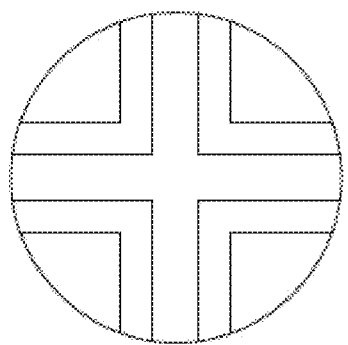
FIG. 74 is a depiction of one type of support prop.
Figure 77:
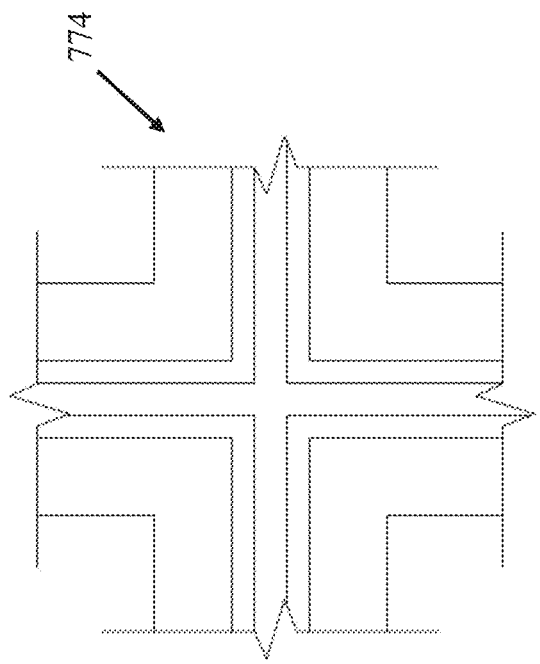
FIG. 77 is a depiction of a fourth type of support prop.
Figure 76:
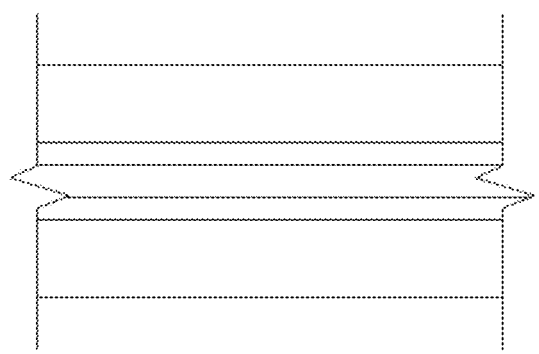
FIG. 76 is a depiction of a third type of support prop.

FIGS. 67 and 68 depict different overrun events for which the various aggregate and slab stratifications may be particularly tailored. In FIG. 67, a large tire may roll through the EMAS and penetrate both slab layers and both aggregate layers. This tire may benefit from the additional, deeper aggregate and/or slab to provide the desired stopping performance. Alternatively, in FIG. 68, a smaller tire, e.g., connected to a smaller aircraft, may roll through the EMAS and only penetrate the second slab layer 708 and the second aggregate layer 706, leaving the first slab layer 704 and the first aggregate layer 700 undisturbed. In such instances, it may not be necessary to remove the first slab layer 704 and/or first aggregate layer 700 after an overrun event, reducing downtime before the runway is operational or the EMAS is repaired, as well as reducing the cost for such repairs. Similar results may obtain for the other stratification examples discussed above. As such, the net effect of a multi-layer system may be to allow an EMAS response to self-tailor to different sizes of aircraft, such that bed design effectively becomes a several-in-one system design that can handle multiple size classes of aircraft in ways close to their design ideals.

Turning now to FIGS. 69-78, the EMAS also may include one or more lid portions 750 on top of or instead of the slab. Each lid portion 750 may take the form of a panel that is disposed on top of an aggregate layer 752 and that additionally includes one or more anchors 754 for securing to the underlying pavement 756. An upper, exposed surface 758 of the lid portion 750 may be substantially flat. Conversely, an underside surface 760 of the lid portion 750 may include one or more stiffening members 762. The number, size, and orientation of the stiffening members 762 may be adjusted for the particular EMAS installation in order to balance increased strength and stiffness for handling service loads caused by jet blast, wind, or other factors, with the need to provide for frangibility and a desired aggregate confinement during overrun events.

In one aspect, as seen in FIG. 69, the stiffening members 762 may take the form of a plurality of ribs 764 extending in a single direction along the underside 760 of the lid 750. In another aspect, as seen in FIG. 70, the stiffening members may take the form of a first plurality of ribs 764a extending in a first direction and a second plurality of ribs 764b extending in a second direction perpendicular to the first direction. Other configurations of stiffening members, including ribs offset at non-perpendicular angles, circular ribs, curvilinear ribs, etc., may be employed, provided the desired strength to frangibility balance is achieved. The choice and thickness of material selected for use in the lid also may be a factor in achieving the desired balance. In one aspect, the lid may be made of a frangible plastic material such as fiberglass, polyethylene, rigid polyvinyl chloride, poly(methyl methacrylate), polypropylene, or polycarbonate, although other materials may be used, as would be appreciated by one of ordinary skill in the art. Additionally, it will be appreciated that the stronger the material used, the thinner the lid may be made, and vice versa.

FIG. 71 illustrates how the stiffening members 762 rest on the aggregate layer 752 and space the underside 760 of the lid 750 away from an upper end 766 of the aggregate 752, leading to formation of one or more voids 768 between the aggregate 752 and the underside 760. Rather than resting directly on the aggregate, however, the EMAS may include one or more support sheets or a plurality of support props to receive a distal end. For example, FIG. 72 depicts the use of a plastic support sheet 772, and FIG. 73 depicts the use of a plurality of support props 774 disposed between the distal end 770 of the stiffening members 762 and an upper end 766 of the aggregate 752. Both the support sheet 772 and the support props 774 increase a surface contact area as compared to the distal end 770 of the stiffening members 762, thereby reducing the pressure caused by a force on the lid 750 and distributing that force over a larger area. Additionally, the support sheet 772 may be used in installations where greater confinement of the aggregate 752 is desired during an overrun event, at it may inhibit upward movement of the aggregate 752 into the void 768 during an overrun event.

FIGS. 74-77 depict various examples of support props 774. In particular, those props may be divided into two general categories, i.e., a first category of point-type supports such as those in FIGS. 74 and 75, and a second category of generally continuous supports, such as those in FIGS. 76 and 77. Point supports may receive smaller segments of the stiffening members but may provide an installer with greater freedom in positioning the supports along the stiffening members. Conversely, the generally continuous supports may take up more room than the point supports, but they also may provide a significant increase in surface area as compared to the point supports, dramatically reducing the presence of stress concentrations at the stiffening member-aggregate interface.

Figure 78:
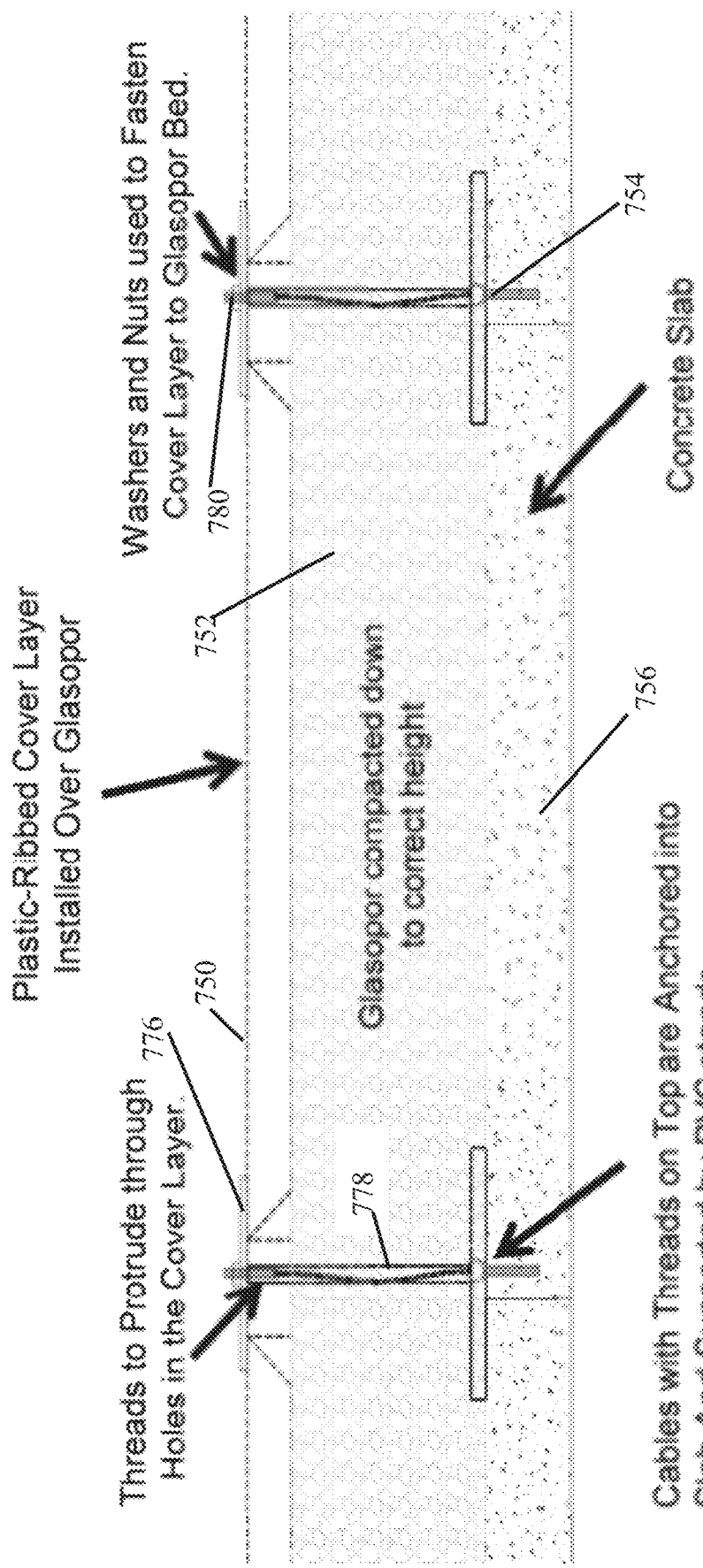
FIG. 78 is a section view of an EMAS with a lid, depicting anchoring of the lid to the underlying pavement.

Turning to FIG. 78, one or more point anchors 776 similar to the point anchors 60 described above then may be used to secure each lid 750 to the underlying pavement 756. Each point anchor 776 may slidingly or threadingly engage a rod 778 anchored into the pavement. An upper end 780 of the rod further may include threading to receive one or more washers or nuts in order to secure the point anchor 776 against the lid 750. In particular, the point anchors 776 may include a fusible link (not shown) similar to the fusible link in the anchors 60 in order to promote fracturing of the link before fracturing of other components of the securement system, e.g., the upwardly extending rod or the pavement anchor.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

We claim:

1. A method of forming a vehicle arresting system, comprising:
   pouring a first aggregate layer on top of a substrate;
   compacting the first aggregate layer;
   installing a separation layer on top of the first aggregate layer;
   pouring a second aggregate layer on top of the separation layer;
   compacting the second aggregate layer; and
   installing a slab layer on top of the second aggregate layer.

2. The method of claim 1, wherein either compacting step is performed by a bobcat or vibrator plate.

3. The method of claim 1, wherein the first and second aggregate layers are comprised of the same material.

4. The method of claim 1, wherein the first and second aggregate layers are comprised of different materials.

5. The method of claim 1, wherein the first and second aggregate layers are poured to approximately equal depths.

6. The method of claim 1, wherein the first and second aggregate layers are poured to different depths.

7. The method of claim 1, wherein at least one of the first and second aggregate layers comprises glass foam.

8. The method of claim 1, wherein the separation layer is a first slab layer.

9. The method of claim 8, wherein the first slab layer is pre-cast.

10. The method of claim 8, wherein the first slab is cast-in-place.

11. The method of claim 1, wherein the separation layer is one of fiberglass, fiber cement board, or rigid polypropylene.

12. The method of claim 11, wherein the separation layer has a thickness between about 1 mm and about 13 mm.

13. The method of claim 1, wherein at least one of the separation layer and the slab layer comprises a cementitious material having an oven-dry density of 100 lb/ft$^3$ or less.

14. The method of claim 13, wherein the cementitious material includes stable gas cells distributed throughout the material at a volume percentage of 33% or greater by volume of the material.

15. The method of claim 13 wherein the cementitious material has a compressive strength of 200 to 600 psi.

16. A method of forming a vehicle arresting system, comprising:
   pouring a first aggregate layer on top of a substrate;
   compacting the first aggregate layer;
   installing a first slab layer on top of the first aggregate layer;
   pouring a second aggregate layer on top of the first slab layer;
   compacting the second aggregate layer; and
   installing a second slab layer on top of the second aggregate layer,
   wherein at least one of the first slab layer and the second slab layer comprises a cementitious material having an oven-dry density of 100 lb/ft$^3$ or less.

17. The method of claim 16, wherein the cementitious material includes stable gas cells distributed throughout the material at a volume percentage of 33% or greater by volume of the material.

18. The method of claim 16, wherein the cementitious material has a compressive strength of 200 to 600 psi.

19. A method of forming a vehicle arresting system, comprising:
   pouring a first aggregate layer on top of a substrate;
   compacting the first aggregate layer;
   pouring a second aggregate layer on top of the first aggregate layer;
   compacting the second aggregate layer;
   pouring a third aggregate layer on top of the second aggregate layer;
   compacting the third aggregate layer; and
   installing a slab layer on top of the third aggregate layer.

20. The method of claim 19, further comprising:
installing a separation layer between at least one of the first and second aggregate layers and the second and third aggregate layers.

21. The method of claim 19, wherein the first, second, and third aggregate layers have substantially the same depth.

22. The method of claim 19, wherein at least one of the first, second, and third aggregate layers has a different depth than others of the first, second, and third aggregate layers.

23. The method of claim 19, wherein the first, second, and third aggregate layers all have different depths.

24. The method of claim 19, wherein at least one of the first, second, and third aggregate layers comprises glass foam.

25. The method of claim 19, wherein at least one of the first, second, and third aggregate layers comprises a different type of aggregate than others of the first, second, and third aggregate layers.

26. The method of claim 25, wherein the different type of aggregate is a different grade of glass foam as compared to a glass foam comprising at least one of the others of the first, second, and third aggregate layers.

27. The method of claim 19, wherein the slab layer comprises a cementitious material having an oven-dry density of 100 lb/ft$^3$ or less.

28. The method of claim 27 wherein the cementitious material includes stable gas cells distributed throughout the material at a volume percentage of 33% or greater by volume of the material.

29. The method of claim 27 wherein the cementitious material has a compressive strength of 200 to 600 psi.

* * * * *